(12) United States Patent
McConlogue et al.

(10) Patent No.: US 12,553,889 B2
(45) Date of Patent: Feb. 17, 2026

(54) SMALL MOLECULES TARGETING THE INTRINSICALLY DISORDERED STRUCTURAL ENSEMBLE OF α-SYNUCLEIN PROTECT AGAINST DIVERSE α-SYNUCLEIN MEDIATED DYSFUNCTIONS

(71) Applicants: The Regents of the University of California, Oakland, CA (US); Dainton Biosciences, LLC, Burlingame, CA (US)

(72) Inventors: Lisa McConlogue, Oakland, CA (US); David A. Agard, Oakland, CA (US)

(73) Assignees: The Regents of the University of California, Oakland, CA (US); Dainton Biosciences, LLC, Burlingame, CA (US)

( * ) Notice: Subject to any disclaimer, the term of this patent is extended or adjusted under 35 U.S.C. 154(b) by 1113 days.

(21) Appl. No.: 17/593,372

(22) PCT Filed: Mar. 17, 2020

(86) PCT No.: PCT/US2020/023203
§ 371 (c)(1),
(2) Date: Sep. 16, 2021

(87) PCT Pub. No.: WO2020/190970
PCT Pub. Date: Sep. 24, 2020

(65) Prior Publication Data
US 2022/0155287 A1 May 19, 2022

Related U.S. Application Data

(60) Provisional application No. 62/819,995, filed on Mar. 18, 2019.

(51) Int. Cl.
*A61K 31/245* (2006.01)
*A61K 31/404* (2006.01)
(Continued)

(52) U.S. Cl.
CPC ......... *G01N 33/542* (2013.01); *A61K 31/245* (2013.01); *A61K 31/404* (2013.01);
(Continued)

(58) Field of Classification Search
CPC ............................ A61K 31/245; A61K 31/404
See application file for complete search history.

(56) References Cited

FOREIGN PATENT DOCUMENTS

WO WO2009003147 A1 * 12/2008
WO 2019028456 A1 2/2019

OTHER PUBLICATIONS

M. Caruana, Inhibition of disaggregation of alpha-synuclein oligomers by natural polyphenolic compounds, 2011, FEBS Letters, vol. 585, p. 1113-1120 (Year: 2011).*

(Continued)

*Primary Examiner* — Adam C Milligan
*Assistant Examiner* — Karen Cheng
(74) *Attorney, Agent, or Firm* — Seed Intellectual Property Law Group LLP

(57) ABSTRACT

Provided herein are pharmaceutical compositions and methods for treatment or prevention of synucleinopathies with small-molecule inhibitors of pathogenic α-synuclein activity having the Formula (I). Also, provide are methods for identifying novel compounds for modulating α-synuclein activity.

5 Claims, 40 Drawing Sheets

Specification includes a Sequence Listing.

(51) Int. Cl.
*A61K 31/415* (2006.01)
*A61K 31/423* (2006.01)
*A61K 31/426* (2006.01)
*A61K 31/4439* (2006.01)
*A61K 31/454* (2006.01)
*A61K 31/4725* (2006.01)
*A61K 31/473* (2006.01)
*C07C 237/30* (2006.01)
*C07D 217/26* (2006.01)
*C07D 231/14* (2006.01)
*C07D 261/20* (2006.01)
*C07D 277/56* (2006.01)
*C07D 401/12* (2006.01)
*C07D 401/14* (2006.01)
*C12Q 1/66* (2006.01)
*G01N 33/542* (2006.01)
*G01N 33/68* (2006.01)

(52) U.S. Cl.
CPC .......... *A61K 31/415* (2013.01); *A61K 31/423* (2013.01); *A61K 31/426* (2013.01); *A61K 31/4439* (2013.01); *A61K 31/454* (2013.01); *A61K 31/4725* (2013.01); *A61K 31/473* (2013.01); *C07C 237/30* (2013.01); *C07D 217/26* (2013.01); *C07D 231/14* (2013.01); *C07D 261/20* (2013.01); *C07D 277/56* (2013.01); *C07D 401/12* (2013.01); *C07D 401/14* (2013.01); *C12Q 1/66* (2013.01); *G01N 33/6896* (2013.01); *G01N 2500/20* (2013.01); *G01N 2800/2835* (2013.01)

(56) References Cited

OTHER PUBLICATIONS

Suresh et al, Rifampin, retrieved from https://www.ncbi.nlm.nih.gov/books/NBK557488/ on Apr. 25, 2025, last updated Nov. 12, 2023. (Year: 2023).*
International Search Report and Written Opinion, dated Sep. 8, 2020, for International Application No. PCT/US2020/023203. (18 pages).
Kurnik et al., "Potent α-Synuclein Aggregation Inhibitors, Identified by High-Throughput Screening, Mainly Target the Monomeric State," Cell Chemical Biology 25, 1389-1402, Nov. 15, 2018. (24 pages).
Masuda et al., "Small Molecule Inhibitors of α-Synuclein Filament Assembly," Biochemistry 45(19):6085-6094, 2006. [Published on Web Apr. 21, 2006] (With Supporting Information 1 and 2) (13 pages).
Oliveri, "Toward the discovery and development of effective modulators of α-synuclein amyloid aggregation," European Journal of Medicinal Chemistry 167:10e36, 2019. [Available online Jan. 28, 2019] (27 pages).

* cited by examiner

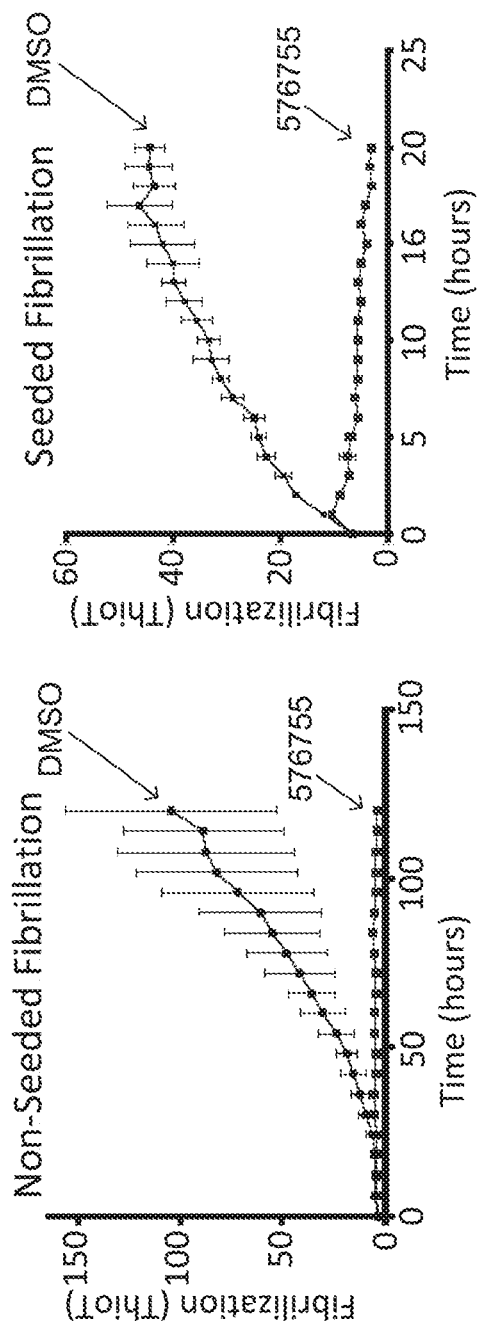
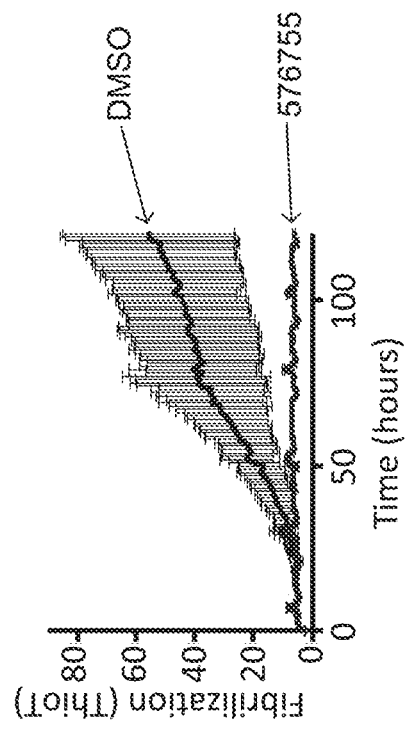
FIG. 4B
FIG. 4C

Phagocytosis restoring compounds

573416

573417

573418

573419

573420

581674

576759

Dummy plates around reaction plates

Plates placed in-between two aluminum heat blocks

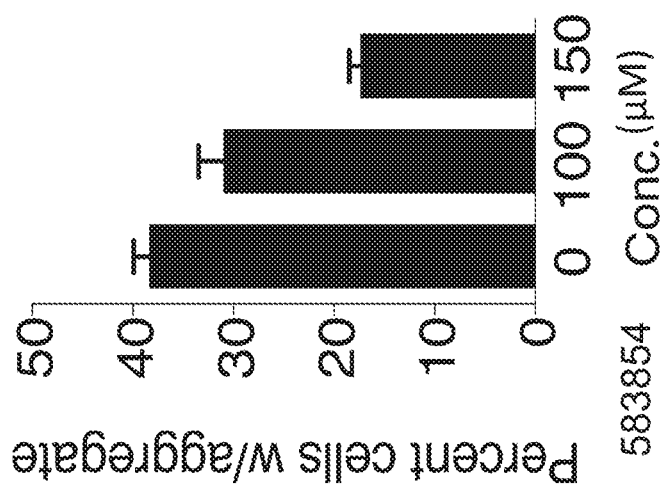
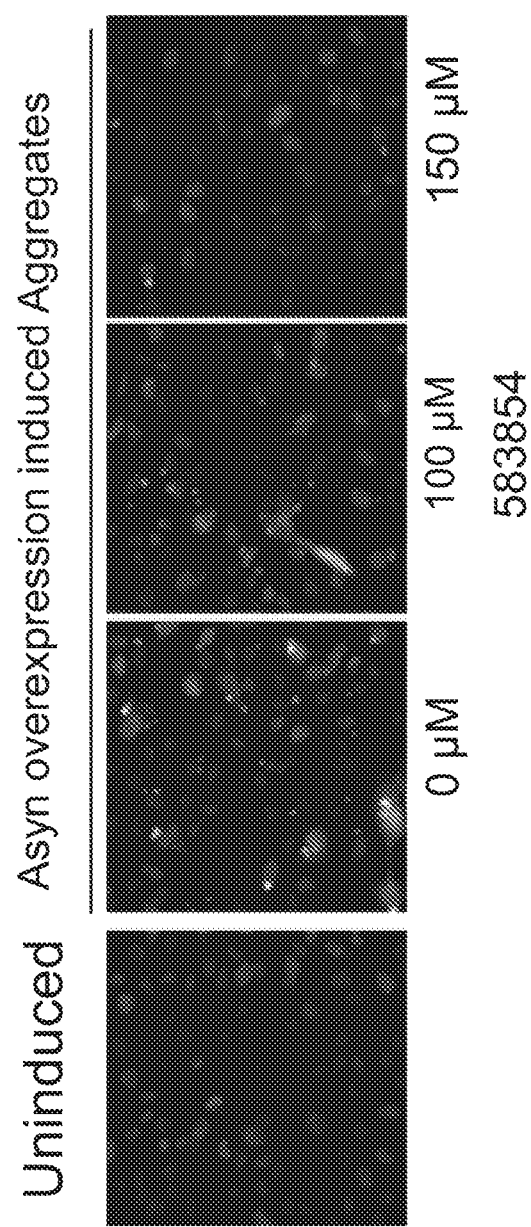
FIG. 23B
FIG. 23A

SEQUENCE LISTING

```
<160> NUMBER OF SEQ ID NOS: 4

<210> SEQ ID NO 1
<211> LENGTH: 14
<212> TYPE: PRT
<213> ORGANISM: Artificial Sequence
<220> FEATURE:
<223> OTHER INFORMATION: Synthetic flexible linker sequence

<400> SEQUENCE: 1

Ile Asp Gly Gly Gly Gly Ser Gly Gly Gly Gly Ser Ser Gly
1               5                   10

<210> SEQ ID NO 2
<211> LENGTH: 12
<212> TYPE: PRT
<213> ORGANISM: Artificial Sequence
<220> FEATURE:
<223> OTHER INFORMATION: Synthetic flexible linker sequence

<400> SEQUENCE: 2

Gly Gly Gly Gly Ser Gly Gly Gly Gly Ser Ser Gly
1               5                   10

<210> SEQ ID NO 3
<211> LENGTH: 987
<212> TYPE: DNA
<213> ORGANISM: Artificial Sequence
<220> FEATURE:
<223> OTHER INFORMATION: Synthetic sequence alphaSyn-LgBiT fusion
      protein encoding DNA sequence

<400> SEQUENCE: 3
atggatgtat tcatgaaagg actttcaaag gccaaggagg gagttgtggc tgctgctgag      60
aaaaccaaac agggtgtggc agaagcagca ggaaagacaa aagagggtgt tctctatgta     120
```

```
ggctccaaaa ccaaggaggg agtggtgcat ggtgtggcaa cagtggctga aagaccaaa      180 gagcaagtga caaatgttgg aggagcagtg gtgacgggtg tgacagcagt agcccagaag     240
acagtggagg gagcagggag cattgcagca gccactggct ttgtcaaaaa ggaccagttg     300
ggcaagaatg aagaaggagc cccacaggaa ggaattctgg aagatatgcc tgtggatcct     360
gacaatgagg cttatgaaat gccttctgag gaagggtatc aagactacga acctgaagcc     420
ggtggtggcg ggagcggagg tggagggtcg tcaggtgtct tcacactcga agatttcgtt     480
ggggactggg aacagacagc cgcctacaac ctggaccaag tccttgaaca gggaggtgtg     540
tccagtttgc tgcagaatct cgccgtgtcc gtaactccga tccaaaggat tgtccggagc     600
ggtgaaaatg ccctgaagat cgacatccat gtcatcatcc cgtatgaagg tctgagcgcc     660
gaccaaatgg cccagatcga agaggtgttt aaggtggtgt accctgtgga tgatcatcac     720
tttaaggtga tcctgcccta tggcacactg gtaatcgacg gggttacgcc gaacatgctg     780
aactatttcg gacggccgta tgaaggcatc gccgtgttcg acggcaaaaa gatcactgta     840
acagggaccc tgtggaacgg caacaaaatt atcgacgagc gcctgatcac ccccgacggc     900
tccatgctgt tccgagtaac catcaacagc gaaaacctgt attttcaggg agcggccgca     960
ctcgagcacc accaccacca ccactga                                         987

<210> SEQ ID NO 4
<211> LENGTH: 546
<212> TYPE: DNA
<213> ORGANISM: Artificial Sequence
<220> FEATURE:
<223> OTHER INFORMATION: Synthetic sequence alphaSyn-SmBiT fusion
      protein encoding DNA sequence including stop codon

<400> SEQUENCE: 4
atggatgtat tcatgaaagg actttcaaag gccaaggagg gagttgtggc tgctgctgag      60
aaaaccaaac agggtgtggc agaagcagca ggaaagacaa aagagggtgt tctctatgta    120
ggctccaaaa ccaaggaggg agtggtgcat ggtgtggcaa cagtggctga aagaccaaa     180 gagcaagtga caaatgttgg aggagcagtg gtgacgggtg tgacagcagt agcccagaag    240
acagtggagg gagcagggag cattgcagca gccactggct ttgtcaaaaa ggaccagttg    300
ggcaagaatg aagaaggagc cccacaggaa ggaattctgg aagatatgcc tgtggatcct    360
gacaatgagg cttatgaaat gccttctgag gaagggtatc aagactacga acctgaagcc    420
ggtggtggcg ggagcggagg tggagggtcg tcaggtgtga ccggctaccg gctgttcgag    480
gagattctgg aaaacctgta ttttcaggga gcggccgcac tcgagcacca ccaccaccac    540
cactga                                                               546
```

SMALL MOLECULES TARGETING THE INTRINSICALLY DISORDERED STRUCTURAL ENSEMBLE OF α-SYNUCLEIN PROTECT AGAINST DIVERSE α-SYNUCLEIN MEDIATED DYSFUNCTIONS

STATEMENT REGARDING SEQUENCE LISTING

The Sequence Listing associated with this application is provided in text format in lieu of a paper copy, and is hereby incorporated by reference into the specification. The name of the text file containing the Sequence Listing is 920085_422USPC_SEQUENCE_LISTING.txt. The text file is 3.3 KB, was created on Sep. 7, 2021, and is being submitted electronically via EFS-Web.

BACKGROUND

The sequential misfolding of α-synuclein (αSyn) into oligomers and fibrils is central to the pathogenesis of Parkinson's disease (PD) and related neurodegenerative disorders termed synucleinopathies. Lewy bodies containing αSyn amyloid-like fibril inclusions are a hallmark neuropathological feature of these diseases. The severity of disease correlates with the progressive spread of aggregated αSyn in patients, and αSyn misfolding is associated with toxicity in cell and animal models. In addition, strong genetic evidence links αSyn to PD including gene multiplications or missense mutations that cause rare early onset forms of PD and genetic association studies linking αSyn to sporadic PD. This combined neuropathological, biochemical and genetic evidence provides strong support implicating the misfolding and aggregation of αSyn as a key feature in PD.

Monomeric αSyn, as an intrinsically disordered protein (IDP), exists primarily as a dynamic ensemble of distinct interconverting conformations which have the ability to take on more structured forms under the appropriate cellular context. In particular, αSyn can take on more ordered forms upon membrane binding. Owing to this intrinsic dynamic character and the ability to populate other forms upon interaction, IDPs are involved in many key biochemical processes, are vulnerable to aggregation and are susceptible to prion like amplification of misfolded species and transmission between cells. This propensity towards aggregation and spread is likely to underlie the association that IDPs have with a growing number of misfolding diseases, notably many neurodegenerative disorders.

Small molecule binding to native states of globular proteins has been successfully used to block misfolding and aggregation most notably in the case of targeting transthyretin to treat systemic amyloidosis. By contrast, targeting of IDPs such as native monomeric αSyn with small molecules has been challenging due to their inherent structural heterogeneity and the absence of persistent structural elements.

BRIEF SUMMARY

The dynamic nature of the monomeric form of αSyn is believed to provide opportunity to impact multiple aspects of the protein. For example, small molecules interacting with native αSyn could protect and stabilize specific conformations present in the ensemble, which in turn could impact its functional properties. Thus, depending on what conformations of αSyn are bound, described herein are compounds that are capable of enhancing or inhibiting fibrillization, or modulating cellular malfunction associated with αSyn overexpression.

Certain embodiments provide a method of treating or preventing synucleinopathy, comprising administering an effective amount of a small-molecule inhibitor of pathogenic α-synuclein activity, wherein the small-molecule inhibitor is represented by Formula (I):

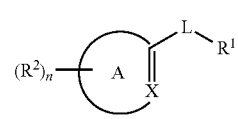

Formula (I)

wherein,
L is $-(CR^aR^b)_mC(=O)(CR^aR^b)_pN(R^c)-$, or $-(CR^aR^b)_mN(R^c)(CR^aR^b)_pC(=O)-$;
$R^a$ and $R^b$ are, at each occurrence independently H, $-NH_2$, or heterocyclyl;
$R^c$ is H, or $C_1$-$C_6$ alkyl optionally substituted with $-C(=O)NHR^d$,
$R^1$ is H, $-N(R^e)_2$, arylalkyl optionally substituted with halo, or $C_1$-$C_6$ alkyl optionally substituted with one or more substituents selected from $-N(R^e)_2$, $-(C=O)NHR^d$, heteroaryl, and cycloalkyl;
$R^2$ is, at each occurrence independently hydroxyl, $-N(R^e)_2$, optionally substituted aryl, or optionally substituted heteroaryl;
$R^d$ is H or $C_1$-$C_6$ alkyl;
each $R^e$ is independently H or $C_1$-$C_6$ alkyl;
X is N or CH;
A is a aryl, heteroaryl, cycloalkyl or heterocyclyl;
p is 0 or 1;
m is 0, 1, 2, or 3; and
n is 0, 1, or 2,
or a pharmaceutically acceptable salt, tautomer, prodrug or stereoisomer thereof.

In some embodiments, provided herein is a method of antagonizing α-synuclein oligomerization, comprising contacting α-synuclein monomers with a small-molecule represented by Formula (I).

In some embodiments, provided herein is a method of antagonizing α-synuclein inhibition of vesicular dynamics, comprising contacting α-synuclein monomers with a small-molecule represented by Formula (I).

In some embodiments, provided herein is a method of identifying a compound that antagonizes α-synuclein oligomerization, the method comprising:
a. providing a cell-free α-synuclein split luciferase system comprising a first α-synuclein fusion protein comprising a first luciferase fragment and a second α-synuclein fusion protein comprising a second luciferase fragment, wherein the first and second luciferase fragments are form a functional luciferase enzyme,
b. contacting the α-synuclein split luciferase system with a test compound, and
c. measuring luciferase activity.

In some embodiments, provided herein is a method of identifying a compound that antagonizes α-synuclein oligomerization, the method comprising:
a. providing a cell-free α-synuclein fluorescence energy transfer (FRET) system comprising a first α-synuclein protein comprising a FRET donor fluorophore and a second α-synuclein protein comprising a FRET acceptor fluorophore, wherein the donor and acceptor fluorophores form a functional FRET reporter, b. contacting the α-synuclein FRET system with a test compound, and c. measuring fluorescence of the FRET reporter.

BRIEF DESCRIPTION OF THE SEVERAL VIEWS OF THE DRAWINGS

FIG. 2A shows volume corrected size distributions of the αSyn sample with measurements at different incubation times overlaid. The αSyn sample was principally monomeric αSyn (peak 1), while negligible amounts of oligomeric αSyn (peak 2) were observed. FIG. 2B shows that the size (hydrodynamic diameter) and area percentage (Area %) of Peak 1, corresponding to monomeric αSyn, were stable for over 3 hours, and that >99.9% of the particle volume could be attributed to monomeric αSyn in the sample.

FIGS. 4A-4C show three binding compounds that show anti-fibrillization activity. In FIG. 4A, examples are shown of three independent experiments for each compound tested at 300 μM in the αSyn fibrillization assay along with 0.5% DMSO control, αSyn fibrillization is monitored by thioflavin fluorescence signal. RFU are relative fluorescence units. Assays were done in quadruplicate with each data point representing the mean+/−SEM. Boxed numbers indicate the ratio of experiments demonstrating significant impact. Statistical analyses, as described in Example 1, indicate significant differences p-value<0.05 between 576755 and DMSO in 3 out of the 3 shown experiments, between 581674 and DMSO in 2 out of 3 experiments and between 582032 and DMSO in 2 out of the 3 experiments. Compound 573416 has no impact on αSyn fibrillization in a biochemical assay in 3 of 3 experiments. In FIG. 4B, anti-aggregation activity of compound 576755 is demonstrated in both the standard (left) and seeded-aggregation (right) assays in which αSyn protofibrils are added at the initiation of the assay. DMSO control and 576755. Shown are the means+/−SD for four replicates at the indicated time points. The reproducibility of the anti-aggregation of compound 576755 is demonstrated in FIG. 4C, in which normalized data from over 32 experiments is compiled. Data from 64 wells were compiled for DMSO control and 32 wells for 576755. Shown are the means+/−SD for each hour time point. Since this experiment is one plate read together the machine fluctuations can be seen in all wells as small peaks overlaying the curves.

In FIG. 6A, 576755 reduces αSyn oligomerization in H4 cells as measured by complementation of αSyn proteins with split luciferase tags as described in Example 1. Trace firefly luciferase co-transfected provides a normalization measure. 0.3% DMSO is present in all samples. Data are plotted as means+/−SD. Representative results from 3 independent experiments. A reduction in cellular oligomerization by 576755 was determined by one-way ANOVA with Dunnett's post-test. FIG. 6B shows that 576755 has no impact on αSyn levels in H4 cells as determined by Western analyses. Left) representative Western from one experiment of a merged image detecting actin and αSyn from H4 cells transiently transfected with vector control or a mixture of αSyn proteins containing N or C terminal split Gaussia luciferase tags and treated with 0.3 percent DMSO or 150 μM 576755. The two αSyn bands correspond to different tags. Right) αSyn was quantitated in 3 separate biological replicates. Samples were normalized to cells transfected with αSyn without drug treatment to allow comparisons between blots. There is no difference in αSyn levels in 576755 treated vs. untreated cells (100) as determined by one sample t test. Data are plotted as mean+/−SD. FIG. 6C shows that 576755 is not toxic to primary rat embryonic midbrain neurons up to 60 micromolar. FIG. 6D shows that nontoxic levels of 576755 alleviates loss of dopaminergic neurons induced by the A53T mutant of αSyn. Primary rat embryonic midbrain cultures were non-transduced or transduced with adenovirus encoding A53T αSyn (+Ad SynA53T), in the absence or presence of 576755. The cells were then stained immunocytochemically for MAP2 and TH. Preferential dopaminergic cell death was assessed by evaluating the percentage of MAP2-positive cells that also stained positive for TH. Data are plotted as the mean±SEM. n=2-3 for the neuron toxicity analysis and n=5 for the reversal of αSyn toxicity. Representative results from 5 independent experiments. Statistics used a one-way ANOVA with Tukey post-test after square root transformation of the data. *p<0.05 where shown. *p<0.001. **p<0.0001 ns is not significant.

FIG. 7A shows results of phagocytosis assays. H4 neuroglioma cells over-expressing αSyn from a tetracycline-inducible promoter were cultured for 24 hours in the absence or presence of tetracycline to induce αSyn and compound. After 24 hours of induction cells were fed 4 micron beads for 90 minutes and a phagocytic index was measured by quantitating the amounts of engulfed beads on an imaging reader (Array Scan VTI). The percent phagocytic index (% Non-Tet) was calculated by normalizing the indicated samples to the phagocytic index of un-induced cells not overexpressing αSyn. Each point corresponds to a separate experiment denoting the average of 6 well replicates. Means+/−SD for the combined multiple experimental averages are shown. Control compound is 484228, identified in a prior in silico screen. n=3. Significance was determined by ANOVA with Dunnet's correction. * p<0.05 where shown. *p<0.001. ** p<0.0001. ns is not significant. H4 neuroglioma cells overexpressing tetracycline (tet) inducible αSyn were induced with tet and compounds or DMSO for 16 hours and fed fluorescent beads for 90 minutes. Unbound particles were washed away and fluorescence of intracellular and of the remaining extracellular beads identified by staining with Wright's Giemsa stain (HEMA3 kit see Example 1). As the HEMA3 stain absorbs light, the internalized beads are less fluorescent than the outside beads. Engulfed beads were quantitated on an ArrayScan. The % control phagocytosis was calculated by normalizing to values of cells not over-expressing αSyn (uninduced by tet). Each point is a separate experiment, denoting the average of 6 replicates. Using 484228 as a control, 7 compounds showed activity in this assay. Statistics done by way of ANOVA with Dunnet's correction. FIG. 7B shows Western analyses of αSyn levels treated with compounds. Cells were treated with tetracycline to induce αSyn, and treated with DMSO or compounds and analyzed by Western blot for actin and αSyn Representative Western blots of merged actin and αSyn signals of individual wells treated with DMSO or compounds. Right: Westerns from multiple replicates were quantitated and the αSyn band intensity was normalized to that of actin. Each data point is a separate well. None of the five compounds analyzed showed significant impact on αSyn levels.

FIG. 21A shows the impact on αSyn oligomerization at 24 hours of incubation for 13 compounds incubated at 100 μM with 12.5 μM of each tagged synuclein using the split Gaussia complementation αSyn oligomerization assay. FIG. 21B shows the dose dependence and IC50s of the 4 active compounds at 24 hours of incubation using the split Gaussia complementation αSyn oligomerization assay with 12.5 μM of each tagged synuclein. FIG. 21C shows the time course of impact of 100 μM compound on αSyn oligomerization over a full time-course using 10 μM of each tagged αSyn in the Nanobit complementation αSyn oligomerization assay. FIG. 21D shows the normalized luciferase activity of compounds from FIGS. 21A and 21C together for comparison.

FIG. 22A shows oligomerization over a 96 hour time course. FIG. 22B shows quantified oligomerization activity at 96 hours.

FIGS. 23A and 23B show αSyn aggregation in a cell model. FIG. 23A fluorescence micrographs of uninduced cells and cells induced with tetracycline to overexpress a split Gaussian luciferase tagged αSyn treated with control, 100 μM, or 150 μM 583854. Nuclei were stained with Hoechst nuclear dye and αSyn aggregates were visualized with the anti-S129 phosphorylated αSyn antibody 11A5 and a fluorescently labelled secondary antibody. FIG. 23B shows quantitation of cells imaged for nuclei and phospho-αSyn. The quantitation was performed on an ARRAYSCAN automated imaging platform, and aggregates quantitated using the ARRAYSCAN spot-detector algorithm.

FIG. 24A shows binding kinetics trace of 576755, 581823, and 581858. Beta-site Site Amyloid Precursor Protein Cleaving Enzyme 1 (BACE), Glutathione-S transferase (GST) and Carbonic Anhydrase (CAII) where used as controls. FIG. 24B shows a % Rmax of αSyn binding (black bar) and their respective pb-index (white bar).

DETAILED DESCRIPTION

Figure 1:
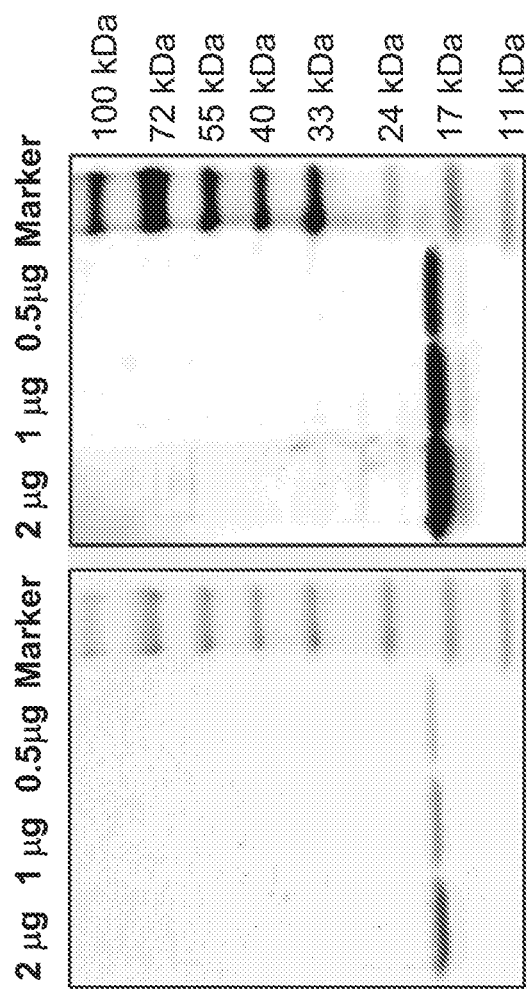
FIG. 1 shows Sodium dodecyl sulfate polyacrylamide gel electrophoresis (SDS-PAGE) analyses of αSyn used for High Throughput Chemical Microarray Surface Plasmon Resonance (HT-CM-SPR) imaging screen. SDS-PAGE followed by staining of proteins with Coomassie (left) or silver (right) was performed to evaluate purity and size of αSyn. αSyn is pure and predominantly monomeric in size as detected in this electrophoresis system. Mass Spectrometric analyses of this preparation showed it to be of >99% purity and without detectable degradation products (data not shown).

The over-expression and aggregation of α-synuclein (αSyn) are linked to the onset and pathology of Parkinson's disease. Native monomeric αSyn exists in an intrinsically disordered ensemble of interconverting conformations, which has made its therapeutic targeting by small molecules highly challenging. In the study disclosed herein, the monomeric structural ensemble of αSyn was targeted and novel drug-like small molecules that impact multiple pathogenic processes were identified. Surface plasmon resonance high-throughput screen, in which monomeric αSyn is incubated with microchips arrayed with tethered compounds, was used to identify novel αSyn interacting drug-like compounds. Because these small molecules could impact a variety of αSyn forms present in the ensemble, representative hits for impact on multiple αSyn malfunctions in vitro and in cells were tested, including aggregation and perturbation of vesicular dynamics. A compound that inhibits αSyn misfolding and is neuroprotective was identified. Also, multiple compounds were identified that restore phagocytosis impaired by αSyn overexpression. It is demonstrated herein that drug-like small molecules that interact with native αSyn can impact a variety of its pathological processes. Thus, targeting the intrinsically disordered ensemble of αSyn offers a unique approach to the development of small molecule research tools and therapeutics for Parkinson's disease.

The sequential misfolding of αSyn into oligomers and fibrils is thought to be central to the pathogenesis of synucleinopathies. The severity of disease correlates with the progressive spread of aggregated αSyn in patients, and misfolding is associated with toxicity in cell and animal models. As shown for other amyloid misfolding proteins, compelling evidence supports pre-fibrillar αSyn oligomers and not fibrillar deposits as the pathogenic species in disease. αSyn oligomers are directly toxic to cells, and mutations enhancing αSyn oligomer formation increase αSyn toxicity in neurons and rodents. Since oligomers are the initiating event in αSyn misfolding and are likely the pathogenic species, the studies described herein focus on disrupting oligomerization.

In spite of these inherent challenges, the inventors previously identified potential small molecule binders to αSyn using an in silico screen (Toth et al 2014). It was demonstrated that one of these compounds, 484228 (N-(4-fluorophenyl)benzenesulfonamide), displayed protective activity in reversing αSyn over-expression mediated neurodegeneration and impairment of phagocytosis without impact on aggregation of the recombinant protein. This finding supports the notion that small molecules can target an IDP such as αSyn and in so doing modulate cellular malfunctions independent of inhibitory effects on aggregation in solution. Based on the success of the in silica screen, biophysical screens were performed to identify compounds that bind to IDPs using a surface plasmon resonance (SPR) based assay in which compounds are tethered to the chip (High Throughput Chemical microarray SPR Imaging, HT-CM-SPR). HT-CM-SPR has been successfully applied for the identification of small molecule binders to globular proteins, which have provided starting hits for drug discovery. Additionally, HT-CM-SPR has been used to identify small molecules retarding the aggregation of tau protein, another IDP that misfolds in neurodegenerative diseases (Toth et al 2014).

The present disclosure describes utilizing the HT-CM-SPR screen to search and identify small molecule compounds that interact with native αSyn, including aggregation-blocking compounds, compounds correcting other disease relevant malfunctions of αSyn, and so on. In particular, it is disclosed herein a subset of these compounds that can rescue αSyn dysfunction by reducing αSyn aggregation. Others can restore vesicular dynamics impaired by αSyn overexpression. The identification of small molecules reversing diverse malfunctions of αSyn indicates that differing conformations and associated malfunctions can be targeted by small molecule interactions.

The complexity and variability of fibrillization assays has limited and complicated prior discovery of molecules blocking αSyn aggregation. In addition, the problem of complexity and variability of fibrillization assays is surmounted through a novel, quantitative direct assays for αSyn oligomerization. One embodiment thus provides a novel and robust biochemical assay of αSyn oligomer formation using complementation of split Gaussia luciferase (GLuc) or split NanoBit luciferase (Nluc) tags placed on separate αSyn molecules to measure αSyn oligomerization. This assay is suitable for identifying compounds that prevent the oligomerization of αSyn.

In the present description, the term "about" means±20% of the indicated range, value, or structure, unless otherwise indicated. The term "consisting essentially of" limits the scope of a claim to the specified materials or steps and those that do not materially affect the basic and novel characteristics of the claimed invention. It should be understood that the terms "a" and "an" as used herein refer to "one or more" of the enumerated components. The use of the alternative (e.g., "or") should be understood to mean either one, both, or any combination thereof of the alternatives. As used herein, the terms "include" and "have" are used synonymously, which terms and variants thereof are intended to be construed as non-limiting. The term "comprise" means the presence of the stated features, integers, steps, or components as referred to in the claims, but that it does not preclude the presence or addition of one or more other features, integers, steps, components, or groups thereof.

Recombinant DNA, molecular cloning, and gene expression techniques used in the present disclosure are known in the art and described in references, such as Sambrook et al., Molecular Cloning: A Laboratory Manual, 3$^{rd}$ Ed., Cold Spring Harbor Laboratory, New York, 2001, and Ausubel et al., Current Protocols in Molecular Biology, John Wiley and Sons, Baltimore, MD, 1999.

Active Compounds

As noted above, in one embodiment of the present disclosure, compounds having activity as modulators of α-synuclein are provided, the compounds have the following Formula (I):

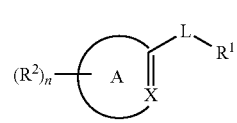

Formula (I)

or a pharmaceutically acceptable salt, isotopic form, tautomer, prodrug or stereoisomer thereof, wherein:
L is —(CR$^a$R$^b$)$_m$C(=O)(CR$^a$R$^b$)$_p$N(R$^c$)— or —(CR$^a$R$^b$)$_m$N(R$^c$)(CR$^a$R$^b$)$_p$C(=O)—;
R$^a$ and R$^b$ are, at each occurrence independently H, —NH$_2$, or heterocyclyl;
R$^c$ is H, or C$_1$-C$_6$ alkyl optionally substituted with —C(=O)NHR$^d$,
R$^1$ is H, —N(R$^e$)$_2$, arylalkyl optionally substituted with halo, or C$_1$-C$_6$ alkyl optionally substituted with one or more substituents selected from —N(R$^e$)$_2$, —(C=O)NH R$^d$, heteroaryl, and cycloalkyl;
R$^2$ is, at each occurrence independently hydroxyl, —N(R$^e$)$_2$, optionally substituted aryl, or optionally substituted heteroaryl;
R$^d$ is H or C$_1$-C$_6$ alkyl;
each R$^e$ is independently H or C$_1$-C$_6$ alkyl;
X is N or CH;
A is a aryl, heteroaryl, cycloalkyl or heterocyclyl;
p is 0 or 1;
m is 0, 1, 2, or 3; and
n is 0, 1, or 2.

As used herein, "optionally substituted" means that a given radical (e.g., aryl, heteroaryl, cycloalkyl, etc.) may or may not be substituted. Thus, optionally substituted aryl includes both substituted and unsubstituted aryl. The substituents may be one or more of the following: C$_{1-6}$ alkyl, halogen, aryl, and the like.

In some more specific embodiments, X is CH.

In more specific embodiments, A is aryl, such as phenyl or naphthyl;

In certain embodiments,

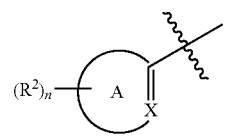

A has one of the following structures:

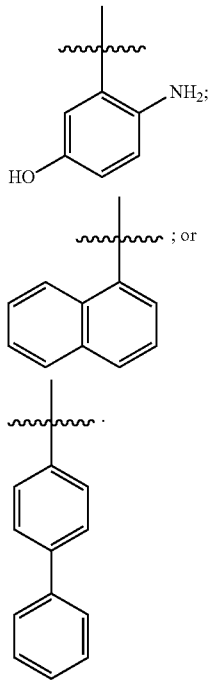

In certain other specific embodiments, X is N and A is an N-heteroaryl. In more specific embodiments, A is pyridinyl, thiazolyl, pyrazolyl, benzoisoxazolyl, or quinoline.

In some more specific embodiments,

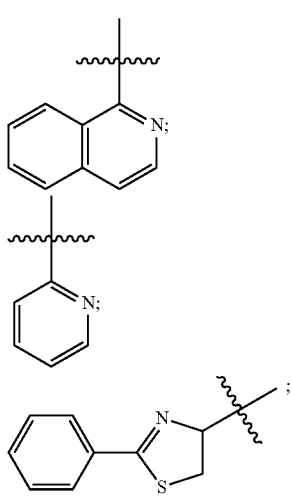

(i.e., optionally substituted A ring) has one of the following structures:

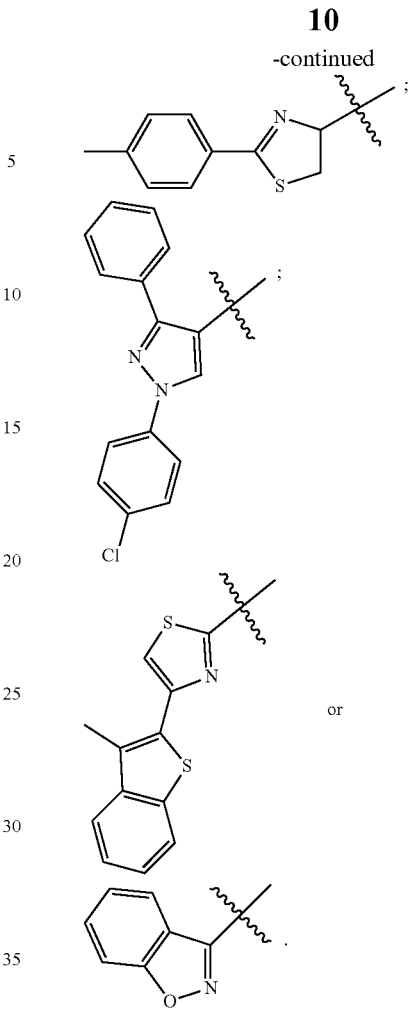

In some embodiments, L is $-(CR^aR^b)_m(C=O)(CR^aR^b)_pNR^c-$. In other specific embodiments, L is $-(CR^aR^b)_mNR^c(CR^aR^b)_p(C=O)-$. In some of the foregoing embodiments, at least one occurrence of $R^b$ has the following structure:

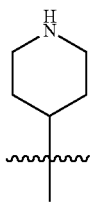

In some embodiments, $R^1$ is H, $-CH_3$, or $-NH_2$ or has one of the following structures, or the respective stereoisomer form thereof:

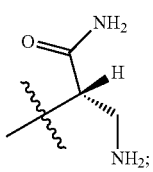

-continued

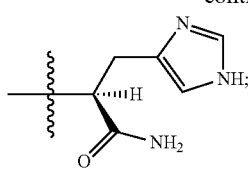

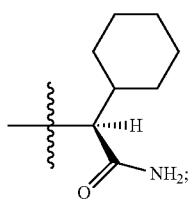

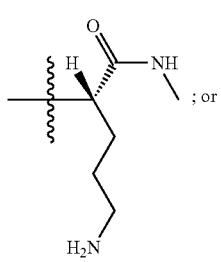

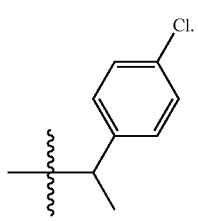

In some specific embodiments, $R^e$ is H or has the following structure:

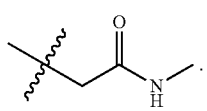 [SMILES: *CC(=O)NC]

In certain embodiments, -L-$R^1$ has one of the following structures:

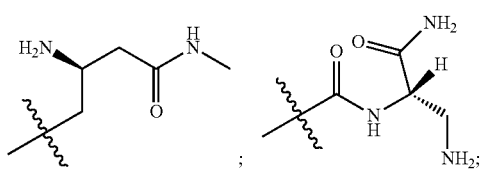

-continued

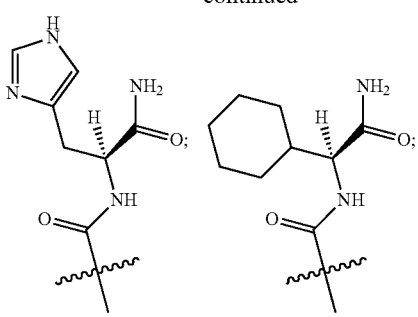

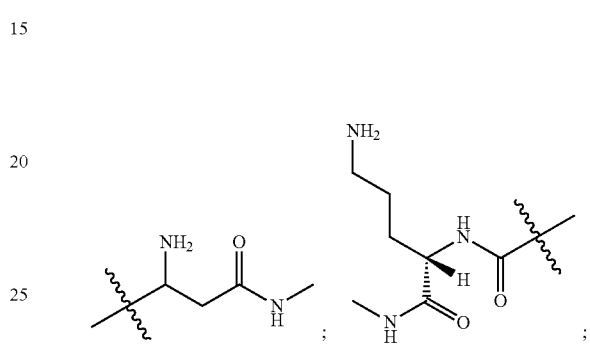

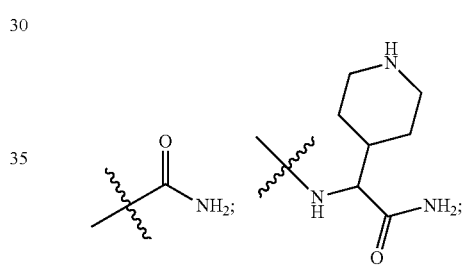

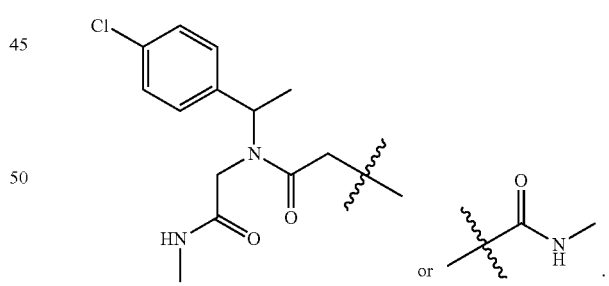

In various different embodiments, the compound has one of the structures set forth in Table 1 below. Although some of the compounds are shown in their specific stereochemistry (e.g., Compound I-1, I-2, I-3, I-4 and I-6), it is understood that in some embodiments, their opposite enantiomer forms are also contemplated. In other embodiments, the active compounds of the present disclosure are racemic mixtures of both enantiomers. Exemplary compounds in Table 1 were prepared by the indicated method or methods known in the art and analyzed by mass spectrometry and/or $^1$H NMR.

TABLE 1

| Formula No. | Compound Structure | Compound Name | Compound No. |
|---|---|---|---|
| I-1 | | (R)-3-amino-N-methyl-4-(naphthalen-1-yl)butanamide | 573416 |
| I-2 | | (S)-N-(1,3-diamino-1-oxopropan-2-yl)isoquinoline-1-carboxamide | 573417 |
| I-3 | | (S)-N-(1-amino-3-(1H-imidazol-4-yl)-1-oxopropan-2-yl)picolinamide | 573418 |
| I-4 | | (S)-N-(2-amino-1-cyclohexyl-2-oxoethyl)-2-phenylthiazole-4-carboxamide | 573419 |
| I-5 | | 3-([1,1'-biphenyl]-4-yl)-3-amino-N-methylpropanamide | 581674 |

TABLE 1-continued

Representative compounds of Formula (I)

| Formula No. | Compound Structure | Compound Name | Compound No. |
|---|---|---|---|
| I-6 | | (S)-N-(5-amino-1-(methylamino)-1-oxopentan-2-yl)-2-(p-tolyl)thiazole-4-carboxamide | 576759 |
| I-7 | | 1-(4-chlorophenyl)-3-phenyl-1H-pyrazole-5-carboxamide | 573420 |
| I-9 | | 2-((4-(3-methylbenzo[b]thiophen-2-yl)thiazol-2-yl)amino)-2-(piperidin-4-yl)acetamide | 573437 |
| I-10 | | 2-(benzo[d]isoxazol-3-yl)-N-(1-(4-chlorophenyl)ethyl)-N-(2-(methylamino)-2-oxoethyl)acetamide | 582032 |
| I-11 | | 2-amino-5-hydroxy-N-methylbenzamide | 576755 |
| I-12 | | 2-methylamino-5-hydroxy-N-methylbenzamide | 581858 |

TABLE 1-continued

Representative compounds of Formula (I)

| Formula No. | Compound Structure | Compound Name | Compound No. |
|---|---|---|---|
| I-13 | | 2-dimethylamino-5-hydroxy-N-methylbenzamide | 581823 |
| I-14 | | 2,5-dihydroxy-N-methylbenzamide | 583854 |

Methods of Treatment and Use

Disclosed herein are methods of treatment or prevention of a synucleinopathy, comprising administering an effective amount of a small-molecule inhibitor of pathogenic α-synuclein activity. As used herein, the term "inhibitor" or "antagonist" are used interchangeably and refer to a compound or a ligand that inhibits at least one pathogenic activity of the target protein (e.g., α-synuclein). An inhibitor can inhibit the activity by at least 10%, 20%, 30%, 40%, 50%, 60%, 70%, 80%, 90%, 95%, 98%, 99%, or 100%, as measured by the methods disclosed herein or known in the art. Examples of α-synuclein pathogenic activity include oligomerization, protofibril formation, fibril formation, misfolding, inhibition of vesicle dynamics such as phagocytosis, and cellular level or organismal level pathogenesis. Examples of synucleinopathies include Parkinson's disease (PD), Dementia with Lewy bodies (DLB), Parkinson's disease with dementia (PDD), Lewy Body Dementia (LBD), Lewy Body Disease (PD PDD and DLB), Diffuse Lewy Body disease (DLBD), Alzheimer's Disease (AD), or Multiple system atrophy (MSA), or neuroaxonal dystrophy In some embodiments, the small-molecule inhibitor comprises a compound having the structure of Formula (I). In some embodiments, the small-molecule inhibitor is compound 576755, 581674, 582032, 573437, 573416, 573417, 573418, 573419, 581674, 576759, 573420, 581823, 581858, 583854, or any combination or analogue thereof (see Table 1). In certain embodiments, the pathogenic α-synuclein activity is oligomerization and the small-molecule inhibitor is compound 576755, 581674, 582032, 573437, 581823, 581858, 583854, isobutamben, rifampin, amsacrine, Evans blue, rifapentine, sunitinib, fludrocortisone acetate, saquinavir, or any combination thereof. In certain embodiments, the pathogenic α-synuclein activity is inhibition of vesicular dynamics and the small-molecule inhibitor is compound 573416, 573417, 573418, 573419, 581674, 576759, 573420, or any combination thereof.

In some embodiments, the small-molecule inhibitor of pathogenic α-synuclein activity comprises isobutamben, rifampin, amsacrine, Evans blue, rifapentine, sunitinib, fludrocortisone acetate, saquinavir, or any combination thereof. In certain embodiments, the pathogenic α-synuclein activity is oligomerization and the small-molecule inhibitor is isobutamben, rifampin, amsacrine, Evans blue, rifapentine, sunitinib, fludrocortisone acetate, saquinavir, or any combination thereof.

In some embodiments, disclosed herein is a method of inhibiting α-synuclein oligomerization, comprising contacting α-synuclein monomers with a small-molecule. The small-molecule can be a small molecule comprising Formula (I). The small-molecule is compound 576755, 581674, 582032, 573437, 581823, 581858, 583854, or any combination thereof. In some embodiments, the small-molecule can be isobutamben, rifampin, amsacrine, Evans blue, rifapentine, sunitinib, fludrocortisone acetate, saquinavir, or any combination thereof.

In some embodiments, disclosed herein is a method of inhibiting α-synuclein mediated inhibition of vesicular dynamics, comprising contacting α-synuclein monomers with a small-molecule. The small-molecule can be a small molecule comprising Formula (I). In some embodiments, the small-molecule is compound 573416, 573417, 573418, 573419, 581674, 576759, 573420, or any combination thereof. In some embodiments, the small-molecule promotes phagocytosis.

In the embodiments disclosed herein, the α-synuclein can be contacted with the small-molecule in vitro, in a cell, or in vivo. The cell can be a neuron, nerve fiber, oligodendrocyte, microglial cell, astrocyte, glial cell, monocyte, macrophage, endothelial cell, or any cell containing α-synuclein. In some embodiments, the α-synuclein is contacted with the small-molecule in a subject. The subject can be a mammal, such as a mouse, rat, rabbit, dog, horse, cow, goat, non-human primate, or human.

Biochemical Screening Assays

In other embodiments, disclosed herein is a method of identifying a compound that inhibits α-synuclein oligomerization, comprising: a. providing a cell-free α-synuclein split luciferase system comprising a first α-synuclein fusion protein comprising a first luciferase fragment and a second α-synuclein fusion protein comprising a second luciferase fragment, wherein the first and second luciferase fragments form a functional luciferase enzyme, b. contacting the α-synuclein split luciferase system with a test compound, and c. measuring luciferase activity. In some embodiments, the luciferase is Gaussia luciferase. The Gaussia luciferase can be derived for *Gaussia princeps*. In some embodiments, the Gaussia luciferase is a split luciferase comprising GLuc1 (residues 18-109) and GLuc2 (residues 110-185). In some embodiments, the luciferase is an engineered luciferase derived from *Oplophorus gracilirostris*. The engineered luciferase derived from *O. gracilirostris* can comprise a first luciferase fragment (LgBiT) and a second luciferase fragment (SmBiT). The LgBit can comprise about 145-160 amino acids of the N-terminus of the engineered luciferase. In particular embodiments, the LgBit is the N-terminal 158 residues of the engineer luciferase. The SmBiT can comprise about 9-15 amino acids of the engineer luciferase. In particular embodiments, the SmBiT is the C-terminal 11 residues of the engineered luciferase. The oligomerization assays based on engineered luciferase derived from *O. gracilirostris* (LgBit and SmBiT tags) have advantages over the Gaussia luciferase derived split luciferase complementation oligomerization assay. They are 1) the LgBit and SmBiT tags have a very low intrinsic binding capacity (Dixon A S. et al. *ACS Chem Biol* 11(2):400-408, 2016, incorporated herein by reference in its entirety) which reduces false positives coming from compound screens based on tag-driven oligomerization. They also do not contain any disulfide bonds, which reduces false positives coming from compound screens based on interference with proper disulfide bond formation (e.g. reducing agents).

In some embodiments, method of identifying a compound that inhibits α-synuclein oligomerization is performed without inducing fibrilization of α-synuclein. For example, the method can be performed without shaking the system or the method can be performed without addition of detergents that accelerate misfolding.

In further embodiments, disclosed herein is a method of identifying a compound that inhibits α-synuclein oligomerization, comprising: a. providing a cell-free α-synuclein fluorescence energy transfer (FRET) system comprising a first α-synuclein protein comprising a FRET donor fluorophore and a second α-synuclein protein comprising a FRET acceptor fluorophore, wherein the donor and acceptor fluorophores form a functional FRET reporter, b. contacting the α-synuclein FRET system with a test compound, and c. measuring fluorescence of the FRET reporter. In some embodiments, the donor fluorophore is Cy3 and the acceptor fluorophore is Cy5. In some embodiments, the first α-synuclein protein comprises a Cys at position 9, 38, 64, or 99 labeled with the FRET donor and the second α-synuclein protein comprises a Cys at position 9, 38, 64, or 99 labeled with the FRET acceptor.

In some embodiments, the compound assayed for inhibition of α-synuclein oligomerization is a small-molecule, peptide, or antibody. In some embodiments, the small-molecule comprises Formula (I). In some embodiments, one or more small-molecules are screened in a high-throughput assay. A library of test compound can be used in the screening assay, such as a small-molecule library.

Pharmaceutical Compositions

Other embodiments are directed to pharmaceutical compositions. The pharmaceutical composition comprises a compound of Formula (I) and a pharmaceutically acceptable carrier,

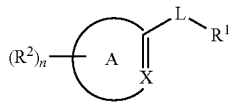

Formula (I)

wherein:

L is $-(CR^aR^b)_mC(=O)(CR^aR^b)_pN(R^c)-$ or $-(CR^aR^b)_mN(R^c)(CR^aR^b)_pC(=O)-$;

$R^a$ and $R^b$ are, at each occurrence independently H, $-NH_2$, or heterocyclyl;

$R^c$ is H, or $C_1$-$C_6$ alkyl optionally substituted with $-C(=O)NHR^d$, $R^1$ is H, $-N(R^e)_2$, arylalkyl optionally substituted with halo, or $C_1$-$C_6$ alkyl optionally substituted with one or more substituents selected from $-N(R^e)_2$, $-(C=O)NHR^d$, heteroaryl, and cycloalkyl;

$R^2$ is, at each occurrence independently hydroxyl, $-N(R^e)_2$, optionally substituted aryl, or optionally substituted heteroaryl;

$R^d$ is H or $C_1$-$C_6$ alkyl;

each $R^e$ is independently H or $C_1$-$C_6$ alkyl;

X is N or CH;

A is a aryl, heteroaryl, cycloalkyl or heterocyclyl;

p is 0 or 1;

m is 0, 1, 2, or 3; and n is 0, 1, or 2, or a pharmaceutically acceptable salt, tautomer, prodrug or stereoisomer thereof, provided that the compound of Formula (I) is not 2-amino-5-hydroxy-N-methylbenzamide, 2-methylamino-5-hydroxy-N-methylbenzamide, 2-dimethylamino-5-hydroxy-N-methylbenzamide, or 2,5-dihydroxy-N-methylbenzamide.

In some embodiments, the pharmaceutical composition is formulated for oral administration. In other embodiments, the pharmaceutical composition is formulated for injection. In still more embodiments, the pharmaceutical compositions comprise a compound as disclosed herein and an additional therapeutic agent. Non-limiting examples of such therapeutic agents are described herein below. In more specific embodiments, the compound of Formula (I) may be any one of Compound I-1 to I-10 of Table 1.

Suitable routes of administration include, but are not limited to, oral, intravenous, rectal, aerosol, parenteral, ophthalmic, pulmonary, transmucosal, transdermal, vaginal, otic, nasal, and topical administration. In addition, by way of example only, parenteral delivery includes intramuscular, subcutaneous, intravenous, intramedullary injections, as well as intrathecal, direct intraventricular, intraperitoneal, intralymphatic, and intranasal injections.

In certain embodiments, a compound as described herein is administered in a local rather than systemic manner, for example, via injection of the compound directly into an organ, often in a depot preparation or sustained release formulation. In specific embodiments, long acting formulations are administered by implantation (for example subcutaneously or intramuscularly) or by intramuscular injection. Furthermore, in other embodiments, the drug is delivered in a targeted drug delivery system, for example, in a liposome coated with organ-specific antibody. In such embodiments, the liposomes are targeted to and taken up selectively by the organ. In yet other embodiments, the compound as described herein is provided in the form of a rapid release formulation, in the form of an extended release formulation, or in the form of an intermediate release formulation. In yet other embodiments, the compound described herein is administered topically.

The compounds according to the disclosure are effective over a wide dosage range. For example, in the treatment of adult humans, dosages from 0.01 to 1000 mg, from 0.5 to 100 mg, from 1 to 50 mg per day, and from 5 to 40 mg per day are examples of dosages that are used in some embodiments. An exemplary dosage is 10 to 30 mg per day. The exact dosage will depend upon the route of administration, the form in which the compound is administered, the subject to be treated, the body weight of the subject to be treated, and the preference and experience of the attending physician.

In some embodiments, a compound of the disclosure is administered in a single dose. Typically, such administration will be by injection, e.g., intravenous injection, in order to introduce the agent quickly. However, other routes are used as appropriate. A single dose of a compound of the disclosure may also be used for treatment of an acute condition.

In some embodiments, a compound of the disclosure is administered in multiple doses. In some embodiments, dosing is about once, twice, three times, four times, five times, six times, or more than six times per day. In other embodiments, dosing is about once a month, once every two weeks, once a week, or once every other day. In another embodiment a compound of the disclosure and another agent are administered together about once per day to about 6 times per day. In another embodiment the administration of a compound of the disclosure and an agent continues for less than about 7 days. In yet another embodiment the administration continues for more than about 6, 10, 14, 28 days, two months, six months, or one year. In some cases, continuous dosing is achieved and maintained as long as necessary.

Administration of the compounds of the disclosure may continue as long as necessary. In some embodiments, a compound of the disclosure is administered for more than 1, 2, 3, 4, 5, 6, 7, 14, or 28 days. In some embodiments, a compound of the disclosure is administered for less than 28, 14, 7, 6, 5, 4, 3, 2, or 1 day. In some embodiments, a compound of the disclosure is administered chronically on an ongoing basis.

In some embodiments, the compounds of the disclosure are administered in dosages. It is known in the art that due to intersubject variability in compound pharmacokinetics, individualization of dosing regimen is necessary for optimal therapy. Dosing for a compound of the disclosure may be found by routine experimentation in light of the instant disclosure.

In some embodiments, the compounds described herein are formulated into pharmaceutical compositions. In specific embodiments, pharmaceutical compositions are formulated in a conventional manner using one or more physiologically acceptable carriers comprising excipients and auxiliaries which facilitate processing of the active compounds into preparations which can be used pharmaceutically. Proper formulation is dependent upon the route of administration chosen. Any pharmaceutically acceptable techniques, carriers, and excipients are used as suitable to formulate the pharmaceutical compositions described herein: Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999).

Provided herein are pharmaceutical compositions comprising a compound of Formula (I) and a pharmaceutically acceptable diluent(s), excipient(s), or carrier(s). Also provided herein are methods for administering a pharmaceutical composition comprising a compound of Formula (I) and a pharmaceutically acceptable diluent(s), excipient(s), or carrier(s).

In certain embodiments, the compounds described are administered as pharmaceutical compositions in which compounds of Formula (I) are mixed with other active ingredients, as in combination therapy. Encompassed herein are all combinations of active ingredients set forth in the combination therapies section below and throughout this disclosure. In specific embodiments, the pharmaceutical compositions include one or more compounds of Formula (I).

A pharmaceutical composition, as used herein, refers to a mixture of a compound of Formula (I) with other chemical components, such as carriers, stabilizers, diluents, dispersing agents, suspending agents, thickening agents, and/or excipients. In certain embodiments, the pharmaceutical composition facilitates administration of the compound to an organism. In some embodiments, practicing the methods of treatment or use provided herein, therapeutically effective amounts of compounds of Formula (I) provided herein are administered in a pharmaceutical composition to a mammal having a disease, disorder or medical condition to be treated. In specific embodiments, the mammal is a human. In certain embodiments, therapeutically effective amounts vary depending on the severity of the disease, the age and relative health of the subject, the potency of the compound used and other factors. The compounds described herein are used singly or in combination with one or more therapeutic agents as components of mixtures.

In one embodiment, one or more compounds of Formula (I) are formulated in an aqueous solutions. In specific embodiments, the aqueous solution is selected from, by way of example only, a physiologically compatible buffer, such as Hank's solution, Ringer's solution, or physiological saline buffer. In other embodiments, one or more compound of Formula (I) are formulated for transmucosal administration. In specific embodiments, transmucosal formulations include penetrants that are appropriate to the barrier to be permeated (e.g., the blood-brain barrier). In still other embodiments wherein the compounds described herein are formulated for other parenteral injections, appropriate formulations include aqueous or non-aqueous solutions. In specific embodiments, such solutions include physiologically compatible buffers and/or excipients.

In another embodiment, compounds described herein are formulated for oral administration. Compounds described herein are formulated by combining the active compounds with, e.g., pharmaceutically acceptable carriers or excipients. In various embodiments, the compounds described herein are formulated in oral dosage forms that include, by way of example only, tablets, powders, pills, dragees, capsules, liquids, gels, syrups, elixirs, slurries, suspensions and the like.

In certain embodiments, pharmaceutical preparations for oral use are obtained by mixing one or more solid excipient with one or more of the compounds described herein, optionally grinding the resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as: for example, maize starch, wheat starch, rice starch, potato starch, gelatin, gum tragacanth, methylcellulose, microcrystalline cellulose, hydroxypropylmethylcellulose, sodium carboxymethylcellulose; or others such as: polyvinylpyrrolidone (PVP or povidone) or calcium phosphate. In specific embodiments, disintegrating agents are optionally added. Disintegrating agents include, by way of example only, cross-linked croscarmellose sodium, polyvinylpyrrolidone, agar, or alginic acid or a salt thereof such as sodium alginate.

In one embodiment, dosage forms, such as dragee cores and tablets, are provided with one or more suitable coating. In specific embodiments, concentrated sugar solutions are used for coating the dosage form. The sugar solution, optionally contain additional components, such as by way of example only, gum arabic, talc, polyvinylpyrrolidone, carbopol gel, polyethylene glycol, and/or titanium dioxide, lacquer solutions, and suitable organic solvents or solvent mixtures. Dyestuffs and/or pigments are also optionally added to the coatings for identification purposes. Additionally, the dyestuffs and/or pigments are optionally utilized to characterize different combinations of active compound doses.

In certain embodiments, therapeutically effective amounts of at least one of the compounds described herein are formulated into other oral dosage forms. Oral dosage forms include push-fit capsules made of gelatin, as well as soft, sealed capsules made of gelatin and a plasticizer, such as glycerol or sorbitol. In specific embodiments, push-fit capsules contain the active ingredients in admixture with one or more filler. Fillers include lactose, binders such as starches, and/or lubricants such as talc or magnesium stearate and, optionally, stabilizers. In other embodiments, soft capsules contain one or more active compound that is dissolved or suspended in a suitable liquid. Suitable liquids may include one or more fatty oil, liquid paraffin, or liquid polyethylene glycol. In addition, stabilizers are optionally added.

In other embodiments, therapeutically effective amounts of at least one of the compounds described herein are formulated for buccal or sublingual administration. Formulations suitable for buccal or sublingual administration include, by way of example only, tablets, lozenges, or gels. In still other embodiments, the compounds described herein are formulated for parental injection, including formulations suitable for bolus injection or continuous infusion. In specific embodiments, formulations for injection are presented in unit dosage form (e.g., in ampoules) or in multi-dose containers. Preservatives are, optionally, added to the injection formulations. In still other embodiments, the pharmaceutical compositions are formulated in a form suitable for parenteral injection as sterile suspensions, solutions or emulsions in oily or aqueous vehicles. Parenteral injection formulations optionally contain formulatory agents such as suspending, stabilizing and/or dispersing agents. In specific embodiments, pharmaceutical formulations for parenteral administration include aqueous solutions of the active compounds in water-soluble form. In additional embodiments, a suspension of an active compound or compounds (e.g., compounds of Formula (I) are prepared as appropriate oily injection suspensions. Suitable lipophilic solvents or vehicles for use in the pharmaceutical compositions described herein include, by way of example only, fatty oils such as sesame oil, or synthetic fatty acid esters, such as ethyl oleate or triglycerides, or liposomes. In certain specific embodiments, aqueous injection suspensions contain substances which increase the viscosity of the suspension, such as sodium carboxymethyl cellulose, sorbitol, or dextran. Optionally, the suspension contains suitable stabilizers or agents which increase the solubility of the compounds to allow for the preparation of highly concentrated solutions. Alternatively, in other embodiments, the active ingredient is in powder form for constitution with a suitable vehicle, e.g., sterile pyrogen-free water, before use.

In still other embodiments, the compounds of Formula (I) are administered topically. The compounds described herein are formulated into a variety of topically administrable compositions, such as solutions, suspensions, lotions, gels, pastes, medicated sticks, balms, creams or ointments. Such pharmaceutical compositions optionally contain solubilizers, stabilizers, tonicity enhancing agents, buffers and preservatives.

In yet other embodiments, the compounds of Formula (I) are formulated for transdermal administration. In specific embodiments, transdermal formulations employ transdermal delivery devices and transdermal delivery patches and can be lipophilic emulsions or buffered, aqueous solutions, dissolved and/or dispersed in a polymer or an adhesive. In various embodiments, such patches are constructed for continuous, pulsatile, or on demand delivery of pharmaceutical agents. In additional embodiments, the transdermal delivery of the compounds of Formula (I) is accomplished by means of iontophoretic patches and the like. In certain embodiments, transdermal patches provide controlled delivery of the compounds of Formula (I). In specific embodiments, the rate of absorption is slowed by using rate-controlling membranes or by trapping the compound within a polymer matrix or gel. In alternative embodiments, absorption enhancers are used to increase absorption. Absorption enhancers or carriers include absorbable pharmaceutically acceptable solvents that assist passage through the skin. For example, in one embodiment, transdermal devices are in the form of a bandage comprising a backing member, a reservoir containing the compound optionally with carriers, optionally a rate controlling barrier to deliver the compound to the skin of the host at a controlled and predetermined rate over a prolonged period of time, and means to secure the device to the skin.

In other embodiments, the compounds of Formula (I) are formulated for administration by inhalation. Various forms suitable for administration by inhalation include, but are not limited to, aerosols, mists or powders. Pharmaceutical compositions of any of compound of Formula (I) are conveniently delivered in the form of an aerosol spray presentation from pressurized packs or a nebulizer, with the use of a suitable propellant (e.g., dichlorodifluoromethane, trichlorofluoromethane, dichlorotetrafluoroethane, carbon dioxide or other suitable gas). In specific embodiments, the dosage unit of a pressurized aerosol is determined by providing a valve to deliver a metered amount. In certain embodiments, capsules and cartridges of, such as, by way of example only, gelatin for use in an inhaler or insufflator is formulated containing a powder mix of the compound and a suitable powder base such as lactose or starch.

In still other embodiments, the compounds of Formula (I) are formulated in rectal compositions such as enemas, rectal gels, rectal foams, rectal aerosols, suppositories, jelly suppositories, or retention enemas, containing conventional suppository bases such as cocoa butter or other glycerides, as well as synthetic polymers such as polyvinylpyrrolidone, PEG, and the like. In suppository forms of the compositions, a low-melting wax such as, but not limited to, a mixture of fatty acid glycerides, optionally in combination with cocoa butter is first melted.

In certain embodiments, pharmaceutical compositions are formulated in any conventional manner using one or more physiologically acceptable carriers comprising excipients and auxiliaries which facilitate processing of the active compounds into preparations which can be used pharmaceutically. Proper formulation is dependent upon the route of administration chosen. Any pharmaceutically acceptable techniques, carriers, and excipients are optionally used as suitable. Pharmaceutical compositions comprising a compound of Formula (I) are manufactured in a conventional manner, such as, by way of example only, by means of conventional mixing, dissolving, granulating, dragee-making, levigating, emulsifying, encapsulating, entrapping or compression processes.

Pharmaceutical compositions include at least one pharmaceutically acceptable carrier, diluent or excipient and at least one compound of Formula (I), described herein as an active ingredient. The active ingredient may be in free-acid or free-base form, or in a pharmaceutically acceptable salt form. In addition, the methods and pharmaceutical compositions described herein include the use of N-oxides, crystalline forms (also known as polymorphs), as well as active metabolites of these compounds having the same type of activity. All tautomers of the compounds described herein are included within the scope of the compounds presented herein. Additionally, the compounds described herein encompass unsolvated as well as solvated forms with pharmaceutically acceptable solvents such as water, ethanol, and the like. The solvated forms of the compounds presented herein are also considered to be disclosed herein. In addition, the pharmaceutical compositions optionally include other medicinal or pharmaceutical agents, carriers, adjuvants, such as preserving, stabilizing, wetting or emulsifying agents, solution promoters, salts for regulating the osmotic pressure, buffers, and/or other therapeutically valuable substances.

Methods for the preparation of compositions comprising the compounds described herein include formulating the compounds with one or more inert, pharmaceutically acceptable excipients or carriers to form a solid, semi-solid or liquid. Solid compositions include, but are not limited to, powders, tablets, dispersible granules, capsules, cachets, and suppositories. Liquid compositions include solutions in which a compound is dissolved, emulsions comprising a compound, or a solution containing liposomes, micelles, or nanoparticles comprising a compound as disclosed herein. Semi-solid compositions include, but are not limited to, gels, suspensions and creams. The form of the pharmaceutical compositions described herein include liquid solutions or suspensions, solid forms suitable for solution or suspension in a liquid prior to use, or as emulsions. These compositions also optionally contain minor amounts of nontoxic, auxiliary substances, such as wetting or emulsifying agents, pH buffering agents, and so forth.

In some embodiments, pharmaceutical composition comprising at least one compound of Formula (I) illustratively takes the form of a liquid where the agents are present in solution, in suspension or both. Typically when the composition is administered as a solution or suspension a first portion of the agent is present in solution and a second portion of the agent is present in particulate form, in suspension in a liquid matrix. In some embodiments, a liquid composition includes a gel formulation. In other embodiments, the liquid composition is aqueous.

In certain embodiments, useful aqueous suspensions contain one or more polymers as suspending agents. Useful polymers include water-soluble polymers such as cellulosic polymers, e.g., hydroxypropyl methylcellulose, and water-insoluble polymers such as cross-linked carboxyl-containing polymers. Certain pharmaceutical compositions described herein comprise a mucoadhesive polymer, selected for example from carboxymethylcellulose, carbomer (acrylic acid polymer), poly(methylmethacrylate), polyacrylamide, polycarbophil, acrylic acid/butyl acrylate copolymer, sodium alginate and dextran.

Useful pharmaceutical compositions also, optionally, include solubilizing agents to aid in the solubility of a compound of Formula (I). The term "solubilizing agent" generally includes agents that result in formation of a micellar solution or a true solution of the agent. Certain acceptable nonionic surfactants, for example polysorbate 80, are useful as solubilizing agents. Examples include glycols, polyglycols, e.g., polyethylene glycol 400, and glycol ethers.

Furthermore, useful pharmaceutical compositions optionally include one or more pH adjusting agents or buffering agents, including acids such as acetic, boric, citric, lactic, phosphoric and hydrochloric acids; bases such as sodium hydroxide, sodium phosphate, sodium borate, sodium citrate, sodium acetate, sodium lactate and tris-hydroxymethylaminomethane; and buffers such as citrate/dextrose, sodium bicarbonate and ammonium chloride. Such acids, bases and buffers are included in an amount required to maintain pH of the composition in an acceptable range.

Additionally, useful compositions also, optionally, include one or more salts in an amount required to bring osmolality of the composition into an acceptable range. Such salts include those having sodium, potassium or ammonium cations and chloride, citrate, ascorbate, borate, phosphate, bicarbonate, sulfate, thiosulfate or bisulfite anions; suitable salts include sodium chloride, potassium chloride, sodium thiosulfate, sodium bisulfite and ammonium sulfate.

Other useful pharmaceutical compositions optionally include one or more preservatives to inhibit microbial activity. Suitable preservatives include mercury-containing substances such as merfen and thiomersal; stabilized chlorine dioxide; and quaternary ammonium compounds such as benzalkonium chloride, cetyltrimethylammonium bromide and cetylpyridinium chloride.

Still other useful compositions include one or more surfactants to enhance physical stability or for other purposes. Suitable nonionic surfactants include polyoxyethylene fatty acid glycerides and vegetable oils, e.g., polyoxyethylene (60) hydrogenated castor oil; and polyoxyethylene allylethers and alkylphenyl ethers, e.g., octoxynol 10, octoxynol 40.

Still other useful compositions include one or more antioxidants to enhance chemical stability where required. Suitable antioxidants include, by way of example only, ascorbic acid and sodium metabisulfite.

In certain embodiments, aqueous suspension compositions are packaged in single-dose non-reclosable containers. Alternatively, multiple-dose reclosable containers are used, in which case it is typical to include a preservative in the composition.

In alternative embodiments, other delivery systems for hydrophobic pharmaceutical compounds are employed. Liposomes and emulsions are examples of delivery vehicles or carriers useful herein. In certain embodiments, organic solvents such as N-methylpyrrolidone are also employed. In additional embodiments, the compounds described herein are delivered using a sustained-release system, such as semipermeable matrices of solid hydrophobic polymers containing the therapeutic agent. Various sustained-release materials are useful herein. In some embodiments, sustained-release capsules release the compounds for a few weeks up to over 100 days. Depending on the chemical nature and the biological stability of the therapeutic reagent, additional strategies for protein stabilization are employed.

In certain embodiments, the formulations described herein comprise one or more antioxidants, metal chelating agents, thiol containing compounds and/or other general stabilizing agents. Examples of such stabilizing agents, include, but are not limited to: (a) about 0.5% to about 2% w/v glycerol, (b) about 0.1% to about 1% w/v methionine, (c) about 0.1% to about 2% w/v monothioglycerol, (d) about 1 mM to about 10 mM EDTA, (e) about 0.01% to about 2% w/v ascorbic acid, (f) 0.003% to about 0.02% w/v polysorbate 80, (g) 0.001% to about 0.05% w/v. polysorbate 20, (h) arginine, (i) heparin, (j) dextran sulfate, (k) cyclodextrins, (l) pentosan polysulfate and other heparinoids, (m) divalent cations such as magnesium and zinc; or (n) combinations thereof.

In some embodiments, the concentration of the compound of Formula (I) provided in the pharmaceutical compositions of the present disclosure is less than 100%, 90%, 80%, 70%, 60%, 50%, 40%, 30%, 20%, 19%, 18%, 17%, 16%, 15%, 14%, 13%, 12%, 11%, 10%, 9%, 8%, 7%, 6%, 5%, 4%, 3%, 2%, 1%, 0.5%, 0.4%, 0.3%, 0.2%, 0.1%, 0.09%, 0.08%, 0.07%, 0.06%, 0.05%, 0.04%, 0.03%, 0.02%, 0.01%, 0.009%, 0.008%, 0.007%, 0.006%, 0.005%, 0.004%, 0.003%, 0.002%, 0.001%, 0.0009%, 0.0008%, 0.0007%, 0.0006%, 0.0005%, 0.0004%, 0.0003%, 0.0002%, or 0.0001% w/w, w/v or v/v.

In some embodiments, the concentration of the compound of Formula (I) provided in the pharmaceutical compositions of the present disclosure is greater than 90%, 80%, 70%, 60%, 50%, 40%, 30%, 20%, 19.75%, 19.50%, 19.25% 19%, 18.75%, 18.50%, 18.25% 18%, 17.75%, 17.50%, 17.25% 17%, 16.75%, 16.50%, 16.25% 16%, 15.75%, 15.50%, 15.25% 15%, 14.75%, 14.50%, 14.25% 14%, 13.75%, 13.50%, 13.25% 13%, 12.75%, 12.50%, 12.25% 12%, 11.75%, 11.50%, 11.25% 11%, 10.75%, 10.50%, 10.25% 10%, 9.75%, 9.50%, 9.25% 9%, 8.75%, 8.50%, 8.25% 8%, 7.75%, 7.50%, 7.25% 7%, 6.75%, 6.50%, 6.25% 6%, 5.75%, 5.50%, 5.25% 5%, 4.75%, 4.50%, 4.25%, 4%, 3.75%, 3.50%, 3.25%, 3%, 2.75%, 2.50%, 2.25%, 2%, 1.75%, 1.50, 125%, 1%, 0.5%, 0.4%, 0.3%, 0.2%, 0.1%, 0.09%, 0.08%, 0.07%, 0.06%, 0.05%, 0.04%, 0.03%, 0.02%, 0.01%, 0.009%, 0.008%, 0.007%, 0.006%, 0.005%, 0.004%, 0.003%, 0.002%, 0.001%, 0.0009%, 0.0008%, 0.0007%, 0.0006%, 0.0005%, 0.0004%, 0.0003%, 0.0002%, or 0.0001% w/w, w/v, or v/v.

In some embodiments, the concentration of the compound of Formula (I) provided in the pharmaceutical compositions of the present disclosure is in the range from approximately 0.0001% to approximately 50%, approximately 0.001% to approximately 40%, approximately 0.01% to approximately 30%, approximately 0.02% to approximately 29%, approximately 0.03% to approximately 28%, approximately 0.04% to approximately 27%, approximately 0.05% to approximately 26%, approximately 0.06% to approximately 25%, approximately 0.07% to approximately 24%, approximately 0.08% to approximately 23%, approximately 0.09% to approximately 22%, approximately 0.1% to approximately 21%, approximately 0.2% to approximately 20%, approximately 0.3% to approximately 19%, approximately 0.4% to approximately 18%, approximately 0.5% to approximately 17%, approximately 0.6% to approximately 16%, approximately 0.7% to approximately 15%, approximately 0.8% to approximately 14%, approximately 0.9% to approximately 12%, approximately 1% to approximately 10% w/w, w/v or v/v.

In some embodiments, the concentration of the compound of Formula (I) provided in the pharmaceutical compositions of the present disclosure is in the range from approximately 0.001% to approximately 10%, approximately 0.01% to approximately 5%, approximately 0.02% to approximately 4.5%, approximately 0.03% to approximately 4%, approximately 0.04% to approximately 3.5%, approximately 0.05% to approximately 3%, approximately 0.06% to approximately 2.5%, approximately 0.07% to approximately 2%, approximately 0.08% to approximately 1.5%, approximately 0.09% to approximately 1%, approximately 0.1% to approximately 0.9% w/w, w/v or v/v.

In some embodiments, the amount the compound of Formula (I) provided in the pharmaceutical compositions of the present disclosure is equal to or less than 10 g, 9.5 g, 9.0 g, 8.5 g, 8.0 g, 7.5 g, 7.0 g, 6.5 g, 6.0 g, 5.5 g, 5.0 g, 4.5 g, 4.0 g, 3.5 g, 3.0 g, 2.5 g, 2.0 g, 1.5 g, 1.0 g, 0.95 g, 0.9 g, 0.85 g, 0.8 g, 0.75 g, 0.7 g, 0.65 g, 0.6 g, 0.55 g, 0.5 g, 0.45 g, 0.4 g, 0.35 g, 0.3 g, 0.25 g, 0.2 g, 0.15 g, 0.1 g, 0.09 g, 0.08 g, 0.07 g, 0.06 g, 0.05 g, 0.04 g, 0.03 g, 0.02 g, 0.01 g, 0.009 g, 0.008 g, 0.007 g, 0.006 g, 0.005 g, 0.004 g, 0.003 g, 0.002 g, 0.001 g, 0.0009 g, 0.0008 g, 0.0007 g, 0.0006 g, 0.0005 g, 0.0004 g, 0.0003 g, 0.0002 g, or 0.0001 g.

In some embodiments, the amount of the compound of Formula (I) provided in the pharmaceutical compositions of the present disclosure is more than 0.0001 g, 0.0002 g, 0.0003 g, 0.0004 g, 0.0005 g, 0.0006 g, 0.0007 g, 0.0008 g, 0.0009 g, 0.001 g, 0.0015 g, 0.002 g, 0.0025 g, 0.003 g, 0.0035 g, 0.004 g, 0.0045 g, 0.005 g, 0.0055 g, 0.006 g, 0.0065 g, 0.007 g, 0.0075 g, 0.008 g, 0.0085 g, 0.009 g, 0.0095 g, 0.01 g, 0.015 g, 0.02 g, 0.025 g, 0.03 g, 0.035 g, 0.04 g, 0.045 g, 0.05 g, 0.055 g, 0.06 g, 0.065 g, 0.07 g, 0.075 g, 0.08 g, 0.085 g, 0.09 g, 0.095 g, 0.1 g, 0.15 g, 0.2 g, 0.25 g, 0.3 g, 0.35 g, 0.4 g, 0.45 g, 0.5 g, 0.55 g, 0.6 g, 0.65 g, 0.7 g, 0.75 g, 0.8 g, 0.85 g, 0.9 g, 0.95 g, 1 g, 1.5 g, 2 g, 2.5, 3 g, 3.5, 4 g, 4.5 g, 5 g, 5.5 g, 6 g, 6.5 g, 7 g, 7.5 g, 8 g, 8.5 g, 9 g, 9.5 g, or 10 g.

In some embodiments, the amount of the compound of Formula (I) provided in the pharmaceutical compositions of the present disclosure is in the range of 0.0001-10 g, 0.0005-9 g, 0.001-8 g, 0.005-7 g, 0.01-6 g, 0.05-5 g, 0.1-4 g, 0.5-4 g, or 1-3 g.

Kits/Articles of Manufacture

For use in the therapeutic applications described herein, kits and articles of manufacture are also provided. In some embodiments, such kits comprise a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. The containers are formed from a variety of materials such as glass or plastic.

The articles of manufacture provided herein contain packaging materials. Packaging materials for use in packaging pharmaceutical products include those found in, e.g., U.S. Pat. Nos. 5,323,907, 5,052,558 and 5,033,252. Examples of pharmaceutical packaging materials include, but are not limited to, blister packs, bottles, tubes, inhalers, pumps, bags, vials, containers, syringes, bottles, and any packaging material suitable for a selected formulation and intended mode of administration and treatment. For example, the container(s) includes one or more compounds described herein, optionally in a composition or in combination with another agent as disclosed herein. The container(s) optionally have a sterile access port (for example the container is an intravenous solution bag or a vial having a stopper pierceable by a hypodermic injection needle). Such kits optionally comprise a compound with an identifying description or label or instructions relating to its use in the methods described herein.

For example, a kit typically includes one or more additional containers, each with one or more of various materials (such as reagents, optionally in concentrated form, and/or devices) desirable from a commercial and user standpoint for use of a compound described herein. Non-limiting examples of such materials include, but not limited to, buffers, diluents, filters, needles, syringes; carrier, package, container, vial and/or tube labels listing contents and/or instructions for use, and package inserts with instructions for use. A set of instructions will also typically be included. A label is optionally on or associated with the container. For example, a label is on a container when letters, numbers or other characters forming the label are attached, molded or etched into the container itself, a label is associated with a container when it is present within a receptacle or carrier that also holds the container, e.g., as a package insert. In addition, a label is used to indicate that the contents are to be used for a specific therapeutic application. In addition, the label indicates directions for use of the contents, such as in the methods described herein. In certain embodiments, the pharmaceutical compositions are presented in a pack or dispenser device which contains one or more unit dosage forms containing a compound provided herein. The pack for example contains metal or plastic foil, such as a blister pack. Or, the pack or dispenser device is accompanied by instructions for administration. Or, the pack or dispenser is accompanied with a notice associated with the container in form prescribed by a governmental agency regulating the manufacture, use, or sale of pharmaceuticals, which notice is reflective of approval by the agency of the form of the drug for human or veterinary administration. Such notice, for example, is the labeling approved by the U.S. Food and Drug Administration for prescription drugs, or the approved product insert. In some embodiments, compositions containing a compound provided herein formulated in a compatible pharmaceutical carrier are prepared, placed in an appropriate container, and labeled for treatment of an indicated condition.

EXAMPLES

Example 1

Methods

Surface Plasmon Resonance (SPR) Screening of Monomeric αSyn

The binding of αSyn was evaluated on a set of 96 control ligands of defined physical chemical properties in order to optimize buffer composition, ligand surface density and αSyn concentration. Minimum background and maximal total signal was obtained using 900 nM αSyn protein in 25 mM Tris and 100 mM NaCl, pH 7.4. αSyn at 10× that of screen concentration was predominantly monomeric as measured by dynamic light scattering (DLS) (>99.9%, see Example 1 and FIG. 2).

Freshly diluted αSyn in screening buffer was centrifuged through a 100 kD cut-off filter, before incubation at room temperature on the arrays for up to 3 hours. Duplicate chips were run, with unique samples for the lead-like library and triplicate samples for the fragment library. Multiplicate SPR signals were averaged per compound. Compounds with standard deviation more than 0.5, or for which the purity before spotting or the saturation per spot was less than 80 percent were discarded.

Fibrillization assays. Prior to each aggregation assay, purified αSyn at 5 mg/mL was treated with 6M guanidine and dialyzed 36 hours in a 3500 MW cutoff Slide-A-lyzer with three changes of 20 mM sodium phosphate and 100 mM NaCl pH 7.4 buffer. αSyn was centrifuged at 130,000 g for 40 minutes in a Beckman Ultracentrifuge to remove seeding species and supernatant used for assays. For initial testing, 60 mM compound in DMSO was diluted to 300 μM in 0.5% DMSO and controls contained equivalent DMSO concentrations. Assay samples contained 20 μM Thioflavin T, filtered through a 0.45 μm Acrodisc filter prior to each assay, 70 μM αSyn in 20 mM sodium phosphate and 100 mM NaCl pH 7.4. One teflon bead, (0.125" PTFE, Grade 2 polished) was placed in each well of a 96 well black with clear bottom assay plate (Corning) in a total volume of 500 μL. The plate was sealed with Mylar and parafilm, placed at 37° C. in a Tecan F200Pro Plate Reader and shaken at an amplitude of 6 mm for 120 hours continuously except for a brief time during reading of the plate. Thioflavin T fluorescence was detected by excitation at 440 nm and reading emissions at 485 nm each 60 minutes throughout the assay. To generate αSyn seeds for the seeding assays, αSyn at 10 mg/mL was incubated with stirring at 43° C. for 24 hours followed by exhaustive sonication. 1% (by mass) of seeds were added to the fibrillization assay. Samples were plated in quadruplicate, and the replicates averaged for each experiment for plotted data. Data were analyzed in Excel using XL-fit sigmoidal model #600 and when normalized, comparing fluorescence values at 50 hours for compounds as a percentage of DMSO control.

Cellular Oligomerization Assay

H4 neuroglioma cells (HTB-148; ATCC) were passaged in DME containing 10% fetal calf serum (FCS). They were plated into 10 cm dishes at $7.5 \times 10^5$ cells per dish and the following day transfected with DNA and Fugene (Promega, Madison, WI) at a ratio of 3:1 with 7 μg each of Syn-Luc1 (S1) and Syn-Luc2 (S2) plasmids, which are also referred to as syn-hGluc(1) and syn-hGLuc(2) respectively (see Outeiro, T. F. et al. *Plos One* 3, e1867, incorporated herein by reference in entirety) and 3 μg of red firefly expressing plasmid (pCMV-Red firefly Luc, ThermoFisher, Waltham, MA) per dish according to the manufacturer's directions. S1 and S2 plasmids express αSyn containing split Gaussia luciferase with either the N-terminal fragment (S1) or C-terminal fragment (S2) attached to the C-terminus of αSyn. After 24 hours, the DNA containing media was removed and cells were fed fresh DME media containing 10% FCS. The following day, cells were plated into polyD-Lysine coated clear bottom white well 96 well plates at $1.5 \times 10^4$ cells per well in Opti-MEM without phenol red with penicillin and streptomycin. After 4 hours cells are treated with drugs and incubated for 20 hours. Gaussia luciferase activity was measured in the dark 0.1 sec after injection of 100 μl/well of 40 mM coelenterazine, substrate (NanoLight, Pinetop, AZ) using a 2 sec integration on a Veritas Microplate Luminometer (Promega, Madison, WI). The cells were subsequently assayed for red Firefly activity using the ONE-Glo™ Luciferase Assay System kit (Promega, Madison, WI) on a Spectramax M5 (Molecular Devices, San Jose, CA) plate reader as a normalization measure. 100 μl of media were also assayed for red firefly activity. The impact of compounds on H4 cell toxicity was assayed using the CytoTox-Glo kit (Promega, Madison, WI).

Phagocytosis Assay

A human neuroglioma H4 cell-derived cell line stably over-expressing αSyn from a tetracycline inducible promoter was generated using the tet inducible TRex system (Invitrogen division of Life Technologies) and grown in serum-free X-VIVO media (Lonza Group, Basel, Switzerland). Cells were seeded in 96-well plates at densities yielding 75 to 90% confluency during the phagocytosis assay. The next day, compound was added along with 5 μg/ml tetracycline to induce αSyn overexpression. Cells were cultured overnight and the next day were fed 4 μM red fluorescent beads (Invitrogen, Carlsbad, CA) for 90 minutes at a cell-to-bead ratio of 1:10. Plates were gently washed with 100 μl/well media twice, fixed and stained with HEMA3 (Thermo Fisher, Waltham, MA). Plates were dried overnight and read on an ArrayScan (Thermo Fisher, Waltham, MA). As the HEMA3 stain absorbs light, the internalized beads are less fluorescent than the outside beads. Tet/non-tet and 484228 samples were run on each plate.

Western Blotting

All materials were purchased from Invitrogen (Carlsbad, CA) unless stated otherwise. Cell from a 6 well dish were washed twice with PBS and lysed with 250 μl of RIPA Lysis buffer with protease and phosphatase inhibitors (Sigma, St. Louis, MO). Lysates were incubated on a shaker for 15 minutes at 4° C. and spun down for 15 min. at 10,000 g. Total protein concentrations were determined by BCA assay (Thermo Fisher, Waltham, MA). 1 ml of media was collected and incubated with protease and phosphatase inhibitors and 50 μl of Ni-agarose beads to collect the His-tagged αSyn (Qiagen, Hilden, Germany) for 2 hrs at 40 C. Beads were centrifuged and washed in PBS. Cell samples and pelleted beads from the media were placed into Bolt LDS (lithium dodecyl sulfate) sample buffer with 20% β-mercaptoethanol and boiled for 15 min. 5-15 μg of sample (cells) and an equivalent fraction of media were electrophoresed on Bolt 4-12% Bis-Tris Plus gels with Bolt MES SDS running buffer and the Precision Plus Protein Dual Color Standards (Biorad, Hercules, CA) molecular weight markers. After electrophoresis, the separated proteins were transferred onto a 0.2 μm pore size PVDF membrane for 90 minutes at 400 mA and 4° C. in Bolt Transfer Buffer using BioRad midi transfer chambers. Post-transfer, membranes were treated for 30 minutes with 0.4% PFA in PBS to enhance synuclein binding rinsed with water, stained with 0.1% Ponceau S in 5% acetic acid, rinsed with Phosphate Buffered Saline with Tween 20 (PBST), and blocked in Odyssey PBS Blocking Buffer (LI-COR, Lincoln, NE) for 1 hour at room temperature. Membranes were then incubated with primary antibody in Odyssey PBS Blocking Buffer with 0.1% Tween 20 overnight at 4° C. Purified mouse 5c12 antibody detecting total αSyn was diluted 1/1000, and mouse anti actin antibody clone AC15, (Sigma-Aldrich, St. Louis, MO) was diluted at 1/35,000. Membranes were then washed 4 times for 10 minutes in PBST and incubated with secondary antibody goat anti-mouse infra-red 800 (LI-COR, Lincoln, NE) diluted at 1/10 000 in Odyssey PBS Blocking Buffer with 0.2% Tween 20 followed by washing 4 times for 10 minutes in PBST. Membranes were scanned and quantitated using the Odyssey CLx Imaging System (LI-COR, Lincoln, NE). Actin and αSyn were visualized in the 800 nm fluorescent channel and the molecular weight markers visualized at 700 and images merged. In cases where the image is cut to remove irrelevant lanes, a bar is placed in the image.

Statistical Analysis Methods

Methods for the analyses of compound activity in the synuclein fibrillization assay are described elsewhere herein. Other statistical analyses were run using GraphPad Prism software as described. Multiple samples were compared using one-way ANOVA with Dunnett's and an alpha of 0.05. In analyzing percentage cell viability data by ANOVA, square root transformations were carried out to conform to ANOVA assumptions, and Tukey's post hoc test was used for multiple comparisons. In cases where two samples were used, t-tests with an alpha of 0.05 were used. General practice significance nomenclature was used (0.1234 (ns), 0.0332 (*), 0.0021 (), 0.0002 (*), <0.0001 (****) unless otherwise indicated.

Quality Control Analyses of αSyn Used for HT-CM-SPR Screening

Gel electrophoresis and DLS analyses were performed on the αSyn sample used for screening to ensure the integrity, purity and monomeric nature of the protein used in the screen. Multiple aliquots of the purified protein were frozen for single use and used for all analyses and all screening. The protein ran as one peak during the size exclusion chromatography used in the final purification step (data not shown). Electrophoresis in the presence of SDS indicates that αSyn was pure and runs predominantly as a full-length monomer (FIG. 1). To ensure that αSyn remained monomeric in the screen dynamic light scattering (DLS) analyses, a technique highly sensitive for the detection of the formation of higher order oligomers or aggregates, were performed on αSyn preparations under screening conditions and in parallel for each library screening experiment using freshly prepared αSyn. FIG. 2 shows volume corrected distributions of the protein in the screening buffer together with the peak properties (mean size/nm, peak area/% width) of the monomeric peak (peak 1). The DLS signals for αSyn were stable over 3 hours under assay conditions, the maximum incubation time on the microarray during screening and generation of oligomers or aggregates was not observed. The area graph of peak 1 reveals that >99.9% of the particle volumes could be attributed to monomeric αSyn at all times investigated. Therefore, the HT-CM-SPR screen was performed with monomeric αSyn and the signals obtained reflected binding of tethered compound to monomeric αSyn.

Protein Expression and Purification

α-Syn for HT-CM-SPR screen. αSyn labeled with $^{15}$N was purchased from rPeptide (Bogart, GA, USA), and monomeric αSyn further purified by size exclusion chromatography (SEC). The $^1$H-$^{15}$N protein ran as a single peak by SEC, which was collected and stored frozen in single use aliquots for use in all pre-screen analyses and in screening. $^1$H-$^{15}$N HSQC NMR of an aliquot of the purified protein verified that it showed the typical ensemble of αSyn conformations expected for monomeric synuclein. DLS and SDS-PAGE analyses also confirmed the monomeric nature of the $^1$H-$^{15}$N αSyn used for the screen.

α-Syn for the Fibrillization assay. Wildtype human αSyn was produced from a pET-21d plasmid (Millipore, Burlington, MA) in *E. coli* BL21(DE3) cells induced by addition of 1 mM isopropyl-β-D-1-galactopyranoside and incubated at 16° C. overnight. Cells were harvested by centrifugation at 4,000×g for 10 minutes and stored at −80° C. Frozen cells expressing αSyn protein were resuspended in 50 mM Tris, pH 7.5, 1 mM TCEP, 1 mM EDTA, and 1 mM L-Methionine and lysed using a microfluidizer. Lysate was centrifuged at 7000×g for 0.5 hours at 21° C. The supernatant was boiled in a water bath for 15 minutes, cooled on ice and centrifuged at 45,000 g for 30 min. The supernatant was filtered through a 0.2 μm Corning filter and subjected to ion exchange chromatography using a Capto ImpRes Q (GE Healthcare, Uppsala, Sweden) anion exchange (IEX) column at ambient temperature. The column was eluted with a gradient of 100 column volumes from 0 to 1M NaCl using an AKTA Explorer 100 Liquid Chromatography System (GE Healthcare, Uppsala, Sweden). Pure αSyn fractions were desalted to 50 mM KPO$_4$, pH 7.5 and 50 mM NaCl using PD-10 columns (GE Healthcare, Chicago, IL) and concentrated to 5 mg/mL or 10 mg/ml (3K MWCO, Amicon Ultra, Millipore, Burlington, MA).

DLS Analyses of αSyn

To confirm its monomeric state and to check the integrity of the protein, DLS measurements were performed with a Malvern Zetasizer Nano instrument. In order to remove high molecular weight impurities all buffers used in the DLS studies were filtered through a 20 nm filter and the concentrated αSyn stock, at 1.2 mg/ml in PBS, was filtered through a 100 kDa cut-off spin device. Prior to screening on library arrays the protein stock solution was freshly diluted down into the selected screening buffer to a concentration of 9 µM and amounts of monomeric/oligomeric species were monitored over the three hour course of the array experiments. From autocorrelation plots intensity and volume corrected plots were calculated.

SPR Screening of Monomeric αSyn

Chemical Microarrays: The construction of the arrays and their use for primary screening in drug discovery was described elsewhere. All 114,000 library compounds, the synthesis and QC of which was described before, were coupled to a flexible, long, hydrophilic thiol-linker. Upon pintool spotting, the linker-compound constructs were allowed to react covalently with maleimide moieties present in a mixed self-assembled monolayer (SAM) surface on the array surface. Eventually, a surface architecture consisting of glass/gold/SAM surface/covalently attached chemtag/immobilized ligands was achieved. The ligand density was adjusted by varying the ratio of maleimide-attached (anchor) thiols to unmodified (diluent) thiols in the mixed SAM. The optimized surface chemistry was designed to be resistant to nonspecific protein binding exhibiting only marginal background in the SPR screening experiments. Each microarray contained 9,216 sensor fields corresponding to different tethered sample spots on the array.

SPR Imaging of Chemical Microarrays: Intermolecular interactions during the HT-CM-SPR were detected by recording the shift in the wavelength dependent surface plasmon resonance (SPR) minima of the chemical microarrays upon αSyn binding. The microarrays were analyzed using NovAliX's (previously Graffinity Pharmaceuticals) in-house developed SPR Imager® instrument. The optical set-up in the instrument allowed illuminating the entire chip area with parallel light of defined incidence angle and wavelength via a high refractive index prism in a Kretschmann configuration. Reflection images of the chip were recorded by means of a cooled, low-noise CCD camera. While keeping the incidence angle of the incoming beam fixed, the wavelength was varied over a range covering the SPR resonance conditions for the given chip/prism combination. Recorded array images were deconvoluted by automatic spot finding routines and grey scale analysis. Plotting the reflectivity of the individual sensor areas versus the applied wavelength yielded 9,216 SPR minima for each microarray resulting from the excitation of Surface Plasmons associated with sample spots on the arrays. Binding of analytes to the immobilized library compounds altered the optical resonance conditions for the corresponding sensor fields. Differences from that of analyte free buffer were detected by monitoring (red) shifts of the wavelength dependent SPR minima with time. Additionally, bulk refractive index changes upon buffer exchange were taken into account by control spots distributed across the array. Typical incubation times of analytes on the arrays ranged from 15 minutes to 3 hours during which scans were recorded repeatedly. SPR signals were visualized in coloured 2D fingerprints for manual hit selection using JARRAY, NovAliX's proprietary software for visualizing chemical microarray data. Manual hit picking of individual library arrays was completed by detailed data mining performed across all screened arrays.

Hit selection: A software routine guided the hit selection process on the array level by fitting Gaussian functions to the SPR signal distribution and suggesting hit thresholds per array allowing removal of non-hits. A great deal is known about the interaction of library components tethered on the chip with other proteins from prior screens. Therefore, compounds showing promiscuous interactions (frequent binders identified to have hit >50% of screened targets) were excluded from initial hits to extract compounds with possibly higher target specificity. Compounds chosen for testing in functional assays were verified to be at least 85% pure, with most over 95% pure, as determined by liquid chromatography and mass spectrometry analyses. The following software was used to calculate parameters of hit compounds: Hivol for the calculation of the counts, Biobyte for the calculation of ClogP and Openbabel v. 2.3.1 for the calculation of TPSA.

Statistical Analysis of compound activity in Fibrillization assays. For the analyses of compound activity in the αSyn fibrillization assay, the relative fluorescence unit (RFU) data obtained from compounds were compared to those of DMSO, to identify those that are statistically different from DMSO at various time points. Each experiment contained 4 replicates of each compound and of DMSO control. To identify compounds with significantly different RFU from DMSO, results at hours 0, 3, 50, 60, 74, 82, and 112 were examined. A repeated measures analysis of variance was performed on logarithmic transformed data using a linear mixed effects model which included Compound, Time, Replicate (Compound) and Compound*Time. The covariance structure across time that minimized the corrected Akaike Information Criterion (AICC) was used and the Kenward and Roger method was used to determine the appropriate degrees of freedom. Each compound mean was compared to the DMSO mean using Bonferroni multiplicity adjusted t-tests. Statistical analyses were conducted using the MIXED procedure in SAS 9.1 (SAS Institute Inc. Cary, NC, USA). Statistical significance refers to p-value<0.05.

Dopaminergic Neuron Viability Assay

Primary midbrain cultures were prepared and dopaminergic neuronal viability in the presence and absence of αSyn was assessed as previously described and repeated herein. Primary midbrain cultures were prepared from embryonic day 17 embryos of Sprague-Dawley rats using methods reviewed and approved by the Purdue Animal Care and Use Committee as described previously. After dissection, the cells were plated into a poly-L-lysine-treated 48-well plate at a density of 163,500 cells per well. Four days later, the cells were treated with cytosine arabinofuranoside (AraC) (20 µM) for 48 hours to inhibit the growth of glial cells. The cultures were used for measurements of dopaminergic neuron viability at 7 days in vitro. Primary midbrain cultures were transduced with αSyn A53T adenovirus (MOI=10), in the absence or presence of ELN576755, as described previously. After 72 hours, the cells were incubated with fresh media with or without the compound for another 24 hours prior to immunocytochemical analysis, which was carried out as described previously. The cells were fixed, permeabilized, and blocked prior to an overnight treatment with two primary antibodies: a mouse monoclonal IgG specific for microtubule-associated protein 2 (MAP2) (1:500) and a rabbit polyclonal antibody specific for tyrosine hydroxylase (TH) (1:500). Next, the cells were treated with two secondary antibodies, goat anti-mouse IgG conjugated to AlexaFluor 594 (1:1000) and goat anti-rabbit IgG conjugated to AlexaFluor 488 (1:1000) for 1 hour. In order to determine the viability of dopaminergic neurons, MAP2- and TH-positive neurons were counted in 10 to 15 randomly chosen observation fields in a blinded manner using a Nikon TE2000-U inverted fluorescence microscope (Nikon Instruments, Melville NY) with a 20× objective. In the control conditions, and in conditions where the compound was neuroprotective, typically 500 to 1,300 MAP2-positive neurons were counted, a range that corresponds to 20 to 50 TH-positive neurons. The data were expressed as the ratio of the TH-positive neurons to the MAP2-positive neurons. Each experiment was repeated at least three times using embryonic midbrain cultures from different pregnant rats.

Example 2

Figure 3:
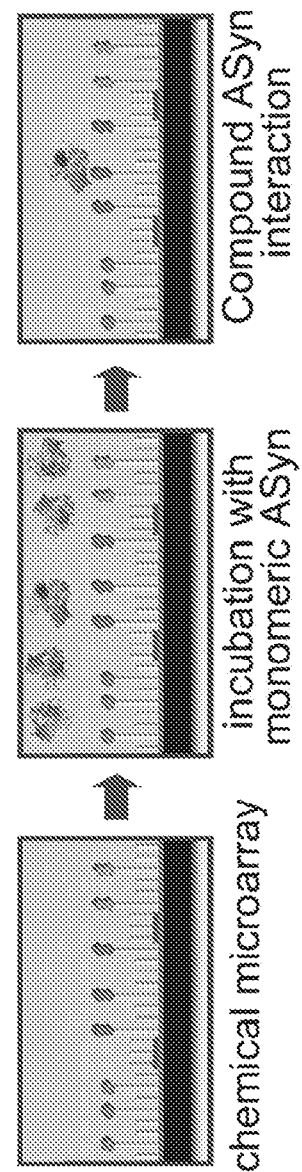
FIG. 3 shows the HT-CM-SPR process: Monomeric αSyn analyte floats over the array surface in screening buffer to allow binding events to occur. Surface Plasmon Resonance (SPR) imaging enables the detection of binding events.

Identification of Small Molecule Binders of ΔSyn by High-Throughput Chemical Microarray Surface Plasmon Resonance Imaging (HT-CM-SPR) Screening Monomeric αSyn was screened against a library of small molecules containing 91,000 lead-like and 23,000 fragment compounds immobilized on microarrays to identify small molecules binding to the protein using SPR imaging (HT-CM-SPR) (FIG. 3). An advantage of this chemical microarray paradigm is that αSyn is maintained in a soluble, monomeric, and label-free state enabling it to assume its heterogeneous conformational ensemble during screening. Moreover, the SPR-based detection is highly sensitive, which allows for identifying weak binding events.

Figure 2A:
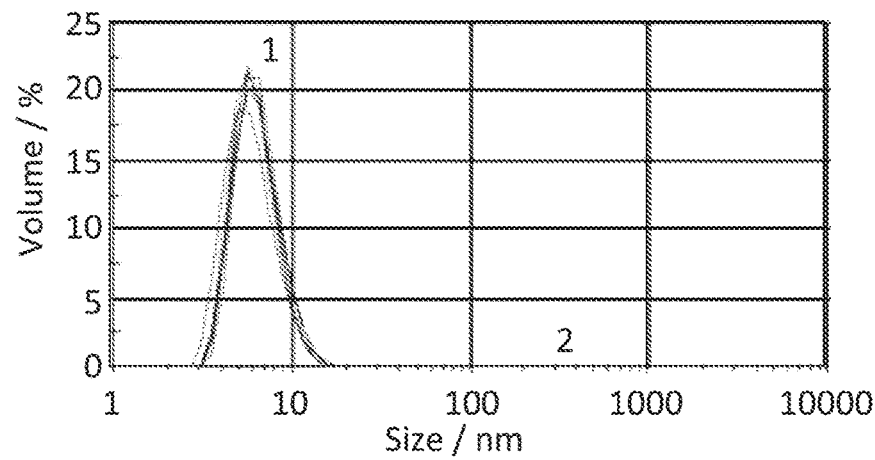
FIGS. 2A and 2B show dynamic light scattering (DLS) of αSyn used for HT-CM-SPR screen under assay conditions indicates monomeric structural state composition.
Figure 2B:
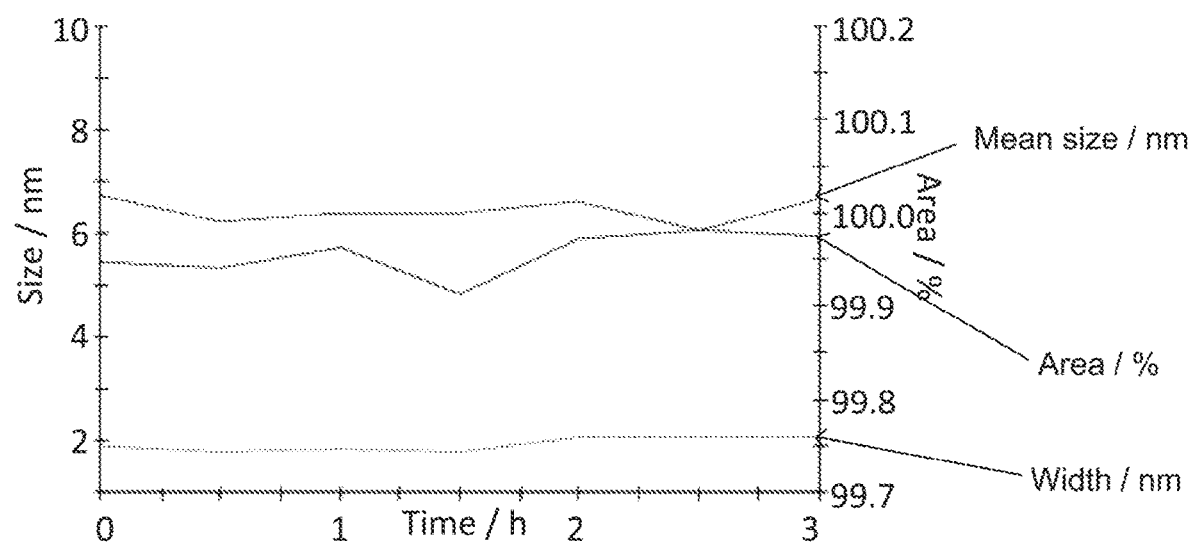

The monomeric nature of the αSyn was verified by dynamic light scattering (DLS), Nuclear Magnetic Resonance (NMR) and purity by electrophoretic analyses (FIGS. 1-2B). NMR $H^1$—$N^{15}$-HSQC analyses compared the commercially generated αSyn protein used in the screen to that prepared in-house using standard protocols for preparation of monomeric ensembles of αSyn and they showed identical spectra. To verify the monomeric nature of αSyn in the screen, DLS analyses were performed on αSyn preparations under screening conditions and in parallel for each library screening experiment using freshly prepared αSyn. αSyn stock solutions were shown to be free of aggregates with only very small (<0.1%) amounts of oligomers present. αSyn subjected to three-hour long incubations in screening buffer also remained monomeric (FIGS. 2A and 2B). In addition, there was no evidence of increasing SPR signal during the three hour screening, as would have been seen had the αSyn been oligomerizing on the microchip. Thus the detected SPR signal reflects the interactions between monomeric αSyn and the immobilized library.

Microarrays were incubated with αSyn under optimized conditions, imaged and subjected to hit selection as described in Example 1. Briefly, chips were incubated with monomeric αSyn under conditions optimizing signal and shown to maintain αSyn in its monomeric state (FIGS. 2A and 2B). On chips containing lead-like compounds based on combinatorial synthesis approaches, related library compounds are arrayed in rows and columns, with one unique copy per compound species present per physical microarray. Averaged SPR signals from replicate samples were filtered to remove outliers and JARRAY, NovAliX's proprietary software routine, guided hit selection.

The screen identified 563 immobilized hit compounds interacting with αSyn, corresponding to a hit rate of 0.49%. The signal strength and hit rate generally were lower than that of previously screened globular proteins, but comparable to those obtained for the screen on the tau protein with HT-CM-SPR. While for globular proteins of similar molecular weight to that of αSyn, signal to noise ratios of more than 10 were regularly obtained, for αSyn the signal to noise ratios ranged between 2 and 5. Nevertheless, as for the tau screen, hit compounds could be determined. Overall, hits included compounds which could be grouped into various compound classes and a number of structurally independent singleton compounds. 152 representative hits were selected out of the initial set of 563, based on parameters such as physicochemical properties, molecular weight, SPR signal strength, structural diversity, chemical tractability and overall attractiveness for drug development. This selected set contains structurally diverse and different lead-like and fragment-like compounds. Interestingly, a high number of positively charged and structurally different amines were identified. The molecular physicochemical properties indicate tractability for drug development of this compound set (Table 2 and Table 3). For further analysis of untethered hit compounds in follow-up assays, a subset of 65 compounds was selected for synthesis. This subset, the properties of which can also be found in Table 2, was chosen to cover chemical space of each structural class identified from the screen including singletons. All 65 compounds were synthesized devoid of the chemtag linker moiety, which was replaced with appropriate atoms/groups.

Table 2. Physico-chemical properties of hit compounds. Analysis of the physico-chemical properties for the 152 representative hit compounds selected from the initial pool of 563 hits identified by the HT-CM-SPR screen of monomeric αSyn, as well as for the 65 resynthesized compounds. For immobilization to the chip surface all library compounds were tethered to the chip via a linker group R. In order to calculate the ClogP, H-bond acceptor count, H-bond donor count, the count of rotatable bonds and TPSA (topological polar surface area) for the 152 array hits, this R-group was virtually replaced by a carbon. For the calculation of the molecular weight (MW) and Heavy Atom Count (HAC) the R group was replaced by a hydrogen atom. For the 65 resynthesized compounds, the linker group R at the attachment point at the compound was synthetically replaced by other groups such as methyl groups, which are included in the calculation of all properties.

TABLE 2

Physico-chemical properties of selected hits.

|  | 152 linked array hits | | | | 65 compounds resynthesized | | | |
| --- | --- | --- | --- | --- | --- | --- | --- | --- |
|  | Min | Max | Mean | Median | Min | Max | Mean | Median |
| MW (Da) | 150 | 499 | 340 | 338 | 151 | 488 | 325 | 336 |
| ClogP | −1.07 | 4.86 | 2.57 | 2.88 | −1.34 | 5.03 | 2.36 | 2.45 |
| #ACCEPTORS | 1 | 6 | 3.36 | 3 | 1 | 5 | 3.11 | 3 |
| #DONORS | 1 | 6 | 2.72 | 3 | 1 | 5 | 2.6 | 3 |
| #ROTBONDS | 1 | 10 | 5.97 | 6 | 1 | 10 | 5.46 | 5 |
| #RINGCOUNT | 1 | 5 | 2.66 | 3 | 1 | 4 | 2.54 | 2 |
| HAC | 11 | 35 | 24.21 | 24 | 11 | 34 | 23.22 | 24 |
| TPSA | 21 | 157 | 83.27 | 84 | 21 | 137 | 80.87 | 79 |

TABLE 3

Molecular weight distribution of 152 selected hits identified by the HT-CM-SPR of monomeric αSyn. Molecular weight calculated as for table 1.

| Molecular Weight Distribution | Number of hits |
| --- | --- |
| fragments < 250 Da | 13 |
| 250 Da < fragments < 300 Da | 31 |
| 300 Da < lead-like < 350 Da | 42 |
| 300 Da <lead-like < 400 Da | 39 |
| 400 Da < lead-like < 500 Da | 27 |

Example 3

Figure 4A:
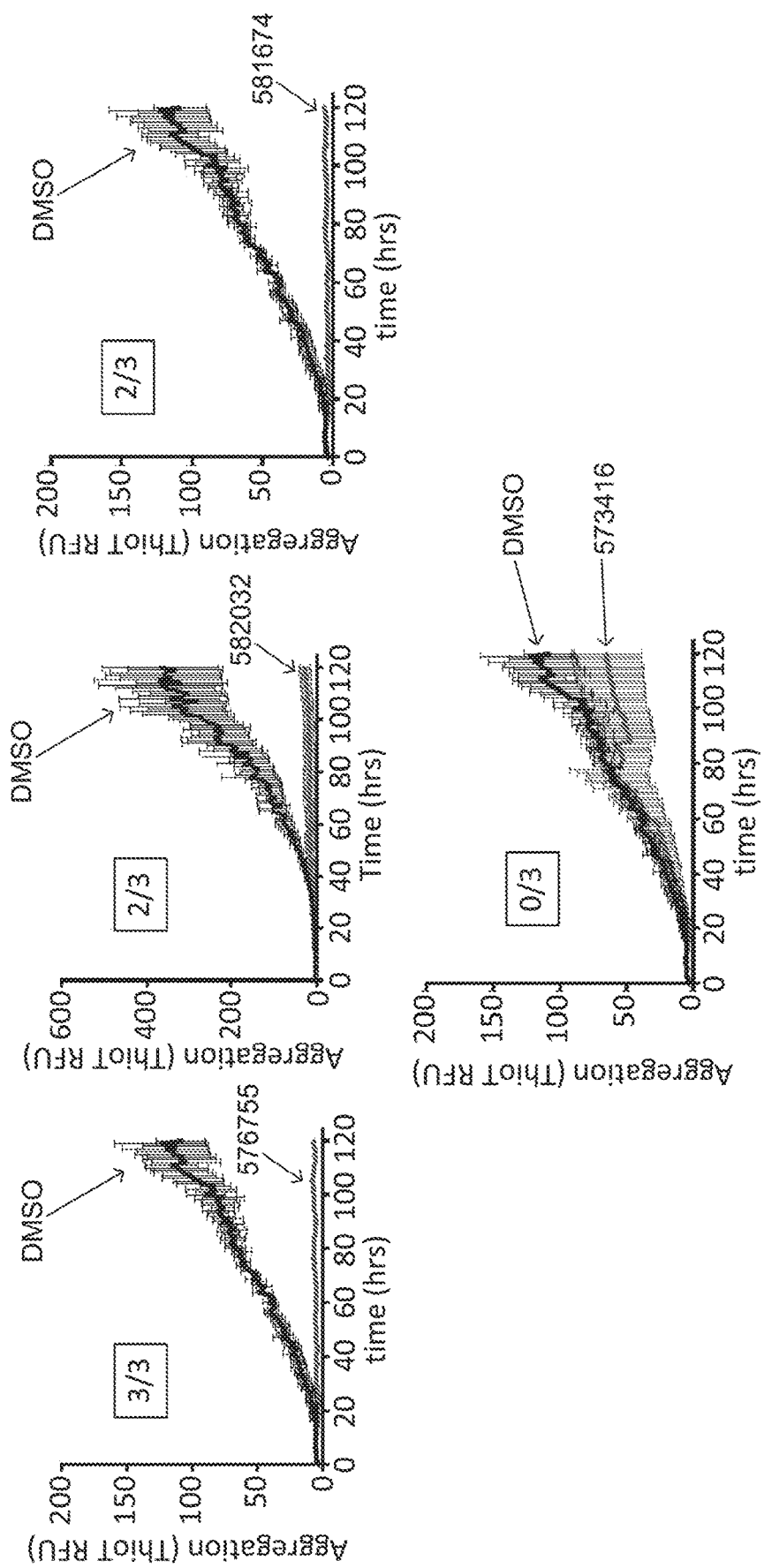
Figure 5:
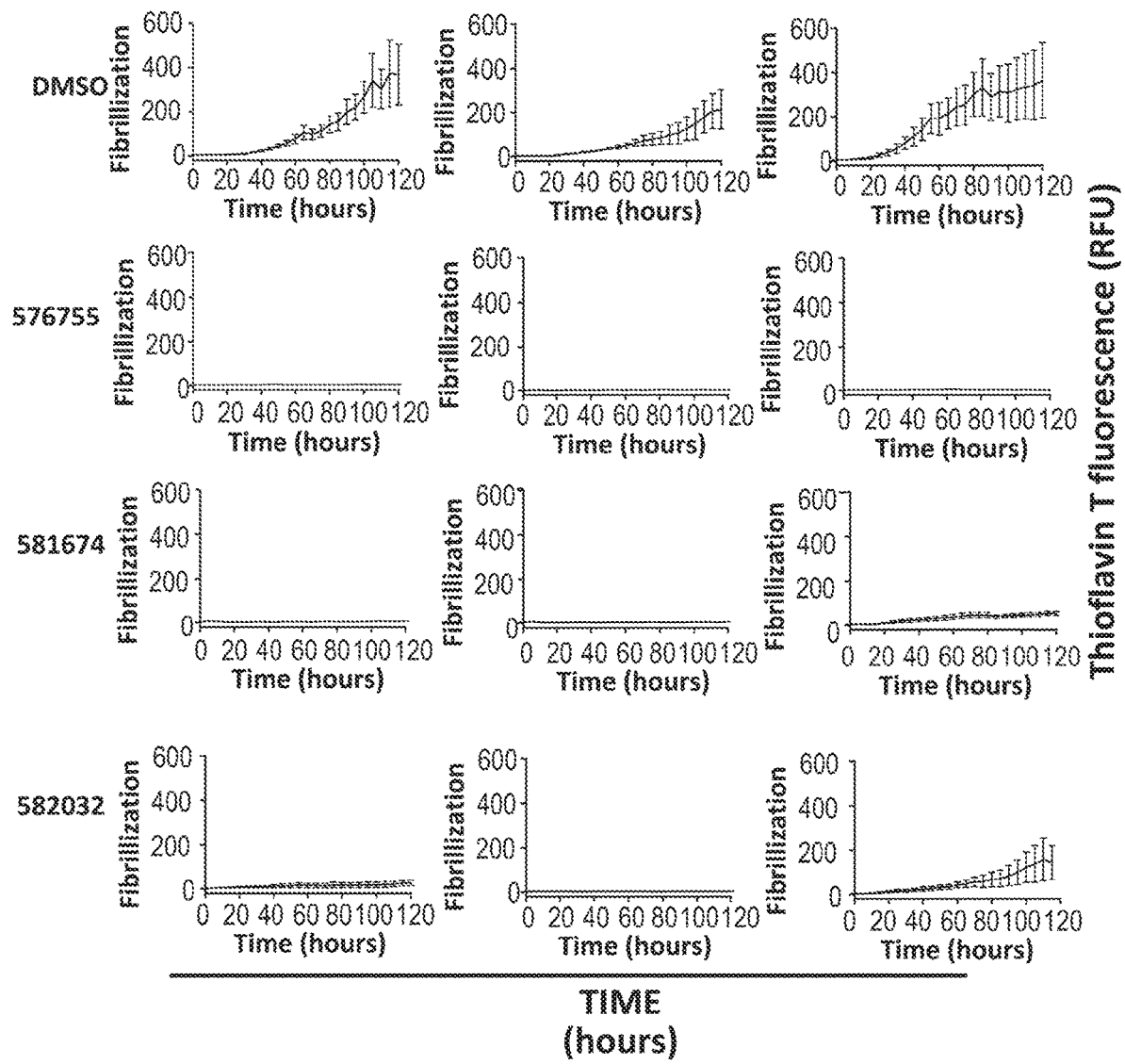
FIG. 5 shows individual aggregation plots of the anti-fibrillization compounds illustrated in FIG. 4A. RFU are relative fluorescence units.

Multiple Hit Compounds Inhibit αSyn Fibril Formation and One Blocks Cellular Oligomer Formation and Neurotoxicity Misfolding of αSyn can result in the formation of toxic oligomers and aggregated amyloid fibrils. Binding of small molecules to αSyn could block or enhance the transition of αSyn to β-sheet rich soluble oligomers and or fibrils depending on what conformation or sites are bound. Therefore, the synthesized hit compounds were screened in an αSyn aggregation assay, in which the fibril formation of the protein is monitored by Thioflavin T (ThT) fluorescence. Three compounds (576755, 581674 and 582032) were identified which inhibit fibrillization of αSyn (FIGS. 3A-3C). Shown in FIG. 4A for each compound are examples of three separate experiments with the average of quadruplicate samples at each time point (data from individual experiments are shown in FIG. 5). Statistical analyses as described in Example 1 were used to determine significance of differences between compound and DMSO control. For the experiments shown in FIG. 4A a significant difference from DMSO control was found for compound 576755 in 3 out of 3 experiments, and for compounds 581674 and 582032 in 2 out of 3 experiments shown with a trend to inhibition in the third experiment for these two compounds. Addition of compounds to ThT in the presence of preformed αSyn fibrils (FIG. 4B, seeded fibrillization) demonstrates that of these compounds only compound 576755 blocks fibrillization in this rapid and robust paradigm showing activity as early as 2 hours in the incubation (FIG. 4B). In addition to these experiments, 576755 was used as a control for over 30 synuclein fibrillization experiments and showed robust inhibition of aggregation in all assays (FIG. 4C).

Figure 6A:
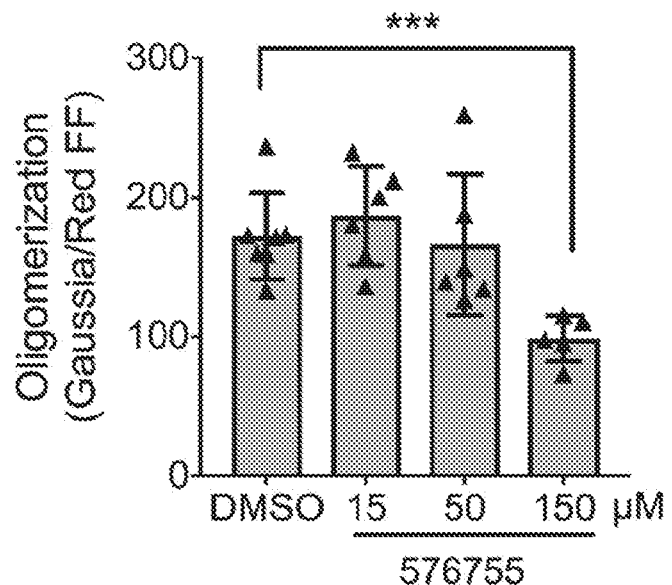
FIGS. 6A-6D show cellular activities of anti-fibrillization compound 576755.
Figure 6B:
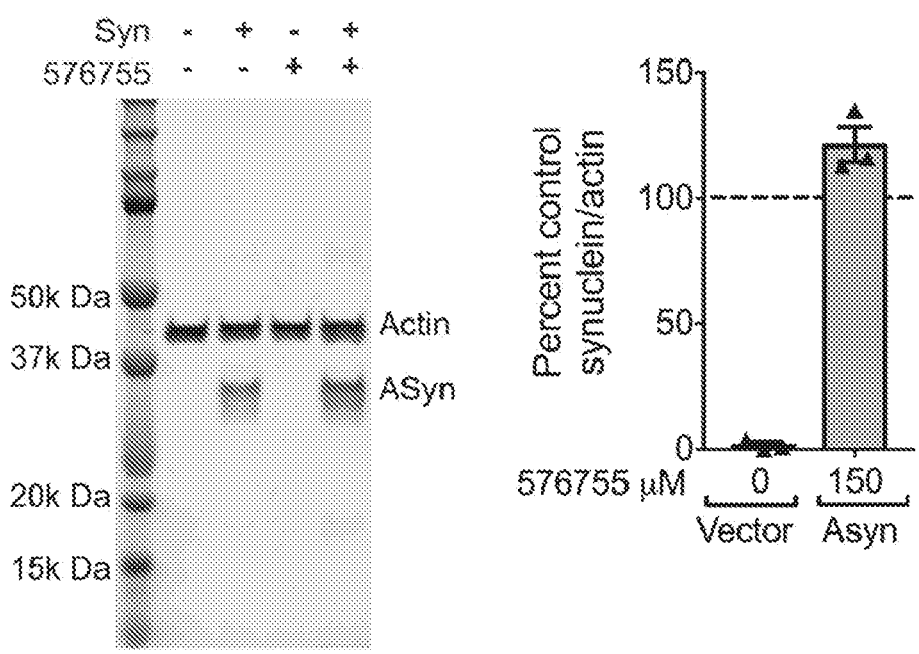
Figure 6C:
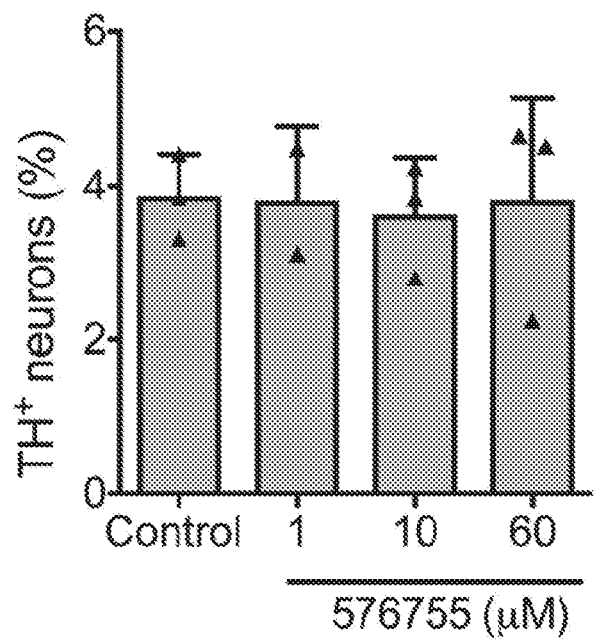
Figure 6D:
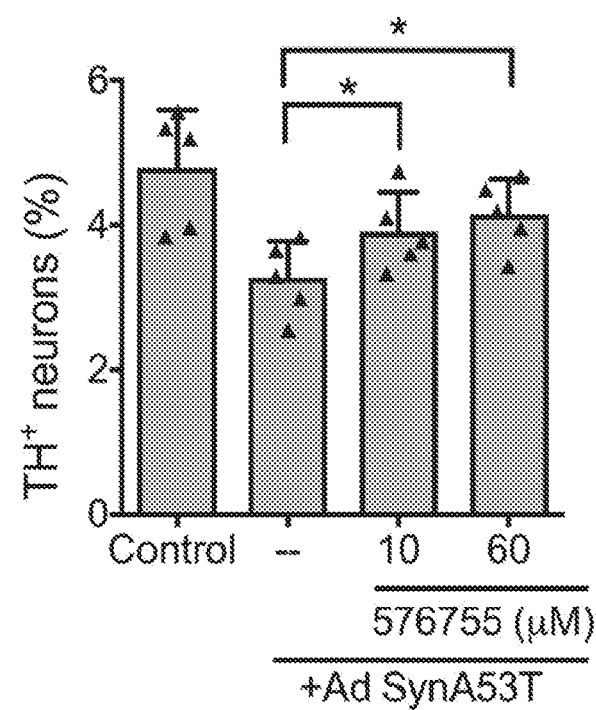

Compelling evidence supports pre-fibrillar αSyn oligomers as the pathogenic species in disease. αSyn oligomers are directly toxic to cells, and mutations enhancing αSyn oligomer formation increase αSyn toxicity. Therefore, the compound set was screened for impact on cellular αSyn oligomerization. Compounds were tested for toxicity in H4 neuroglioma cells at 10 to 200 μM and maximal concentrations not showing toxicity were tested for impact on αSyn oligomerization using a bioluminescent protein-fragment complementation assay. The only compound that reproducibly reduced cellular oligomers was 576755 (FIG. 6A). Western controls show no impact of 576755 on cellular αSyn protein levels (FIG. 6B). To test the effects of 576755 on αSyn-induced neurotoxicity, a primary midbrain culture model of PD was used. As a control, it was first established that there is no detectable toxic effect on primary dopaminergic neurons exposed to 60 μM 576755 alone (FIG. 6C). Transduction of the primary cultures with an adenovirus encoding A53T αSyn, a PD-linked genetic mutant found to form toxic oligomeric species more readily than the wild type protein, results in a 30-40% reduction in the number of TH-immunoreactive neurons (FIG. 6D). In contrast, transduction with a virus encoding the control protein LacZ has no effect on neuron viability. Treatment of the primary midbrain culture with 576755 at 60 μM, suppressed A53T αSyn neurotoxicity, and a trend towards a similar inhibitory effect was observed for cultures treated with the compound at 10 μM (FIG. 6D).

Example 4

Multiple Hit Compounds Reverse αSyn Mediated Inhibition of Vesicular Dynamics

Figure 7A:
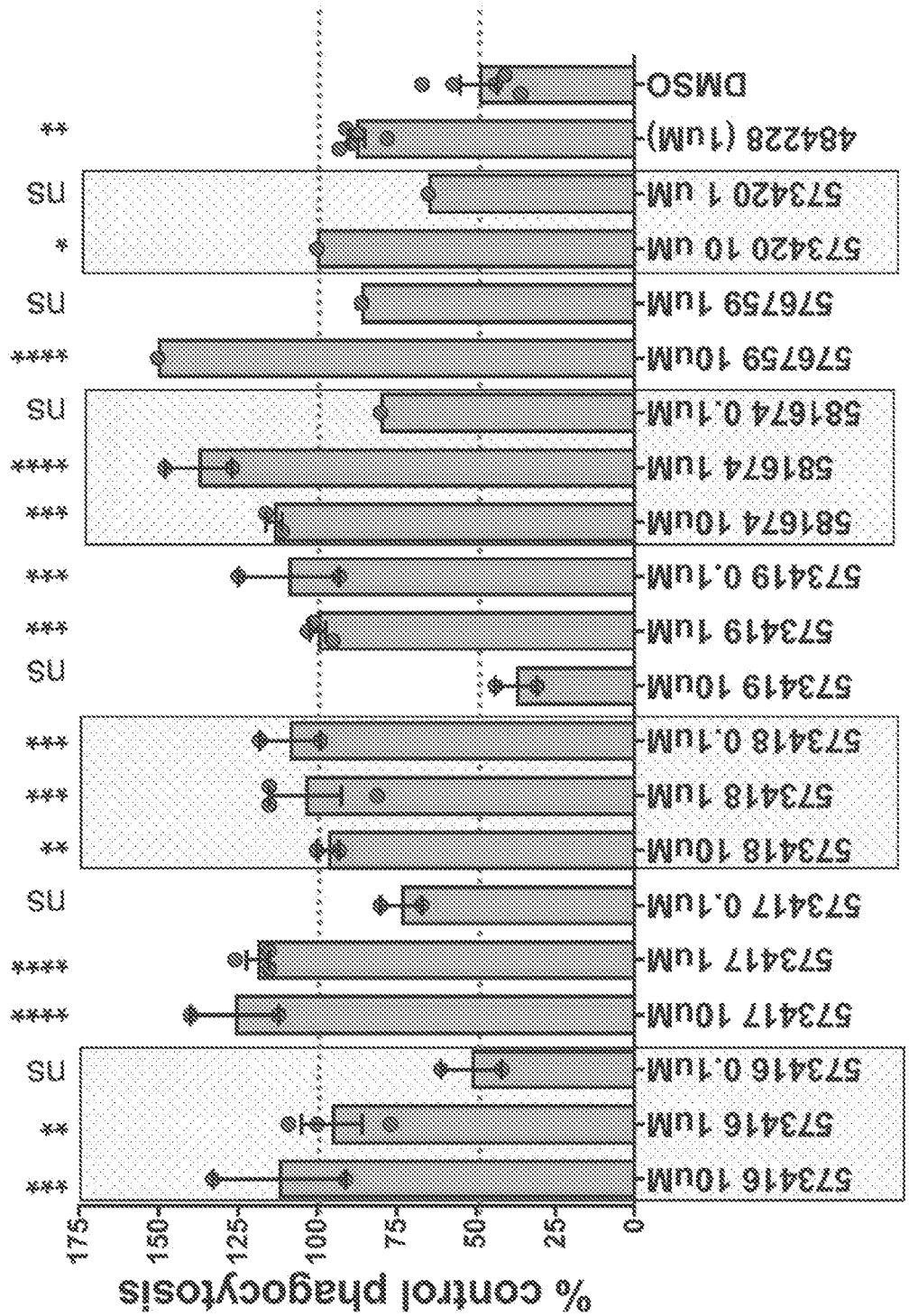
FIGS. 7A and 7B show multiple compounds from among the high-throughput screen (HTS) hits alleviate αSyn mediated inhibition of phagocytosis in H4-Neuroglioma cells.
Figure 7B:
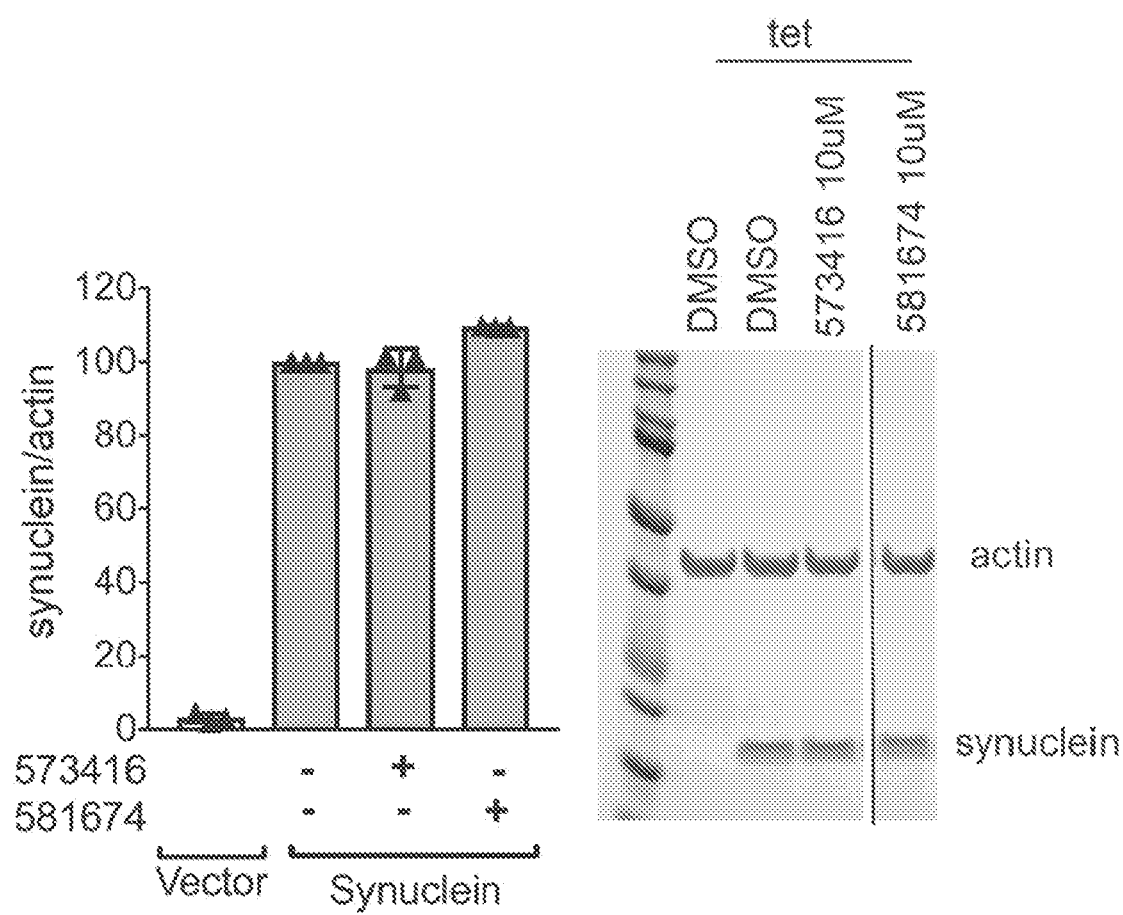
Figure 8:
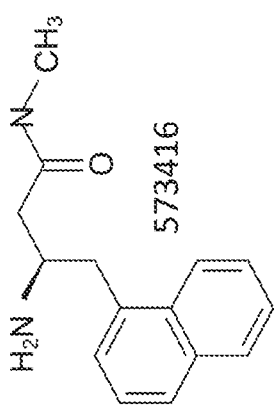
FIG. 8 shows certain phagocytosis restoring compounds.
Figure 8:
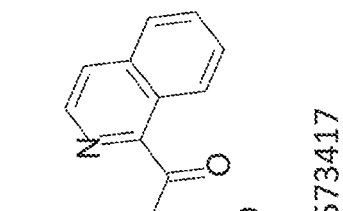
Figure 8:
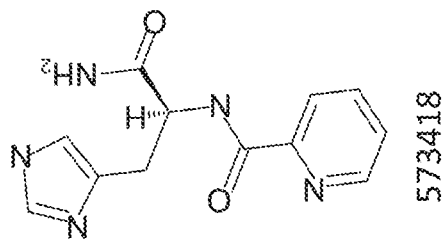
Figure 8:
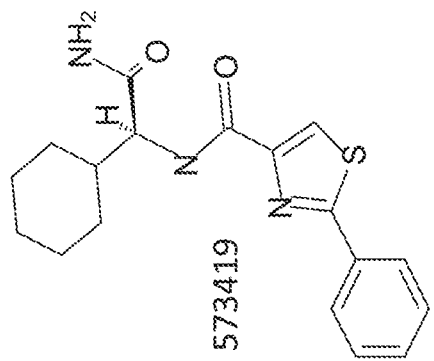
Figure 8:
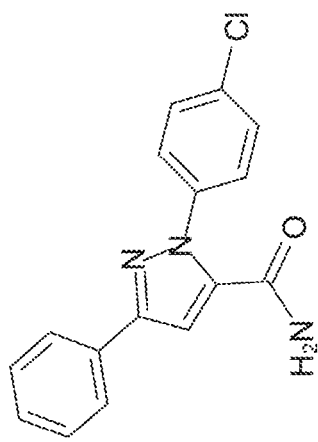
Figure 8:
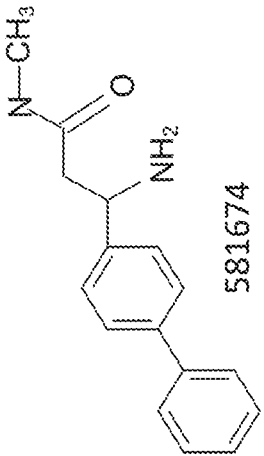
Figure 8:
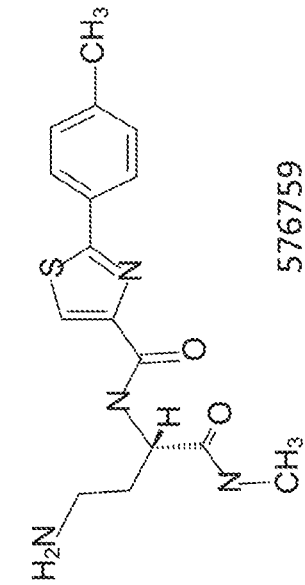

Elevated αSyn can interfere with the creation, localization, and/or maintenance of vesicle pools. It has been demonstrated that αSyn overexpression impairs phagocytosis in H4 neuroglioma cells, in primary microglia isolated from αSyn transgenic animals overexpressing αSyn and in cells from human PD patients, and further reported that an αSyn binding compound derived from an in silico screen, 484228, restored normal phagocytosis in the face of ongoing αSyn overexpression. Therefore, tests were performed to determine whether the αSyn binding hit compounds could protect against this αSyn over-expression induced dysfunction. The synthesized hit compounds were screened first for cellular toxicity at ranges from 1 μM to 100 μM; 53 compounds showing no toxicity at 1 μM in the absence of serum were subjected to further screening for their impact on phagocytosis in H4-neuroglioma cells overexpressing αSyn at two concentrations below that for which toxicity was seen. Seven compounds showed robust activity in reversing αSyn mediated inhibition of phagocytosis in H4-neurogloma cells in the initial screen. Five of these compounds were retested at 10 and 1 µM and 100 nM concentrations. All compounds showed complete reversal at either 1 µM or 10 µM and two compounds (573418, 573419) showed complete reversal at 100 nM (FIG. 7A). Western analyses demonstrates that none of these compounds alters αSyn protein levels (FIG. 7B).

Methods for the Phagocytosis assay are in Example 1.

Example 5

Discussion

In a prior study the inventors reported on a novel strategy to target monomeric αSyn by using a structure-based computational docking screening approach to identify small molecules predicted to bind to monomeric αSyn, and then testing their impact in diverse αSyn mediated biochemical and cellular assays. An advantage of this approach is its potential to identify compounds that have a variety of effects related to αSyn malfunction or misfolding. This effort identified one compound, 484228, which reversed the impairment of phagocytosis, dopaminergic neuronal loss and neurite retraction caused by overexpression of αSyn.

In order to expand upon this strategy, a biophysical-based binding screen was applied that used SPR technology to detect the interaction between a small molecule and native monomeric αSyn. The current screen identified over 500 hundred small molecules interacting with αSyn. It was further demonstrated that some of these compounds could beneficially impact αSyn malfunctions observed not only in aggregation assays, but also in multiple cellular malfunction assays. The anti-aggregation compound 576755 blocked cellular αSyn oligomer formation and protected dopaminergic neurons against αSyn toxicity. Compounds similar to 484228 were identified that reversed the impairment of phagocytosis by αSyn. Therefore, an expanded screen for compounds binding to monomeric αSyn yielded a variety of novel classes of compounds having different effects on αSyn mediated pathological processes.

There is ample evidence that links αSyn misfolding and aggregation to the onset and progression of PD. It is still unclear, however, which conformations of misfolded αSyn contribute most to pathogenicity. Prior screens for compounds modulating αSyn aggregation have relied on screening in aggregation assays, and many have yielded compounds that block aggregation in a non-specific manner mediated through polymeric self-stacked forms of the compounds or via reactive quinone formation which complicates translation into effective drugs. Although the most potent anti-aggregation compound, 576755, has quinone potential, two additional fibrillization blocking compounds without this liability were found in this screen. Using the novel oligomerization assays disclose herein in combination with the SPR-based screening, an oligomerization blocking compound was identified that lacked quinone potential. The biochemical bioluminescent protein complementation and FRET based αSyn oligomerization assays are a highly useful and novel assays in that they are amenable to high throughput screening and do not rely on shaking or detergents to accelerate αSyn oligomerization or aggregation. It was demonstrated that in the absence of shaking, the formation of αSyn fibrillar aggregates was not observed. This provides a clean assay for oligomerization reducing potential complications and artifacts produced by the formation of fibrils. The ability to identify anti-aggregation compounds with a fundamentally different screening paradigm—that of SPR-based screening using monomeric αSyn—allowed the identification of alternative compounds that inhibit aggregation. This will potentially expand the repertoire of anti-aggregation compounds to include compounds of novel and druggable mechanisms.

The role of αSyn in modulating vesicle dynamics in cells is well established, and there are links between αSyn toxicity and vesicular dysregulation. Phagocytosis, which involves both mobilization and extrusion of vesicles, is impaired by αSyn over-expression in cultured cells and in vivo in transgenic mice as well as in cells from Parkinson's patients, suggesting that this dysfunction is a relevant target for therapeutic intervention in PD. Based on previous use of 484228 as a control compound in scores of assays at high doses, 484228 has not been shown to restore phagocytosis inhibited by αSyn overexpression beyond 80 percent of that in cells with endogenous αSyn levels. Surprisingly, the compounds reported herein restore phagocytic capacity to 100 percent of control and thus are likely to act via mechanisms different than that of 484228. One of these compounds, 581674, also blocks αSyn fibrillization, suggesting that the interaction with αSyn of this compound impacts both fibrillization and vesicle dynamics via related mechanisms. Thus, the identification of multiple drug-like compounds with different scaffolds reversing αSyn impairment of phagocytosis expands upon the earlier results with compound 484228.

In conclusion, these results support the notion that the dynamic monomeric solution state of αSyn can be successfully targeted by drug-like small molecules to reverse PD relevant dysfunctions. The identification of small molecules impacting multiple types of αSyn malfunction demonstrates that targeting αSyn with screens employing ensembles of predominantly monomeric protein offers a rich and effective opportunity for drug discovery.

Example 6

Molecular Cloning:

Gaussia luciferase (GLuc) was split into two non-functional fragments: GLuc1 (residue 18-109) and GLuc2 (residue 110-185). Either GLuc1 or GLuc2 was fused to the C terminus of human αSyn with a flexible linker (IDGGGGSGGGGSSG; SEQ ID NO: 1) placed between αSyn and the GLuc tags. The expression vectors, pET28b-αSyn-GLuc1 (expressing protein αSyn-GLuc1) and pET28b-αSyn-GLuc2 (expressing protein αSyn-GLuc2) were constructed by inserting either coding regions into pET28b vector (Novagen) via NcoI/NotI sites in the multiple cloning site (MCS).

NanoBit luciferase (NLuc) was split and optimized into two fragments: LgBiT (N-terminal 158 residues); SmBiT (C-terminal 11 residues). Either LgBiT or SmBiT was fused to the C terminus of human αSyn with a flexible linker (GGGGSGGGGSSG; SEQ ID NO: 2) placed between αSyn and the NLuc tags. The expression vectors, pET28b-αSyn-LgBiT (expressing protein αSyn-LgBiT) and pET28b-αSyn-SmBiT (expressing protein αSyn-SmBiT) were constructed by inserting either coding regions into pET28b vector (Novagen) via NcoI/NotI sites in the MCS. The NanoBit fusion protein encoding DNA sequences are as follows:

αSyn-LgBiT fusion protein encoding
DNA sequence (including stop codon)
SEQ ID NO: 3
ATGGATGTATTCATGAAAGGACTTTCAAAGGCCAA

CGAGCGAGTTGTGGCTGCTGCTGAGAAAACCAAAC

AGGGTGTGGCAGAAGCAGCAGGAAAGACAAAAGAG

GGTGTTCTCTATGTAGGCTCCAAAACCAAGGAGGG

AGTGGTGCATGGTGTGGCAACAGTGGCTGAGAAGA

CCAAAGAGCAAGTGACAAATGTTGGAGGAGCAGTG

GTGACGGGTGTGACAGCAGTAGCCCAGAAGACAGT

GGAGGGAGCAGGGAGCATTGCAGCAGCCACTGGCT

TTGTCAAAAAGGACCAGTTGGGCAAGAATGAAGAA

GGAGCCCCACAGGAAGGAATTCTGGAAGATATGCC

TGTGGATCCTGACAATGAGGCTTATGAAATGCCTT

CTGAGGAAGGGTATCAAGACTACGAACCTGAAGCC

GGTGGTGGCGGGAGCGGAGGTGGAGGGTCGTCAGG

TGTCTTCACACTCGAAGATTTCGTTGGGGACTGGG

AACAGACAGCCGCCTACAACCTGGACCAAGTCCTT

GAACAGGGAGGTGTGTCCAGTTTGCTGCAGAATCT

CGCCGTGTCCGTAACTCCGATCCAAAGGATTGTCC

GGAGCGGTGAAAATGCCCTGAAGATCGACATCCAT

GTCATCATCCCGTATGAAGGTCTGAGCGCCGACCA

AATGGCCCAGATCGAAGAGGTGTTTAAGGTGGTGT

ACCCTGTGGATGATCATCACTTTAAGGTGATCCTG

CCCTATGGCACACTGGTAATCGACGGGGTTACGCC

GAACATGCTGAACTATTTCGGACGGCCGTATGAAG

GCATCGCCGTGTTCGACGGCAAAAAGATCACTGTA

ACAGGGACCCTGTGGAACGGCAACAAAATTATCGA

CGAGCGCCTGATCACCCCCGACGGCTCCATGCTGT

TCCGAGTAACCATCAACAGCGAAAACCTGTATTTT

CAGGGAGCGGCCGCACTCGAGCACCACCACCACCA

CCACTGA

αSyn-SmBiT fusion protein encoding
DNA sequence (including stop codon)
SEQ ID NO: 4
ATGGATGTATTCATGAAAGGACTTTCAAAGGCCAA

GGAGGGAGTTGTGGCTGCTGCTGAGAAAACCAAAC

AGGGTGTGGCAGAAGCAGCAGGAAAGACAAAAGAG

GGTGTTCTCTATGTAGGCTCCAAAACCAAGGAGGG

AGTGGTGCATGGTGTGGCAACAGTGGCTGAGAAGA

CCAAAGAGCAAGTGACAAATGTTGGAGGAGCAGTG

-continued
GTGACGGGTGTGACAGCAGTAGCCCAGAAGACAGT

GGAGGGAGCAGGGAGCATTGCAGCAGCCACTGGCT

TTGTCAAAAAGGACCAGTTGGGCAAGAATGAAGAA

GGAGCCCCACAGGAAGGAATTCTGGAAGATATGCC

TGTGGATCCTGACAATGAGGCTTATGAAATGCCTT

CTGAGGAAGGGTATCAAGACTACGAACCTGAAGCC

GGIGGTGGCGGGAGCGGAGGIGGAGGGTCGTCAGG

IGTGACCGGCTACCGGCTGTTCGAGGAGATTCTGG

AAAACCTGTATTTTCAGGGAGCGGCCGCACTCGAG

CACCACCACCACCACCACTGA

To derive cysteine (Cys) mutated versions of αSyn, the human αSyn coding region was amplified using Q5 High-Fidelity DNA Polymerase (NEB) and inserted into the NcoI/XhoI sites of the pET28b *E. coli* expression vector (Novagen). Single point mutations at positions 9, 38, 64, 99 or 143 to code for Cys were introduced into αSyn using a Q5 Site-Directed Mutagenesis Kit (NEB). The resultant plasmids (e.g. pET28b-αSyn-Q99C for the position 99 plasmid expressing protein αSyn-Q99C) were used for the recombinant protein expression.

Protein Expression:

BL21(DE3) *E. coli* cells were transformed by desired plasmids and cultured in LB media at 37° C. At $OD_{600}$ 0.6-0.8, the culture temperature was lowered to 20° C. and IPTG (GoldBio) was added to a final concentration of 0.5 mM to induce protein expression and cultures incubated at 20° C. overnight. The cells were harvested by centrifugation at 4,000 g for 20 minutes in an Avanti J-26 XPI centrifuge (Beckman Coulter) with a JLA 8.1000 rotor (Beckman Coulter).

Protein Purification (αSyn-GLuc1, αSyn-GLuc2, αSyn-LgBiT):

Plasmid transformed *E coli* cells were resuspended in 25 mM Tris, 500 mM NaCl, 0.5 mM TCEP, pH 8.0 and then lysed in EmulsiFlex-C3 (Avestin) in the presence of EDTA-free Protease Inhibitor Cocktail (Roche). The lysate was cleared by centrifugation at 30,000 g for 30 minutes in a JA 25.50 rotor (Beckman Coulter). The His-tagged target protein was purified by Ni-NTA gravity-flow chromatography (Qiagen). The eluted protein was loaded onto MonoQ 10/100 GL (GE) chromatography and eluted with a 0-600 mM NaCl gradient. A final purification step was carried out using HiLoad 16/600 Superdex 200 chromatography (GE). The monomeric peak was collected and filtered through a 0.22 μm filter (E&K Scientific), flash frozen and stored at −80° C.

Protein Purification (αSyn-SmBiT and αSyn Mutants):

Plasmid transformed *E coli* cells were resuspended in 20 mM Tris, pH 8.0 and lysed by boiling for 30 minutes in the presence of EDTA-free Protease Inhibitor Cocktail (Roche). The lysate was cleared by centrifugation at 30,000 g for 30 minutes in a JA 25.50 rotor (Beckman Coulter). Streptomycin sulfate was added to the lysate at 10 mg/ml to precipitate DNA. After a 30 minutes incubation at 4° C., the lysate was cleared by centrifugation at 30,000 g for 30 minutes. Ammonium sulfate was added to the lysate to a final concentration of 0.36 g/ml to precipitate protein. After incubation at 4° C. overnight, the protein was pelleted by centrifugation at 30,000 g for 30 minutes. The protein was resuspended in 20 mM Tris, 1 mM DTT, pH 8.0, then subjected to MonoQ 10/100 GL (GE) chromatography eluting with 0-600 mM NaCl gradient. A final purification step was carried out using HiLoad 16/600 Superdex 200 chromatography (GE). The monomeric peak was collected and filtered through a 0.22 µm filter (E&K Scientific), flash frozen and stored at −80° C.

Example 7

αSyn Gaussia Luciferase Oligomerization Assay

First, a biochemical assay of αSyn oligomer formation was established using split Gaussia luciferase (GLuc) tags as has been used for cellular αSyn oligomerization detection.

Figure 9:
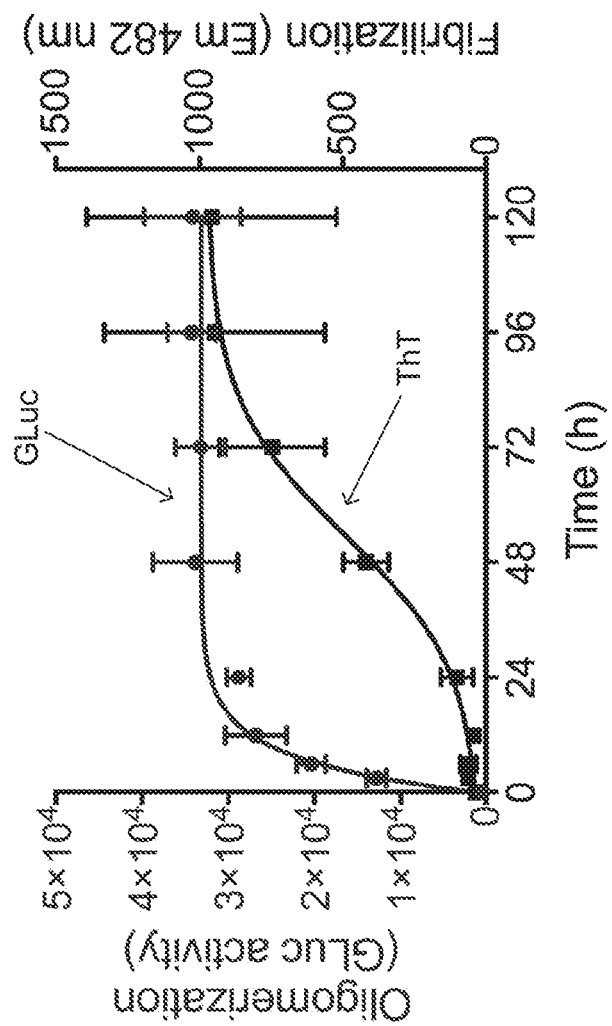
FIG. 9 shows an αSyn oligomerization split Gaussia luciferase (Gluc) assay compared to a fibrillization assay.
Figure 9:
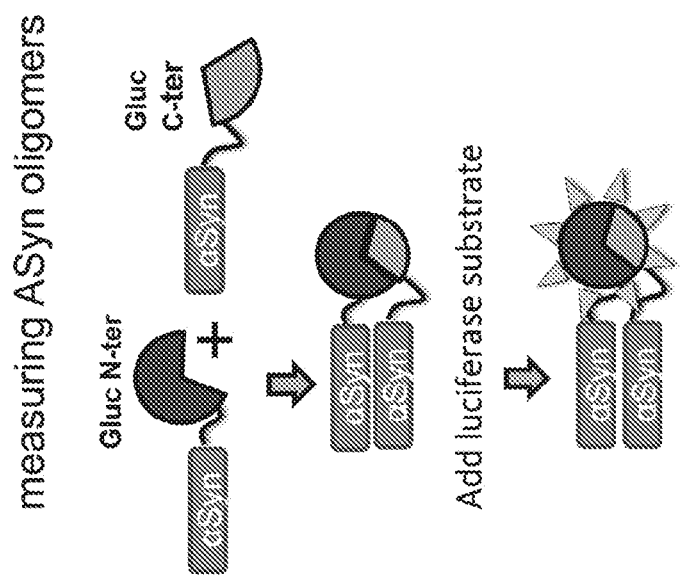
Figure 10A:
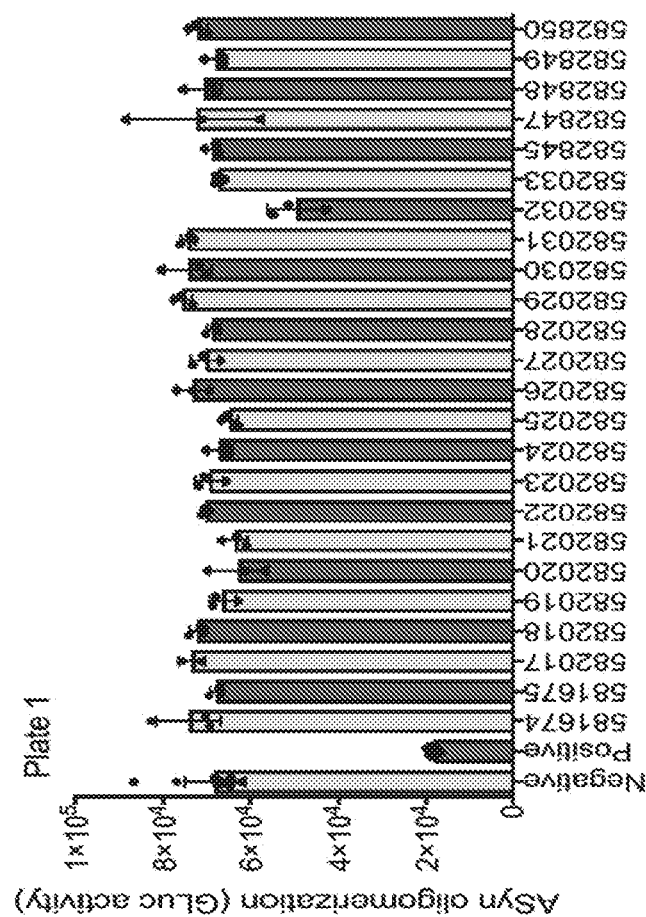
FIG. 10 shows a screen of 65 HT-CM-SPR compounds using the αSyn-GLuc complementation assay.
Figure 10A:
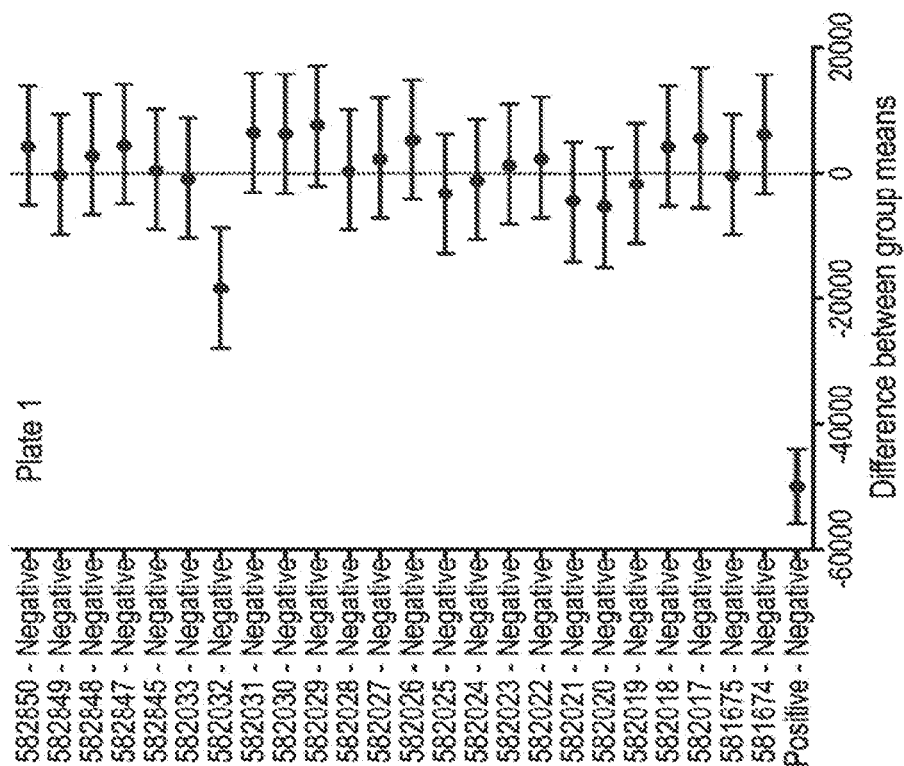
Figure 10B:
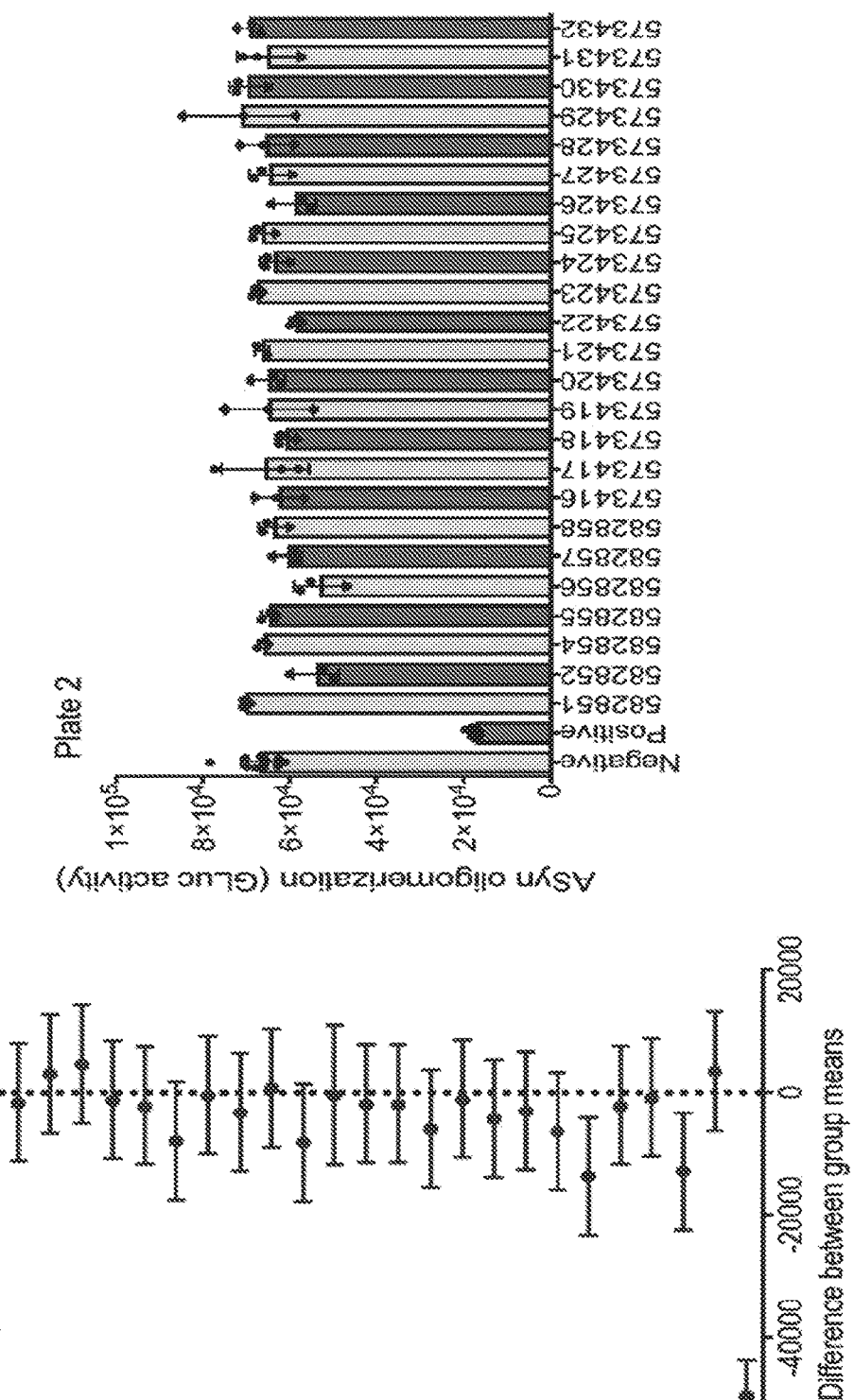
Figure 10C:
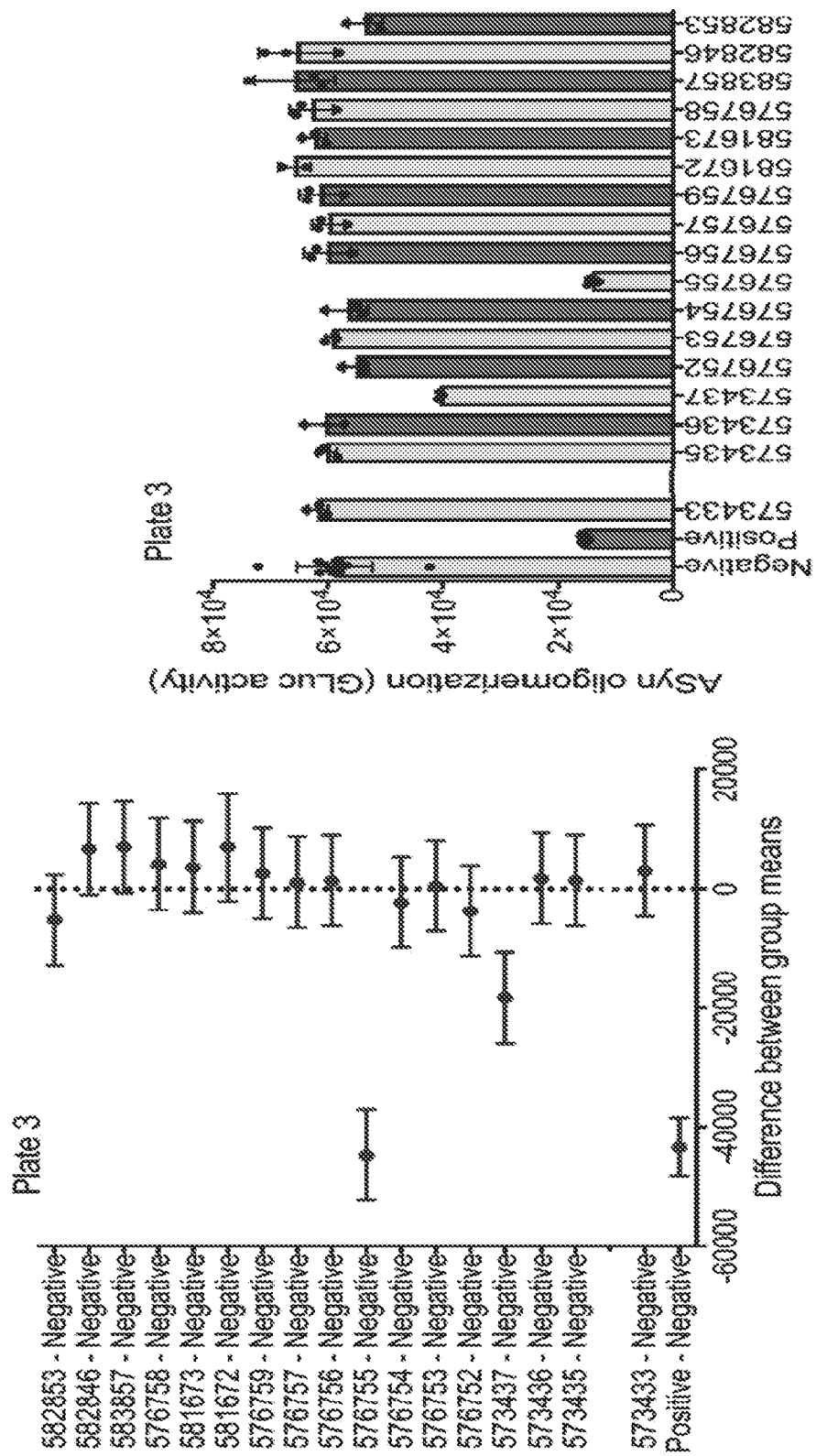

A mixture of purified αSyn fused at its C-terminus with either the N-Terminal or the C-terminal half of Gaussia luciferase was incubated and the formation of oligomers monitored by reconstituted luciferase activity (FIG. 9, GLuc). For comparison, fibrillization of αSyn was measured in parallel samples by measuring the fluorescence of the dye Thioflavin T (ThT) as is widely used in the field (FIG. 9, ThT). As expected for an early stage misfolding event, the formation of oligomers showed neither the lag phase nor the variability typically seen in the fibrillization assays. The αSyn-Split Gluc tags have been used to detect αSyn oligomerization in cell models via transfection and expression of DNA encoding αSyn fused to split Gluc tags, but it has not previously been used in a biochemical assay using purified proteins as shown here.

Figure 11:
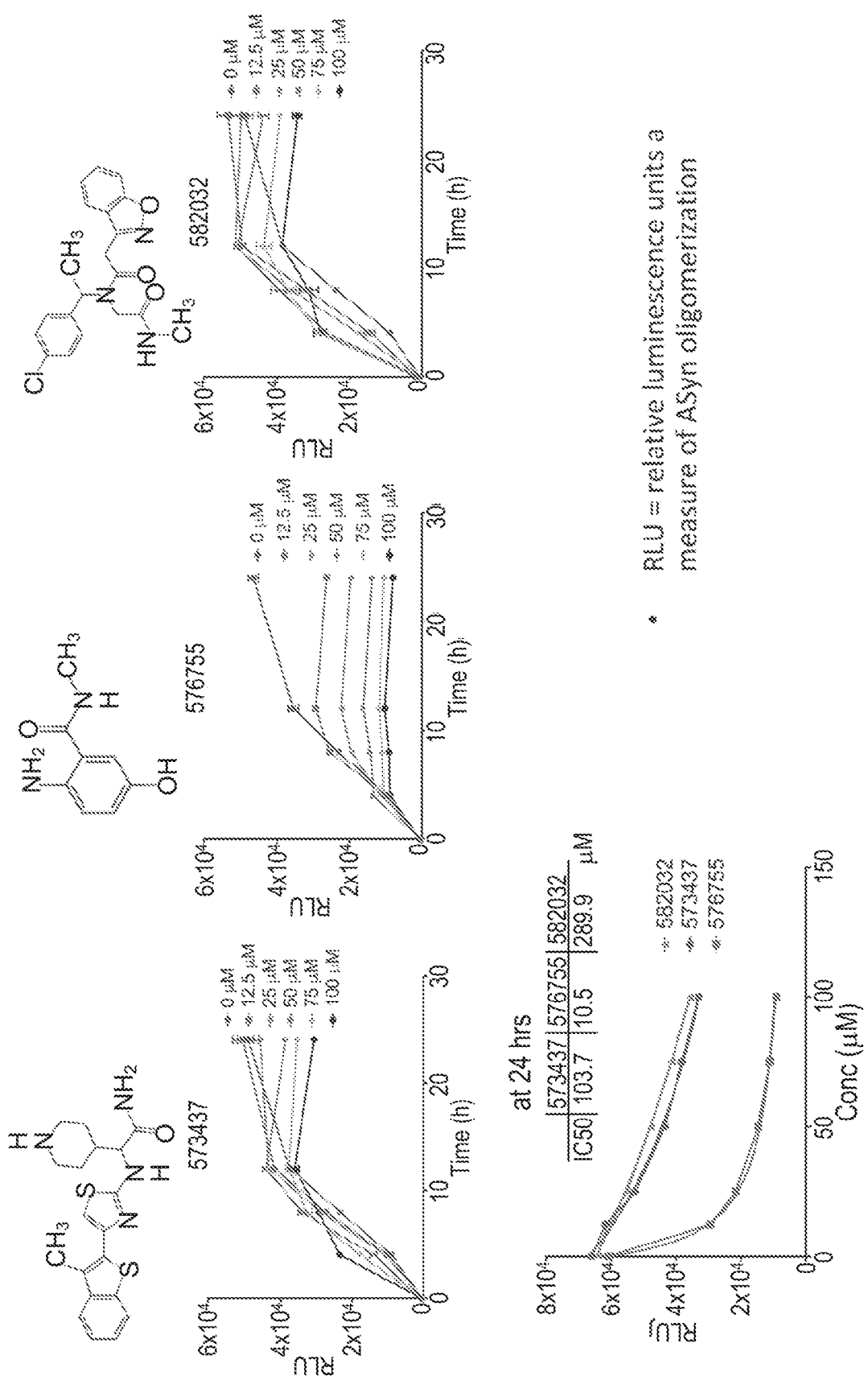
FIG. 11 shows compounds tested for activity in biochemical Gluc oligomerization assay. Three active compounds were identified. RLU=relative luminescence units as a measure of αSyn oligomerization.
Figure 12:
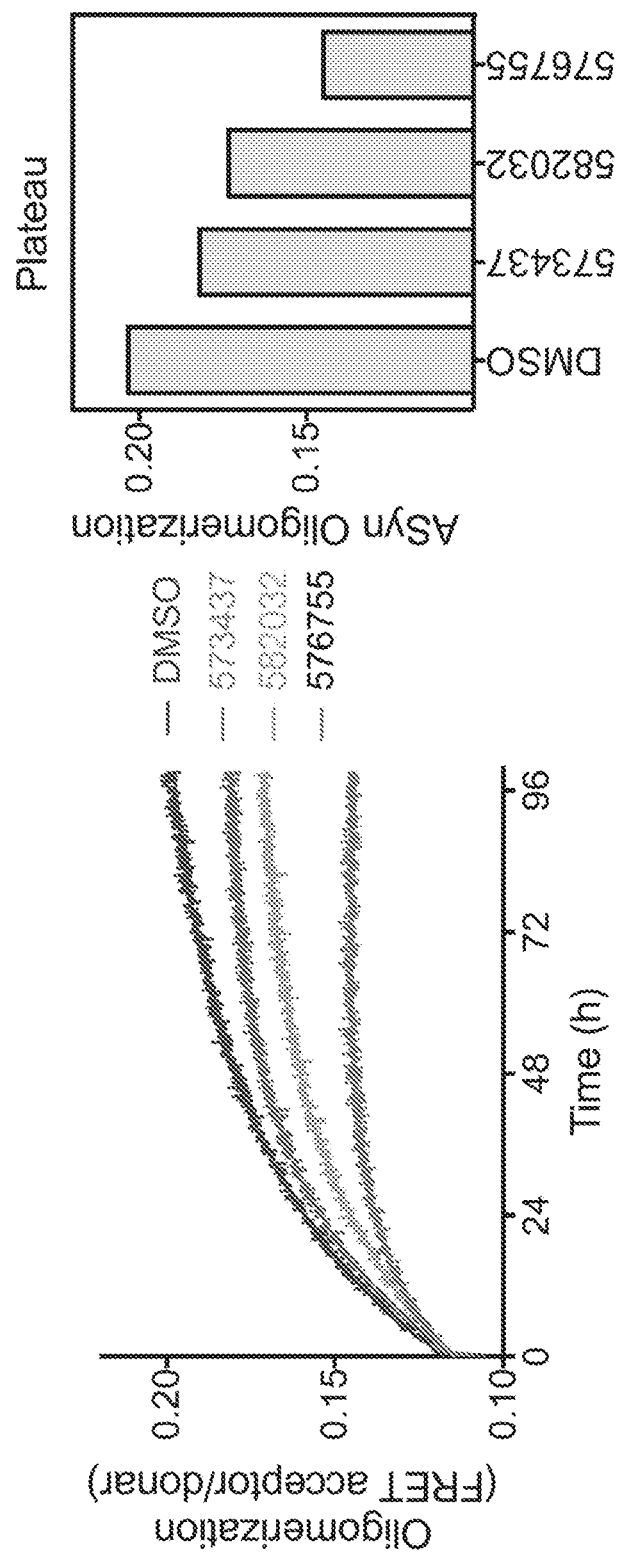
FIG. 12 shows hit validation of three hit compounds by FRET αSyn oligomerization assay.

Novel αSyn interacting drug-like compounds were identified using a surface plasmon resonance high-throughput screen (HT-CM-SPR), in which monomeric αSyn was incubated with microchips arrayed with tethered compounds. Sixty-six of these were tested at 100 µM with 0.2% DMSO in the αSyn-GLuc complementation oligomerization assay (FIG. 10) measuring values at the end of the reaction (24 hours). Three compounds (576755, 582032, 573437) were found that impair αSyn oligomerization and full time course and dose response measures were obtained for these (FIG. 11). The activity of these compounds was replicated in the αSyn FRET oligomerization assay (Example 9), ruling out any impact of compound on the tags and verifying that these compounds block αSyn oligomerization (FIG. 12). Two of these were also shown to impair fibrillization (576755, 582032), however dose response measures were not possible in the fibrillization assay due to its inherent variability. As has been the case with prior fibrillization compounds, 576755 has quinone reactivity potential. 573437 and 582032 do not have quinone reactivity potential and therefore offer exciting αSyn anti-aggregation compounds without this challenging attribute as the reactivity inherent in quinones can cause challenges in drug development. Thus the novel biochemical αSyn oligomerization assay was able to identify non-quinone αSyn oligomerization blockers, including one (573437) that was missed by the more variable αSyn fibrillization assay.

Split Gaussia Luciferase Assay:

Five to 112.5 µM each of αSyn-GLuc1 and µM αSyn-GLuc2, (N-terminal or C-terminal fragment of GLuc fused to the C-terminus of αSyn see Example 6) in a buffer consisting of 1 mM MgCl$_2$, 1 mM ADP, 50 mM Na$_3$PO$_4$, 0.02% NaN$_3$ and 1 mM DTT at pH 7.4, were incubated at 37° C. in a thermal cycler (BioRad DNA Engine PTC-200). In experiments in which fibrillization was also measured, samples were incubated in an air incubator with shaking at 1000 rpm. At various time points (typically 0, 6, 12, and 24 hours), Gaussia luciferase activity was quantified using a BioLux Gaussia Luciferase Assay Kit (NEB) according to the manufacturer's instructions and read on a SpectraMax M5 Microplate Reader (Molecular Devices) with 5 minute delay after the addition of substrate and 3 sec integration time reading each well.

Conditions αSyn-GLuc Oligomerization (Gluc Vs ThT)
Mix αSyn-GLuc1 and αSyn-GLuc2 at a final concentration of 10 µM each;
Incubate at 37° C. with shaking at 1000 rpm for 120 hours;
Take aliquot at 0/3/6/12/24/48/72/96/120 hour for analysis by Gaussia luciferase activity assay and ThT assay Methods Gaussia Luciferase Assay (According to BioLux Kit Manual):
1. Thaw reaction buffer and stabilizer;
2. Make working solution, for each reaction:
   Reaction Buffer 50 µL
   BioLux Stabilizer 8 µL
   Substrate 0.5 µL
3. Mix well and wait 5 minutes to use the working solution;
4. Take out 10 µL GLuc sample and put on white 96-well plates;
5. Add 50 µL working solution, mix well and wait 3.5 minutes;
6. Read on the plate reader at 480 nm ThT Assay:
1. Dilute 1 mM Thioflavin T (M.W. 319 Da) stock in PBS to 25 µM final concentration (1:40 dilution)
2. Pipet 95 µL of the 25 µM Thioflavin T per well of 384 well plate.
3. Pipet αSyn fibril up and down to mix, add 5 µL to wells with Thioflavin T
4. For controls, include 5 µL PBS alone.
5. Incubate at room temperature for 15 min to 1 hour.
6. Read plate (excitation 440 nm, emission 482 nm).

Method Used to Screen 66 HT-CM-SPR Compounds Using αSyn-GLuc:
Reaction mix is added into 96-well PCR plate containing:

| | |
|---|---|
| αSyn-GLuc1 | 12.5 µM |
| αSyn-GLuc2 | 12.5 µM |
| Compounds are added into each well: | |

| | | | |
|---|---|---|---|
| Negative control: | DMSO | 0.2% | 12 wells/plate |
| Positive control: | 576755 | 100 µM | 12 wells/plate |
| Elan compound: | 100 µM | | 3 wells (triplicate) |

Incubate the mix at 37° C. on PCR machine for 24 hours;
Measure GLuc activity by BioLux Gaussia Luciferase Kit (NEB)

Reaction:
αSyn-GLuc1 12.5 µM
αSyn-GLuc2 12.5 µM
Compound 0/12.5/25/50/75/100 µM in DMSO 0.2%
Negative: DMSO 0.2%:
37 degree (PCR), no shaking

Example 8

αSyn Split Nanobit Luciferase Oligomerization Assay

Figure 13:
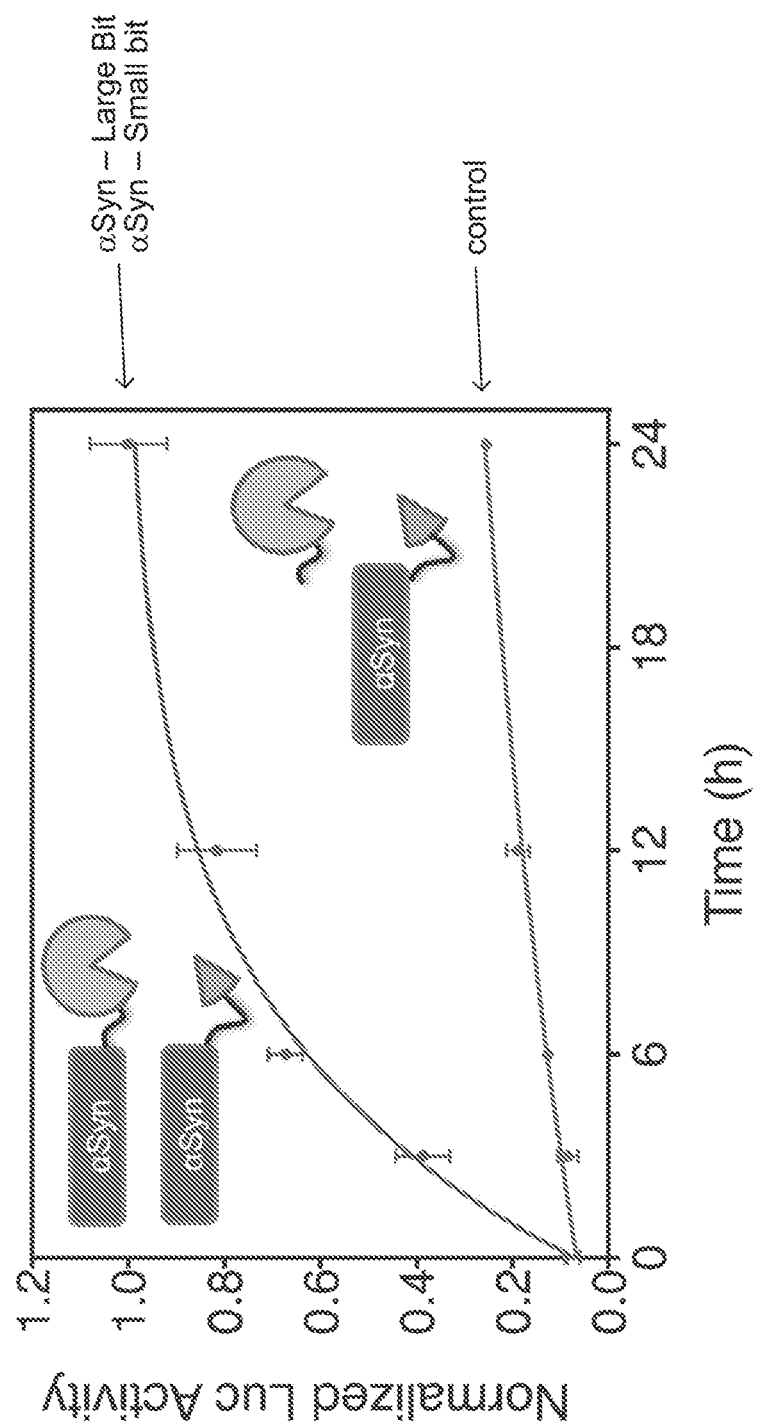
FIG. 13 shows an αSyn biochemical oligomerization assays using Split Nanobit tagged αSyn. Nanobit luciferase (Nluc) split tags are identified as Large Bit and Small Bit.
Figure 14:
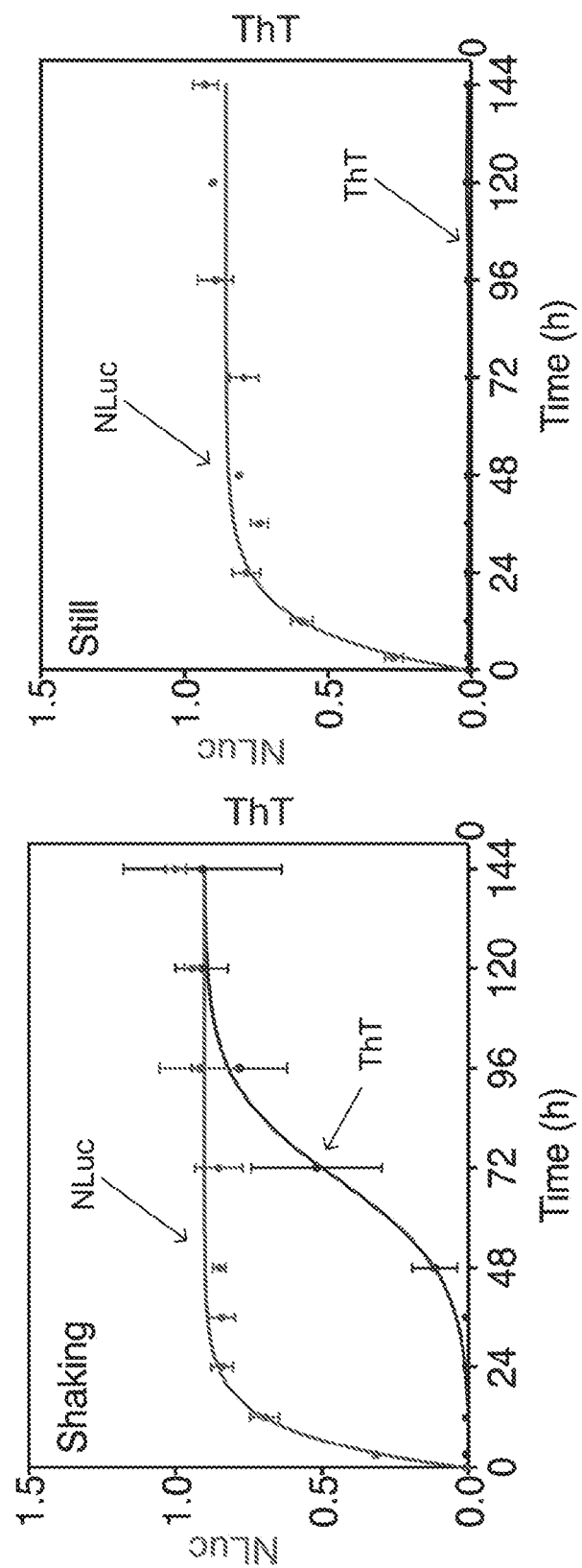
FIG. 14 shows αSyn biochemical oligomerization assays using split Nanobit tagged αSyn. Fibrillization assay using thioflavin T (ThT, relative fluorescent units) fluorescence is compared to αSyn oligomerization (Nluc, relative luminescence units) using luminescence from Nanobit split luciferase tagged αSyn. Fibrillization requires shaking. Oligomerization does not require shaking.

Next, a novel and robust biochemical assay of αSyn oligomer formation was established using complementation of split NanoBit luciferase (Nluc) tags placed on separate αSyn molecules to measure αSyn oligomerization (FIG. 13). Importantly, the NanoBit luciferase protein complementation system displays weakly interacting and fully reversible binding (Dixon A S, et al. *ACS Chem Biol* 11(2):400-408, 2016, incorporated herein by reference in its entirety) (unlike split fluorescent proteins), and its components are stable and non-linkable via disulfide bonds (unlike Gaussia split luciferases). Purified αSyn fused at its C-terminus with either the large (LgBit) or the small (smBit) portion of luc are incubated, and the formation of oligomers is monitored by reconstituted luc activity. Split luc tags placed on separate αSyn molecules reconstituted luciferase activity, whereas removal of αSyn from one of the tags gave minimal less signal (FIG. 13). As was the case for the αSyn split Gluc oligomerization assay, the formation of oligomers did not show the lag phase nor the variability seen in the fibrillization assay and furthermore the oligomerization assay did not show the dependence on shaking that is characteristic of fibrillization assays (FIG. 14). Oligomerization is seen under still conditions during which no fibrillization is seen (FIG. 14). Thus oligomer formation can be assed in the absence of fibrillization by not shaking the samples during the assay.

Figure 15:
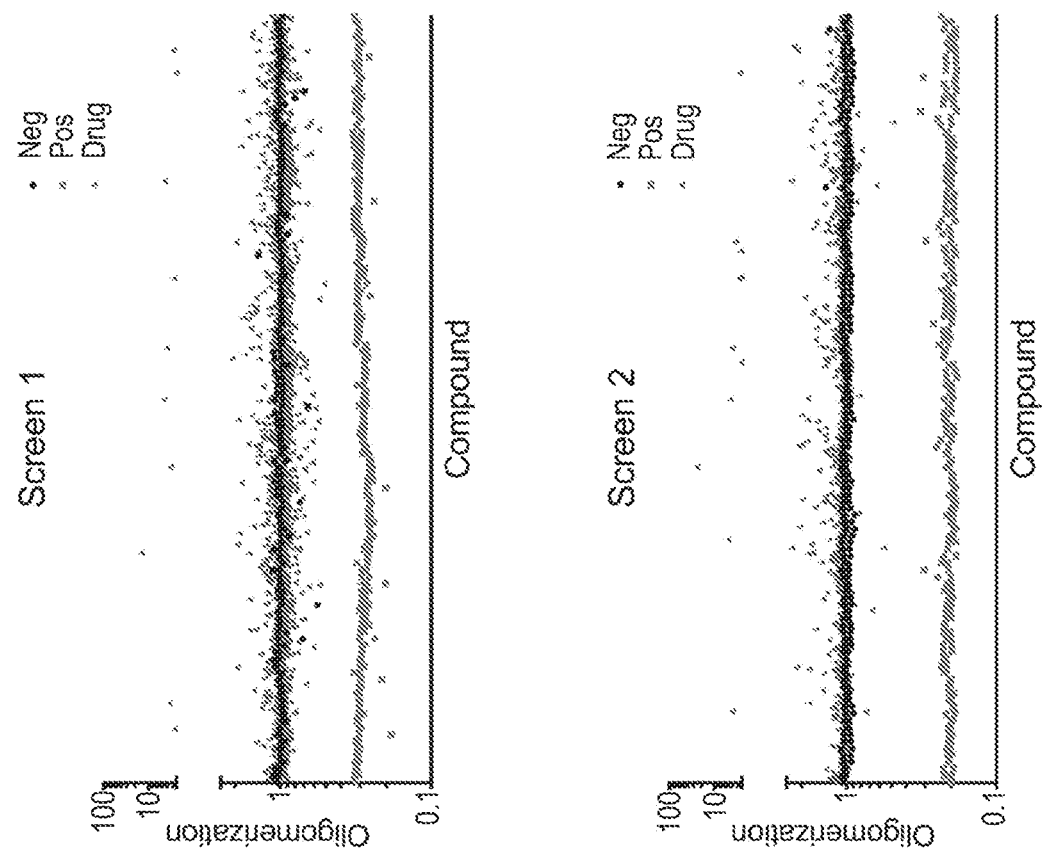
FIG. 15 shows a screen of small molecules using the αSyn-NLuc oligomerization assay (small molecule screen). Oligomerization is measured in relative luminescence units. Z' score is calculated as a Z-factor score.
Figure 15:
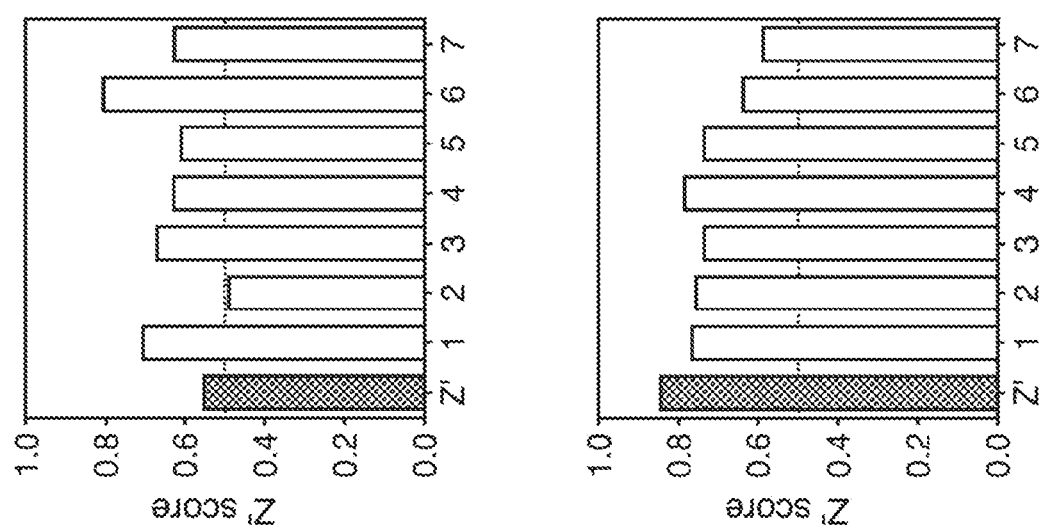
Figure 16:
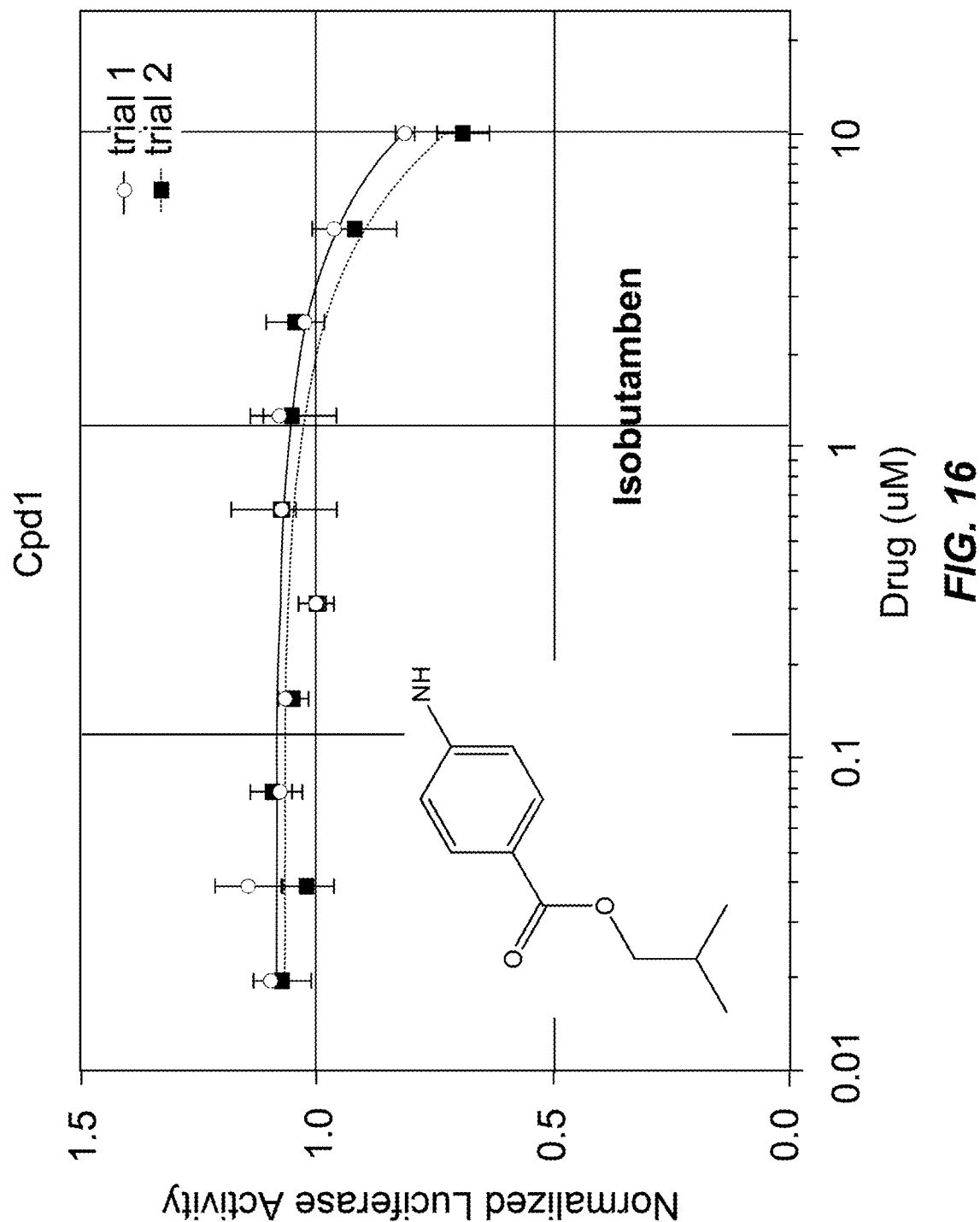
FIG. 16 shows αSyn oligomerization inhibitors from the small molecule screen.
Figure 16:
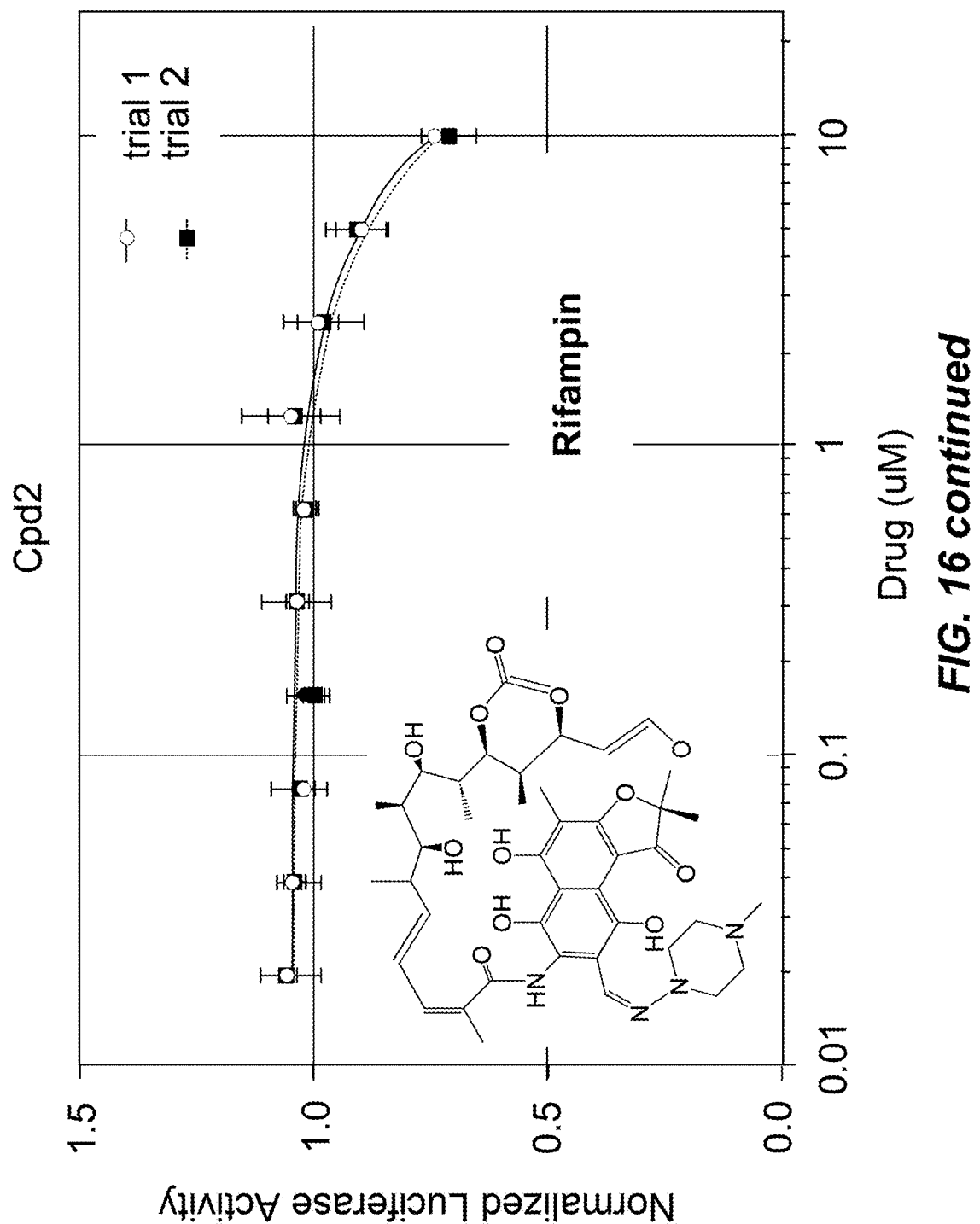
Figure 16:
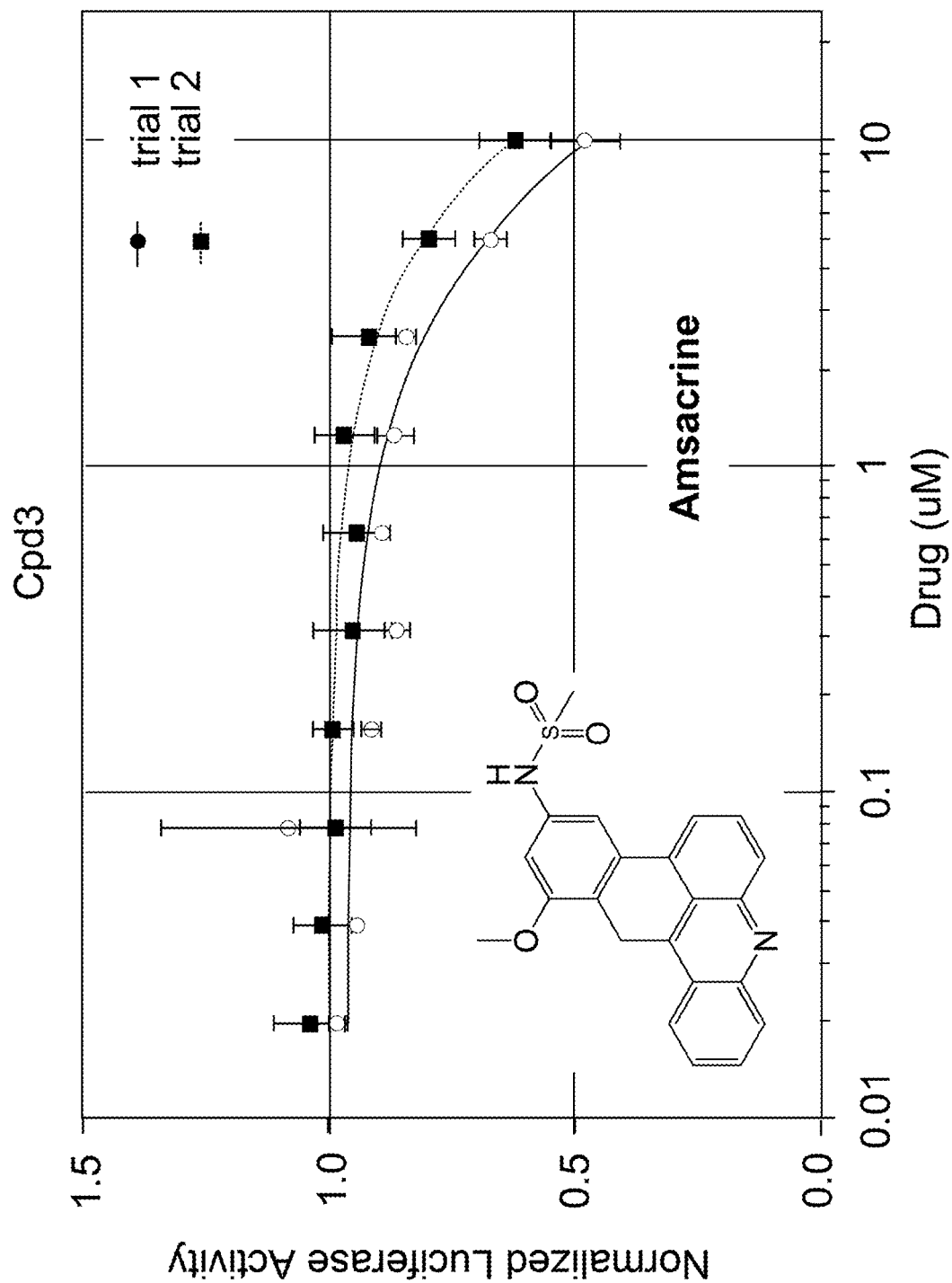
Figure 16:
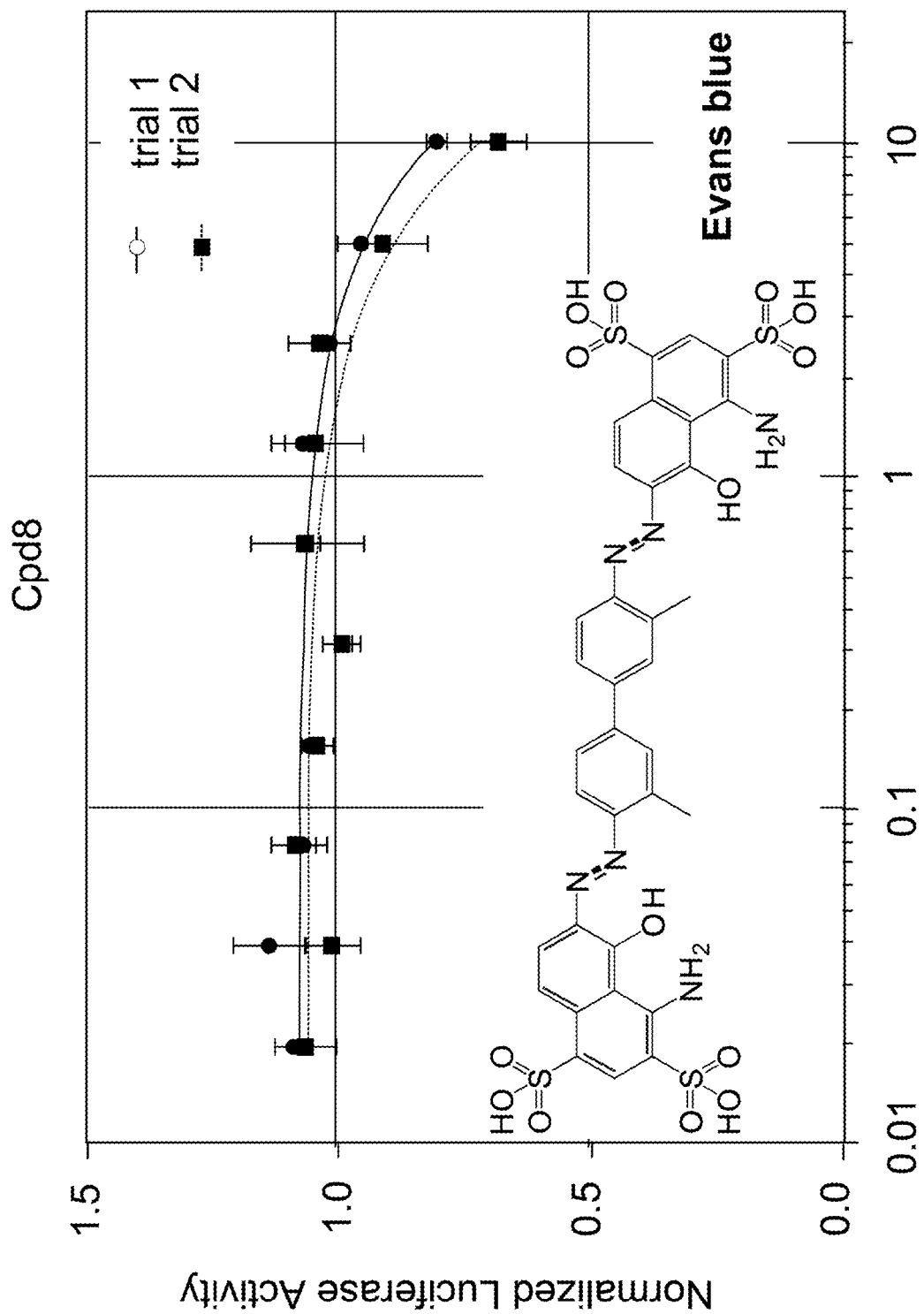
Figure 16:
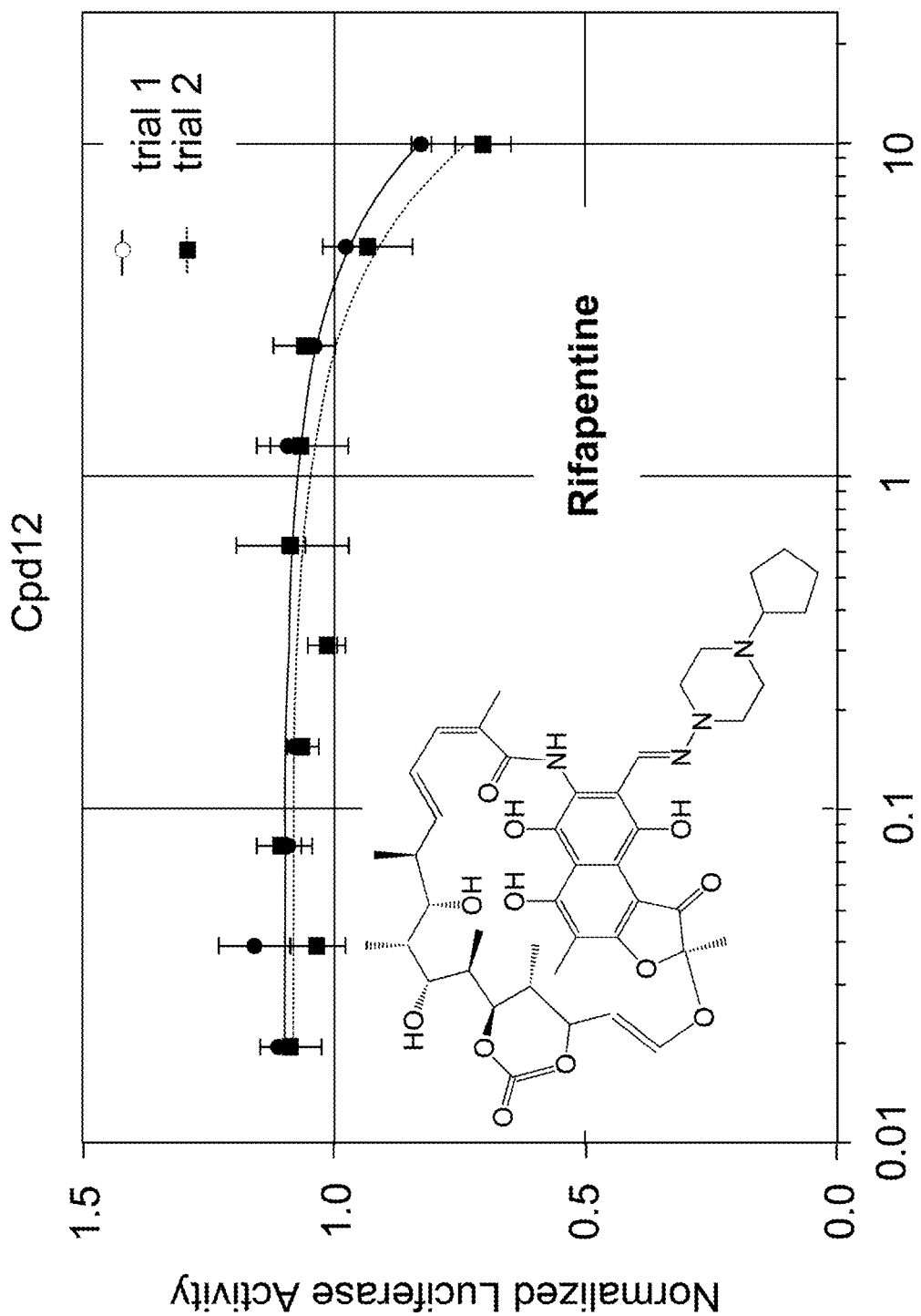
Figure 16:
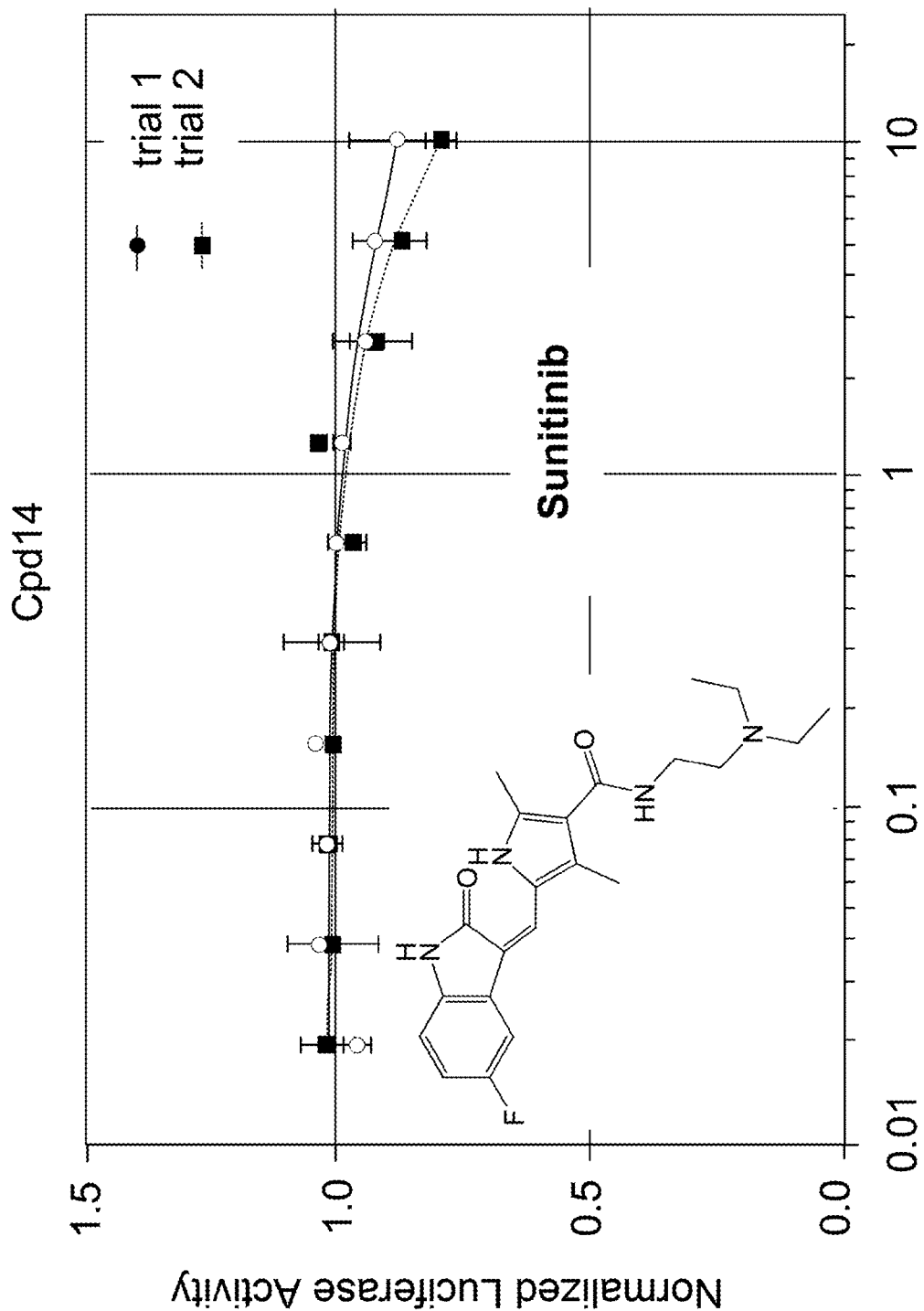
Figure 16:
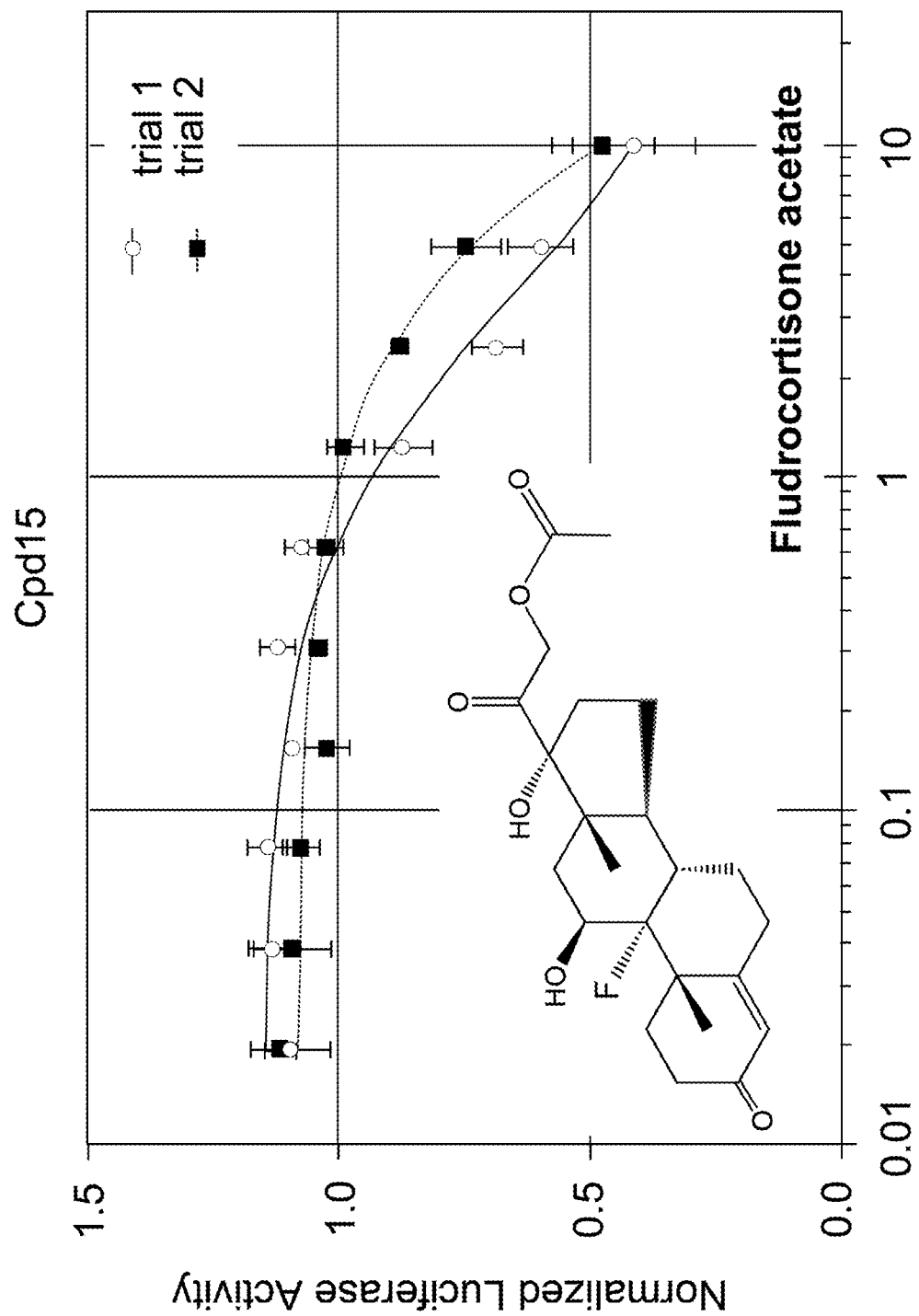
Figure 16:
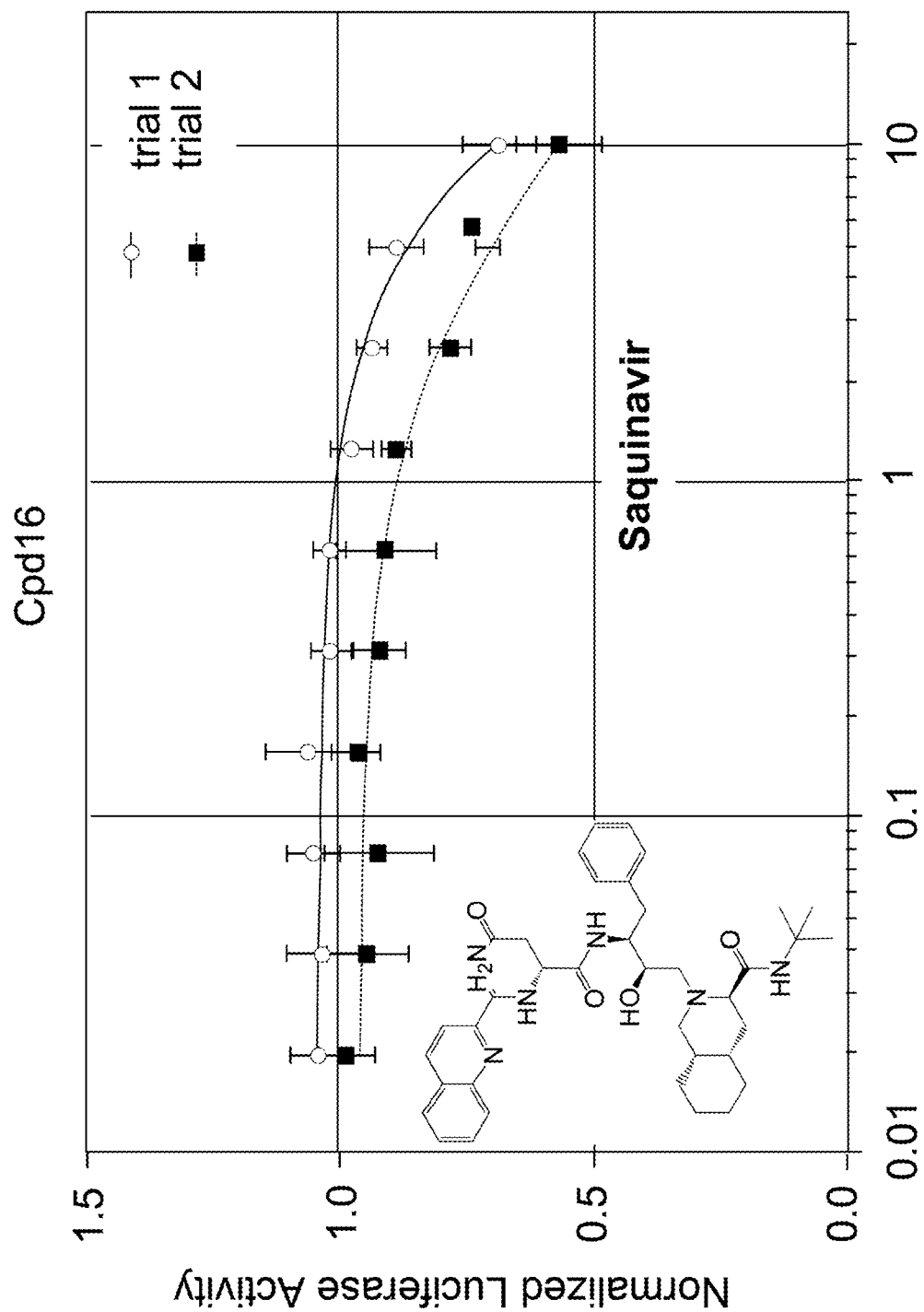

The split NanoBit luc αSyn oligomerization assay was optimized for 384 well format with Z' scores consistently above 0.5 indicating a robust assay suitable for high throughput screening. Also, a successful pilot screen was performed using the 2177 compounds known drug library from UCSF's Small Molecule Discovery Center. This screen was run twice with good z prime scores for all plates (FIG. 15). The pilot screen identified eight verified compounds reducing αSyn oligomerization (FIG. 16). These are all known drug compounds. Anti-oligomerization inhibitors without quinone reactive potential were found in the pilot screen.

Split NanoBit Luciferase Assay:

Ten μM αSyn-LgBiT, 10 μM αSyn-SmBiT, and Hsp70 (at 0, 10, or 30 μM), 1 mM MgCl$_2$ and 1 mM ADP were mixed in PBS at pH 7.4 and incubated at 37° C. in a thermal cycler (BioRad DNA Engine PTC-200). At 0, 3, 6, 12 and 24 hours. The NanoBit luciferase activity was quantified using a NanoFuel® GLOW Assay for Oplophorus Luciferases (NanoLight) according to the manufacturer's instructions and read on SpectraMax L Microplate Reader (Molecular Devices) with an 8 minute delay after the addition of substrate and 1 sec integration time reading each well. The luciferase activity was normalized to the reaction without Hsp70 at 24 hour time point.

Split NanoBit High Throughput Format Luciferase Assay:
Label αSyn with Cy3/Cy5:

Purified αSyn-Q99C mutant protein was reduced by 10 mM DTT for 1 hour at 4° C. The free DTT was removed by HiTrap Desalting chromatography (GE). Cy3-maleimide (GE) or Cy5-maleimide (GE) was added to the reduced αSyn-Q99C at a dye:protein molar ratio of 5:1. The labeling was carried out at 4° C. for 12 hours in darkness. The excessive dye was removed by HiTrap Desalting chromatography (GE). The labeled proteins were concentrated using a centricon filter with a 3 kDa cutoff (EMD Millipore). The concentrated protein was filtered through a 0.22 μm filter (E&K Scientific), flash frozen and stored at −80° C.

Design:
1. αSyn-LgBiT or LgBiT is mixed with αSyn-SmBiT at 10 μM of each (PBS pH 7.4);
2. Incubate at 37 degree for 24 hours in PCR machine;
3. Take 10 μL samples at 0/3/6/12/24 hours;
4. Luminescence measurement is done using Luminometer (with injector) using h-CTZ (40 uM), 2 sec delay, 3 sec integration.

Protocol:
1. αSyn-LgBiT (10 uM) and αSyn-SmBiT (10 uM) are mixed in PBS buffer (pH 7.4);
2. The reaction mixture is incubated in 37° C. incubator either being shaken (1000 rpm) or still;
3. Samples are taken from the reaction at 0/3/12/24/36/ 48/72/96/120/144 h for ThT and Nluc assays;

NLuc Assay:

| 1. | Sample | (10 μL) is mixed with substrate (100 μL, NanoGlow) |
|---|---|---|
| | Plate: | 96 well |
| | Plate reader: | SpectraMax L |
| | Mode: | Kinetic |
| | Delay time: | 8 min |
| | Integration time: | 1 sec |

ThT Assay:
1. Dilute 1 mM Thioflavin T (M.W. 319 Da) stock in PBS to 25 μM final concentration (1:40 dilution)
2. Pipet 95 μL of the 25 μM Thioflavin T per well of 384 well plate.
3. Pipet αSyn fibril up and down to mix, add 5 μL to wells with Thioflavin T
4. For controls, include 5 μL PBS alone.
5. Incubate at room temperature for 15 min to 1 hour.
6. Read plate (excitation 440 nm, emission 482 nm).

αSyn-Nluc 384 Well Oligomerization Assay
Screening Capacity

One can fit 6 reaction plates in-between two metal plates. With 6 metal slabs, one can run 30 plates at a time. The incubator is big enough to hold 150-200 reaction plates at the same time given that you have additional metal slabs. The dummy plates are filled with water and sealed for long-term use. One can dispense them ahead and use them later repeatedly. 4 plate per hour is the capacity of the plate reader. That gives about 30-40 plates per day assuming everything goes perfectly. Weekly max is 150-200.

Protocol:
Day 1.
1. Mix fusion proteins in PBS buffer (pH 7.4) to create the following three master mixes:

TABLE 3

| Components | Reactions | Positive Control | Negative Control |
|---|---|---|---|
| αSyn-SmBiT | 10 uM | 10 uM | 10 uM |
| αSyn-LgBiT | 10 uM | 10 uM | 10 uM |
| Tween-20 | 0.002% | 0.002% | 0.002% |
| 576755 (10 mM stock) | n/a | 50 uM | n/a |
| DMSO | n/a | n/a | 0.5% |

αSyn-Lg,BiT protein stock (711 uM) is in Joe Tao Stock Box 5 and 6, −80 freezer.
αSyn-SmBiT protein stock (504 uM) is in Joe Tao Stock Box 6 and 7, −80 freezer.
576755 (10 mM) stock is in Elan Compound Aliquot 1 Box, −20 freezer 4D2 drawer.

2. Dispense 10 μL protein master mix into 384-well plate (Greiner, 781904) using Mantis;
Col 1 & 23: Positive control
Col & 24: Negative control
Col 3-22: Reactions
3. Pin 50 nL compound (10 mM stock) into each well; final concentration is 50 uM;
4. Seal plates using sticky foil (E&K Scientific T790080);
5. Incubate the sealed plates at 37° C. with heat blocks above and beneath the sealed plates, use dummy plates around the reaction plate, incubate at 37° C. incubator in room N401 for 0-24 h;

Day 2.
I. Prepare the Plates and Substrate
  6. Cool the plates at room temp for 30 min after 24-hour incubation;
  7. Spin the plates at 500×g for 1 min;
  8. Make substrate mix (NanoLight Cat #325), keep it in darkness;
II. Prepare the Plate Reader
  9. Turn on SpectraMaxL, make sure the aperture is in the right position (96/384 well):
     To change: Control>Change Aperture>Lift the top panel>Press down the button and turn it to the right position>Put the panel down
  10. Put the P-injector tube into the H2O bottle, wash the injector: Control>Prime P-injector for 30× injections
  11. Remove the P-injector and leave it in the air, then empty the injector: Control>Prime P-injector for 30× injections;
  12. Put the P-injector from the substrate tube, prime the injector: Control>Prime P-injector for 20× injections
III. Read the Plates
  13. Nluc assay:
    Sample vol: 10 µl (dispensed on day 1)
    Substrate vol: 25 µl (NanoLight Cat #325)
  The SpectraMaxL will do two rounds of reads, the first round will inject substrates, the second round will read entire 384-well plate and make sure the interval between inject and read for each well is exactly the same (in this protocol, the interval is 8 min exactly)
SpectraMax L Setting:
Endpoint:
Inject Plate:

| Read Mode: | Luininesence | |
| --- | --- | --- |
| Integration time: | 0.31 sec | (it ensures same inject-read interval for all wells) |
| Sensitivity: | PMT Setting MaxRange Wavelength 470 nm | |
| Automix: | Classic2 sec  30 mm/s | |
| Assay Plate: | 384-well | |
| Wells to read: | All | |
| Injection and Delay: | P-injection | |
| P injector vol (µL) | 7.5 | |
| Post injection delay (s) | 0.5 | |
| Injection speed | 250 | |
| Shake after inject | 0 | |
| M-injection | Uncheck it | |
| Injection Wells: | P-injector M-injector | All None |
| Dark Adapt: | 1 min | (keeps plate in dark before 1$^{st}$ injection) |
| AutoRead: | 35 sec | (after this finishes, wait 35 sec, start the next plate) |
| Read Plate: | | |
| Integration time: | 1 sec | (reading Nluc signal, 1 sec integration) |
| Sensitivity: | PMT Setting MaxRange Wavelength 470 nm | |
| Automix: | Classic5 sec  30 mm/s | |
| Assay Plate: | 384-well | |
| Wells to read: | All | |
| Injection and Delay: | P-injection | Uncheck it (substrate already injected) |
| | M-injection | Uncheck it |
| Injection Wells: | P-injector M-injector | None None |
| Dark Adapt: | off | |
| AutoRead: | off | |

Example 9

Figure 17:
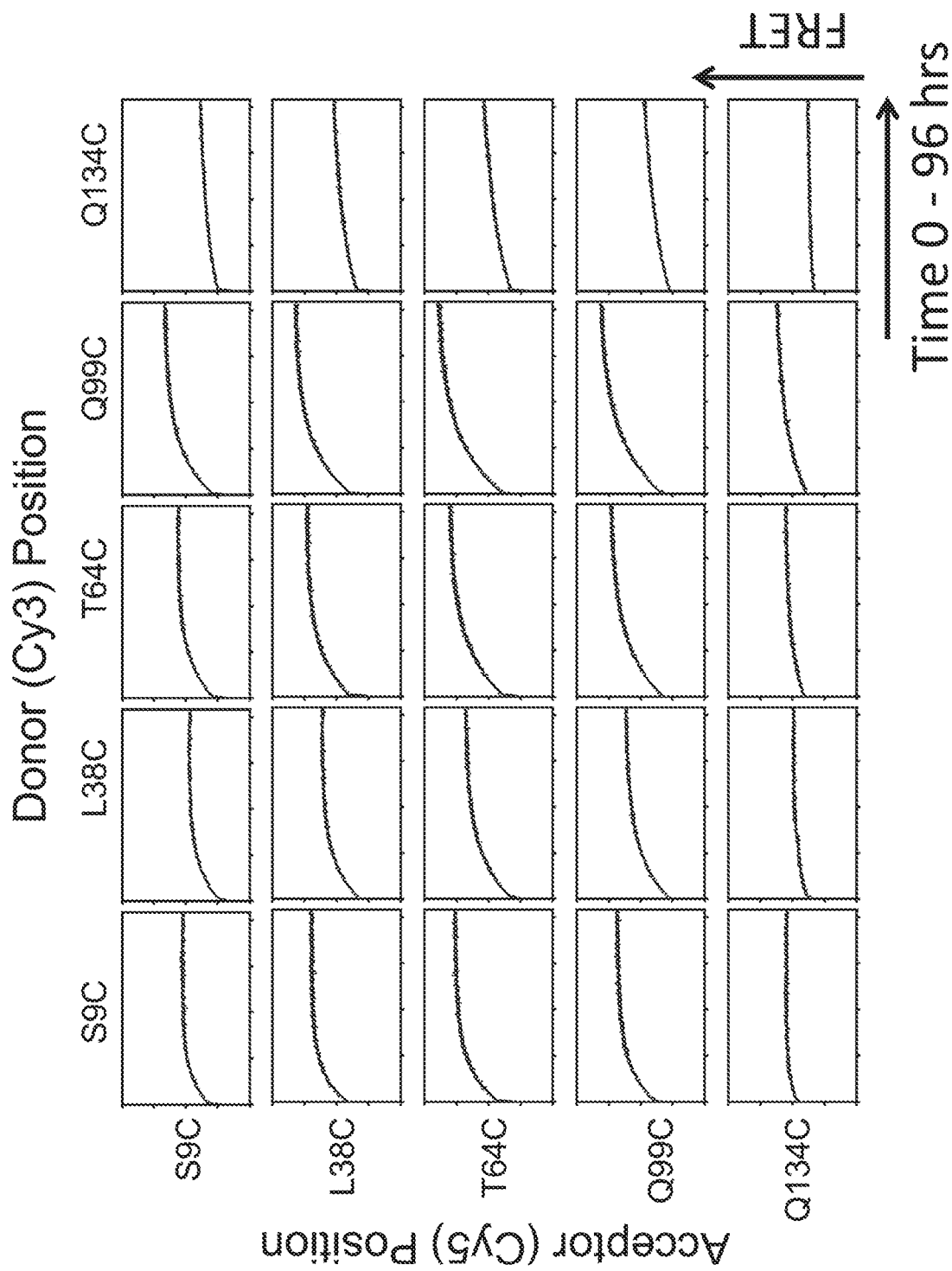
FIG. 17 shows development of FRET oligomerization assay. αSyn mutagenized to Cys at the indicated location was labeled with Cy3 or Cy5 dyes and oligomerization measured as described in Methods. During incubation for 100 hour run at 37° C. samples were removed and tested for FRET.
Figure 18A:
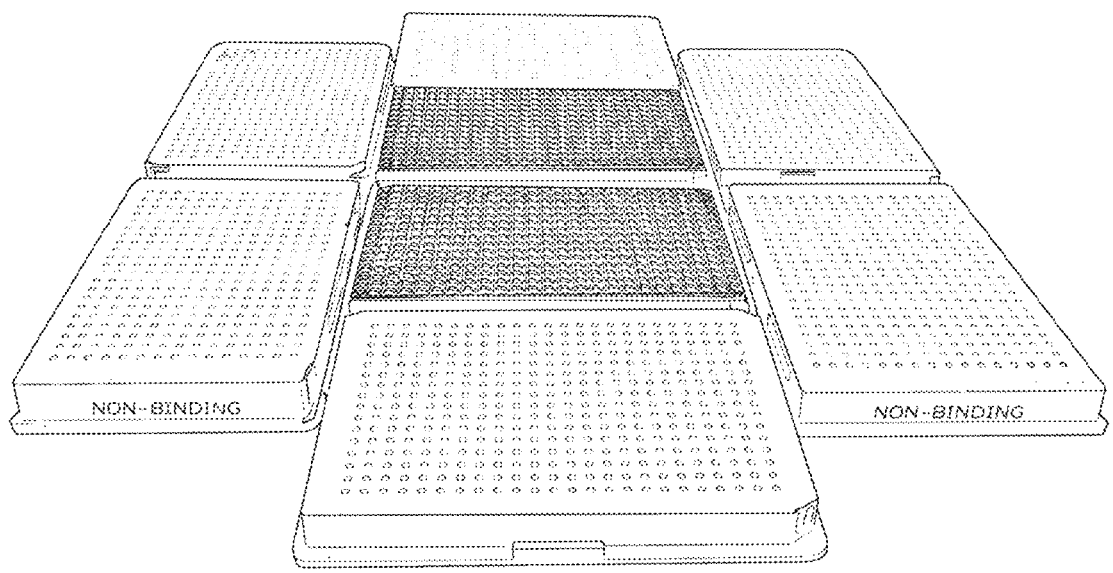
FIGS. 18A and 18B shows Nluc 384-well Oligomerization Assay set-up.
Figure 18B:
Figure 19:
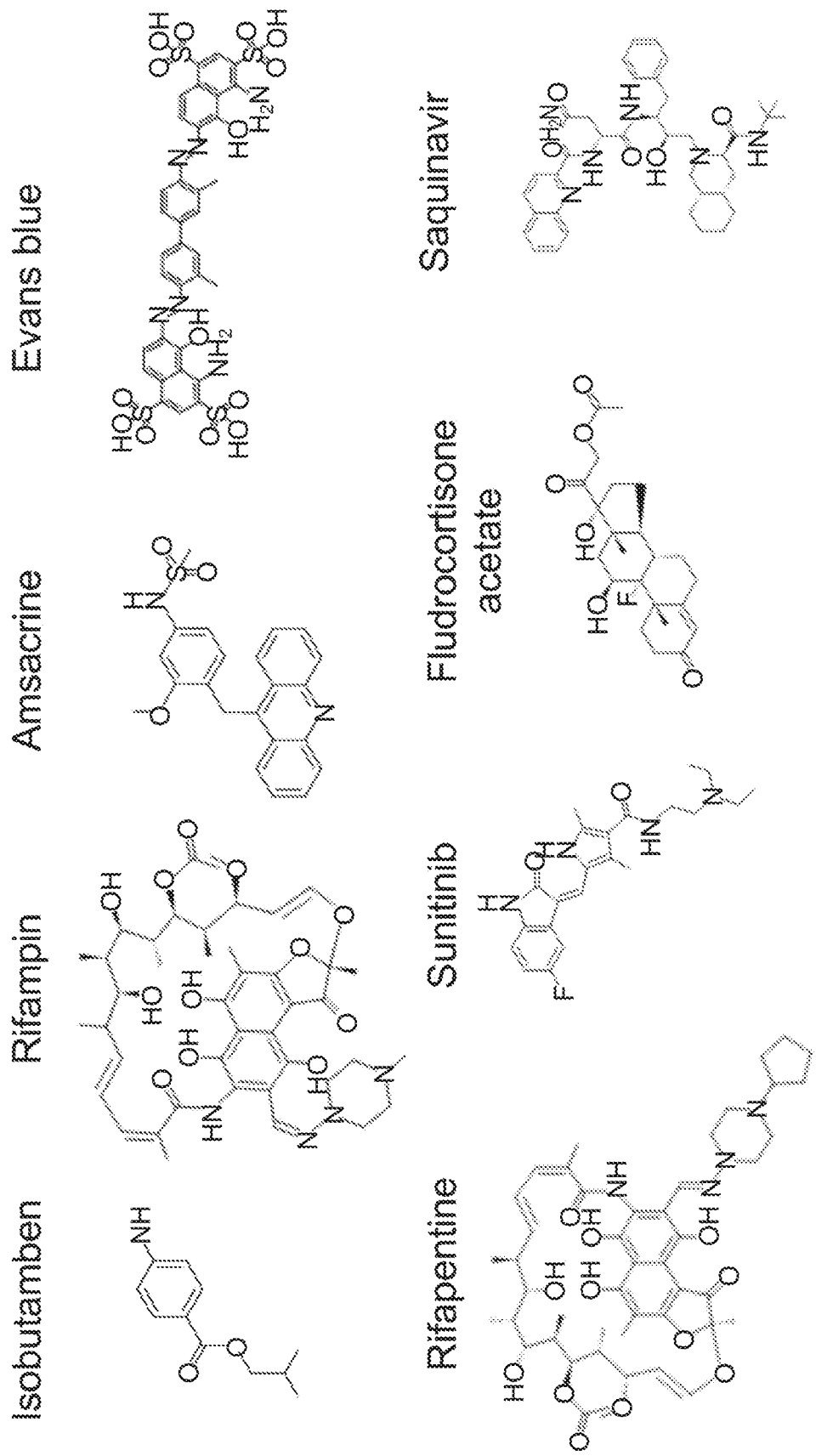
FIG. 19 shows structures of αSyn oligomerization inhibitors identified in the small molecule screen of FIG. 15.
Figure 20:
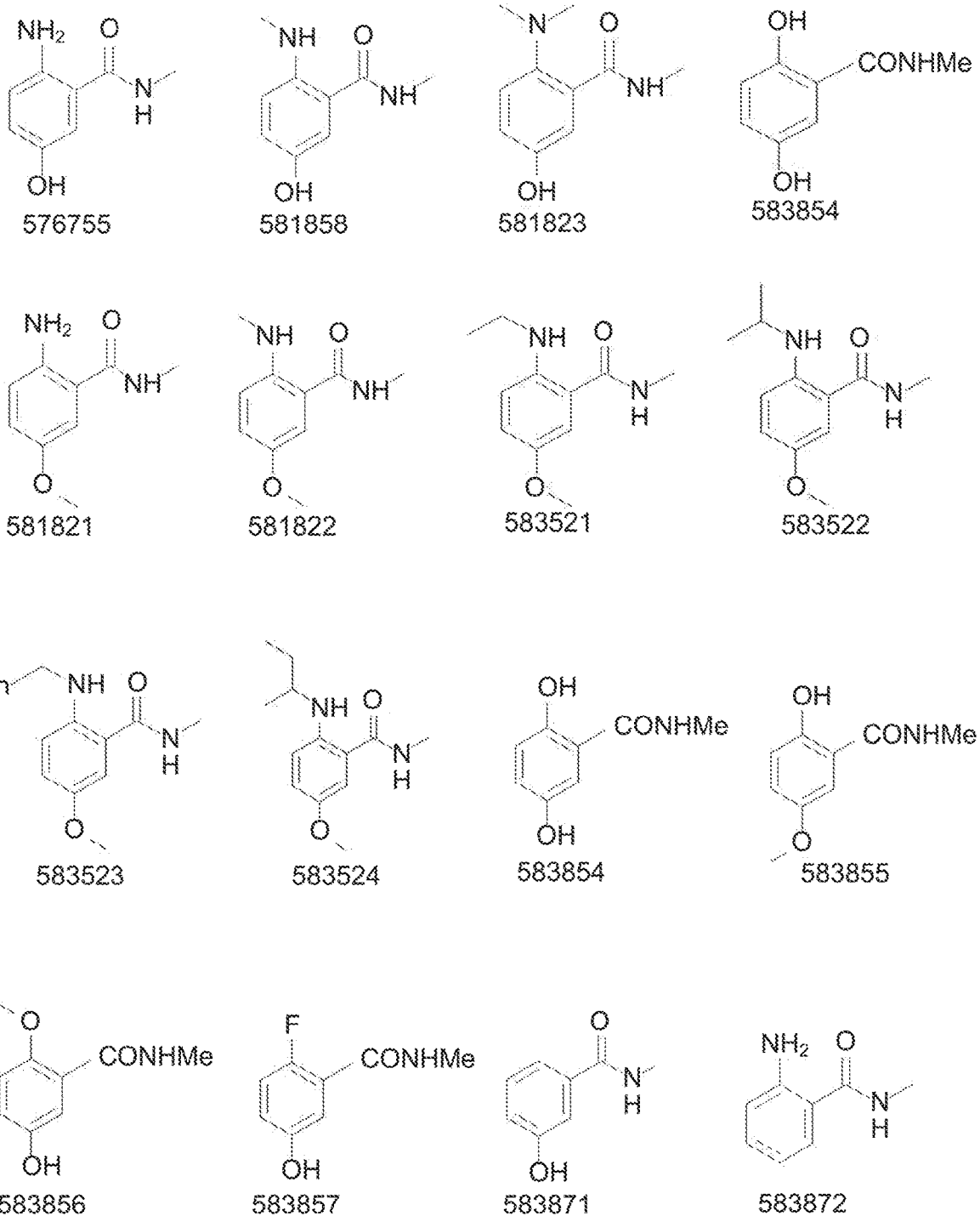
FIG. 20 shows the structures of several analogues of 576755.

Small Molecule Fluorophore Labeled αSyn Fret Based Oligomerization Biochemical Assay A FRET based assay for αSyn oligomer formation was developed by tagging αSyn mutagenized to Cys at various locations with Cy3 or Cy5 fluorescent tags and measuring FRET signal (FIG. 17). Optimal signal was seen with αSyn labeled at position 99 for both donor and receptor molecules. Importantly, this assay, and the other split luciferase oligomerization assays disclosed herein, do not require the presence of Sodium dodecyl sulfate (SDS), which enhances aggregation and thereby signal, as a prior FRET based oligomerization assay does (Kurnik, M. et al. *Cell Chem Biol* 25, 1389-1402 (2018). The presence of SDS can alter the properties of proteins and of compounds in an assay or screen. It is a detergent that can denature proteins, or sequester them into micelles and can interact with small molecules and change their characteristics. It is thus of benefit to have an assay for oligomerization that does not require this aggregation enhancing reagent.

For the FRET based oligomerization assay, the human αSyn coding region was amplified using Q5 High-Fidelity DNA Polymerase (NEB) and inserted with its own stop codon into the NcoI/XhoI sites of the pET28b *E. coli* expression vector (Novagen). This cloning resulted in no His tag on this protein. Single-point mutations encoding Cys were introduced into αSyn using a Q5 Site-Directed Mutagenesis Kit (NEB).

For protein expression, BL21(DE3) *E. coli* cells were transformed with the desired plasmids and cultured in LB media at 37° C. At $OD_{600}$ 0.6-0.8, the culture temperature was lowered to 20° C. and IPTG (GoldBio) was added to a final concentration of 0.5 mM to induce protein expression and cultures incubated at 20° C. overnight. The cells were harvested by centrifugation at 4,000 g for 20 min in an Avanti J-26 XPI centrifuge (Beckman Coulter) with a JLA 8.1000 rotor (Beckman Coulter).

To purify αSyn used in the FRET oligomerization assay (αSyn-Q(position number)C, e.g. αSyn-Q99C), plasmid transformed *E. coli* cells were resuspended in 20 mM Tris, pH 8.0 and lysed by boiling for 30 minutes in the presence of EDTA-free Protease Inhibitor Cocktail (Roche). The lysate was cleared by centrifugation at 30,000 g for 30 minutes in a JA 25.50 rotor (Beckman Coulter). Streptomycin sulfate was added to the lysate at 10 mg/ml to precipitate DNA. After a 30 min incubation at 4° C., the lysate was cleared by centrifugation at 30,000 g for 30 minutes. Ammonium sulfate was added to the lysate to a final concentration of 0.36 g/ml to precipitate protein. After incubation at 4° C. overnight, the protein was pelleted by centrifugation at 30,000 g for 30 minutes. The protein was resuspended in 20 mM Tris, 1 mM DTT, pH 8.0, then subjected to MonoQ 10/100 GL (GE) chromatography eluting with 0-600 mM NaCl gradient. A final purification step was carried out using HiLoad 16/600 Superdex 200 chromatography (GE). The monomeric peak was collected and filtered through a 0.22 µm filter (E&K Scientific), flash frozen and stored at −80° C.

αSyn FRET Assay:

For the FRET oligomerization assay, 10 µM each of αSyn-Q-C(position number)Cy3 (donor) and αSyn-Q(position number)C-Cy5 (acceptor) in PBS (pH 7.4) were dispensed into black/clear bottom 384-well plates (Greiner) using a Mantis liquid handler (Formulatrix). The plate was sealed with AbsorbMax film (Sigma-Aldrich) and incubated at 37° C. The FRET between donor and acceptor was measured on a SpectraMax M5 Microplate Reader (Molecular Devices). An excitation wavelength of 525 nm for αSyn-Cy3 (donor), and emission wavelengths of 570 nm and 670 nm for αSyn-Cy3 (donor) and αSyn-Cy5 (acceptor) respectively were used. The plate reader PTM sensitivity is set to medium and assays executed without mixing. The signals are read at 10 minute intervals for 99 hours at 37° C. Efficiency of FRET was calculated as follows: $E_{FRET} = I_{Acceptor}/I_{Donor}$, in which $I_{Acceptor}$ is acceptor emission intensity, $I_{Donor}$ is donor emission intensity.

Other Info:
1. Single point mutation (x to Cys) is introduced to αSyn.
2. Cy3 and Cy5 are used as FRET probes Brief Procedure:
Label αSyn Mutant with Cy3/Cy5 Dyes:
  Incubate purified αSyn Q99C with 1 mM TCEP at 4° C. for 3 hours to reduce Cys;
  Dissolve Cy3-maleimide or Cy5-maleimide (GE Healthcare) in DMSO;
  Add 10× molar excess of dye to αSyn Q99C;
  Incubate at 4° C. overnight;
  Remove excess dye by HiTrap Desalting column (GE Healthcare);
FRET Assay
  Mix the following:
    αSyn-Q99C-Cy3 5 uM
    αSyn-Q99C-Cy5 5 uM
  Measure the fluorescence from Cy3 and Cy5 at 37° C. for 99 hours on a plate reader (SpectraMax M5, Molecular Devices).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Example 10

Figure 21A:
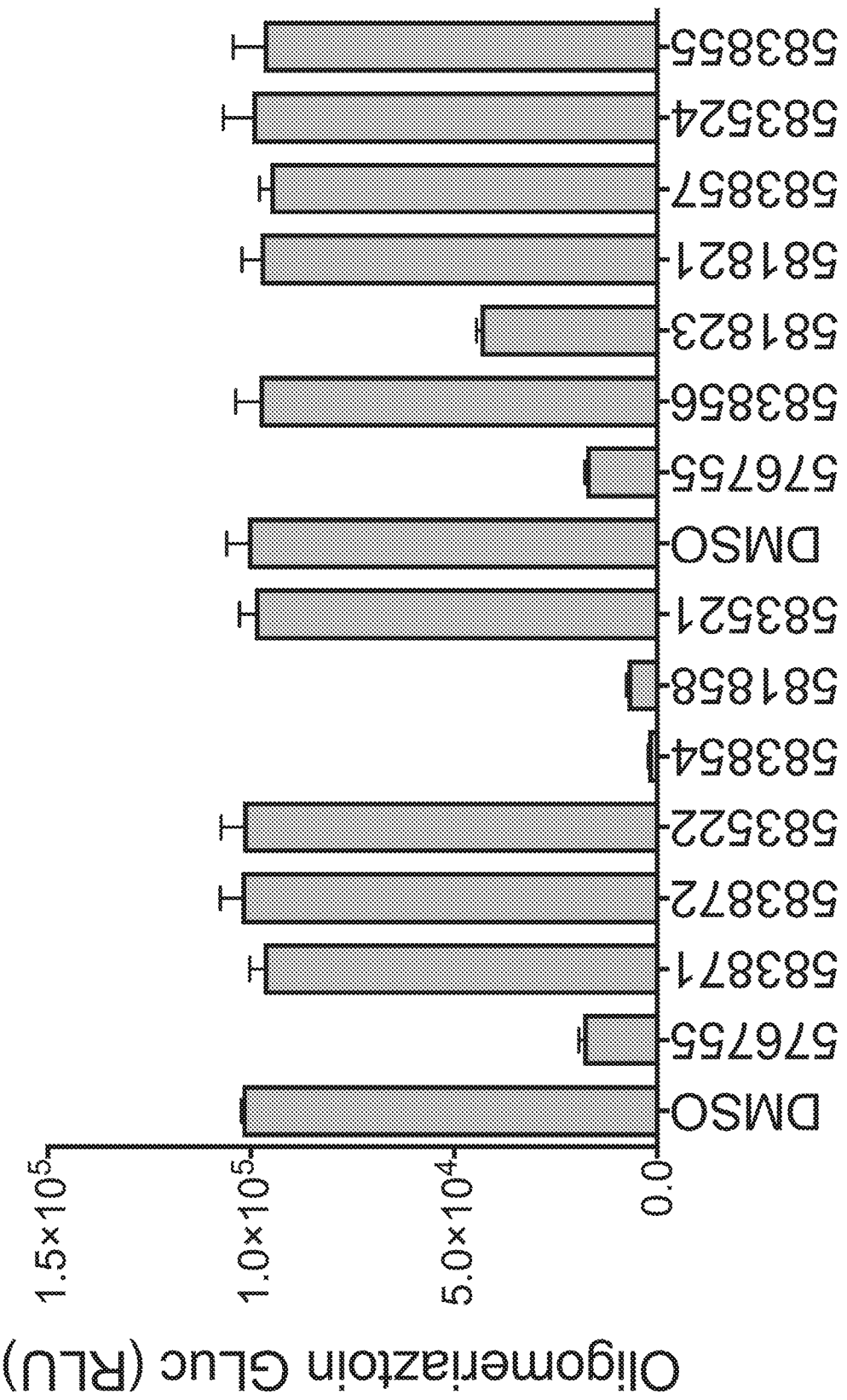
FIGS. 21A-21D shows the results αSyn oligomerization assays performed using 576755 and analogues.
Figure 21B:
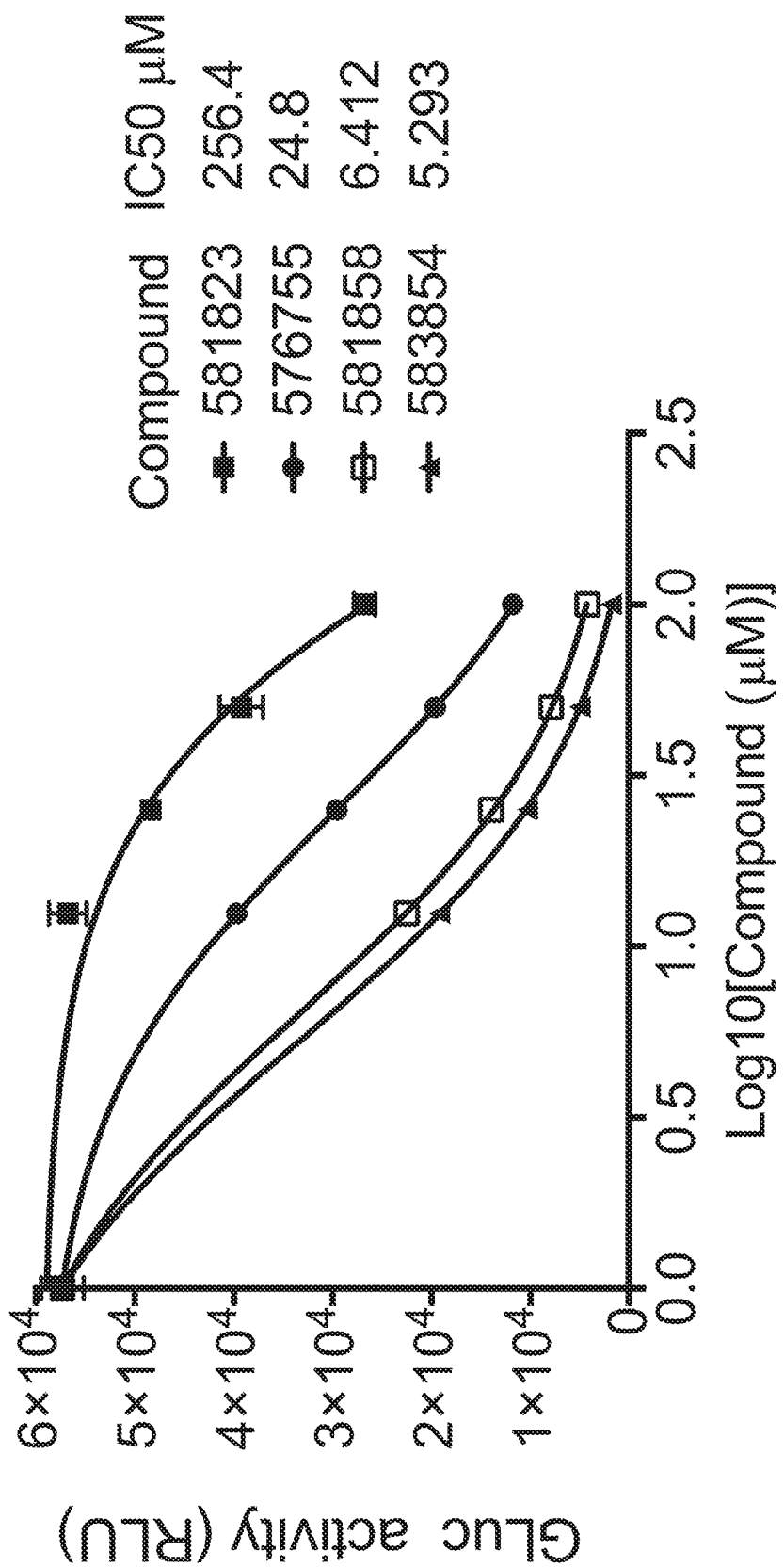
Figure 21C:
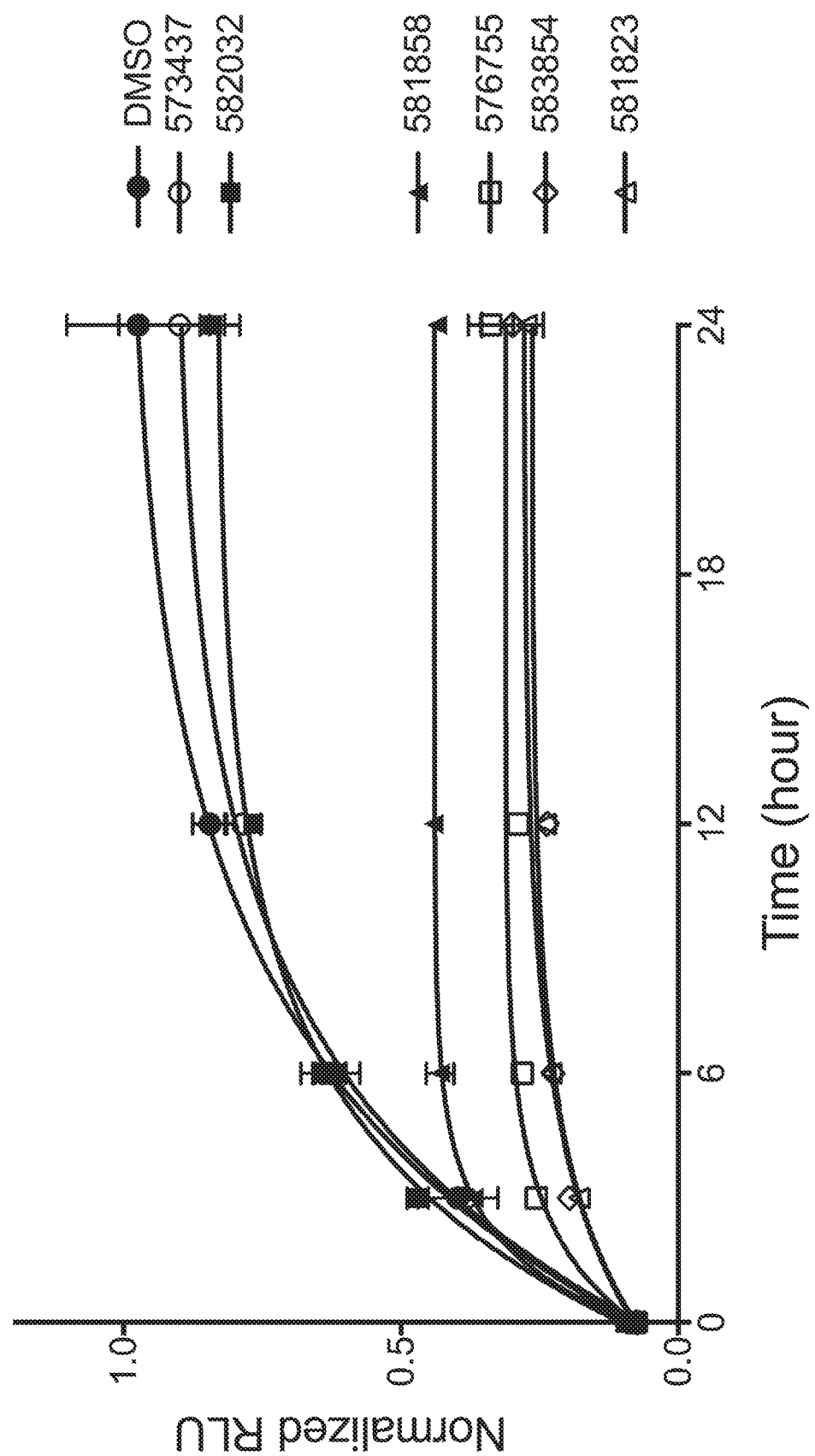
Figure 21D:
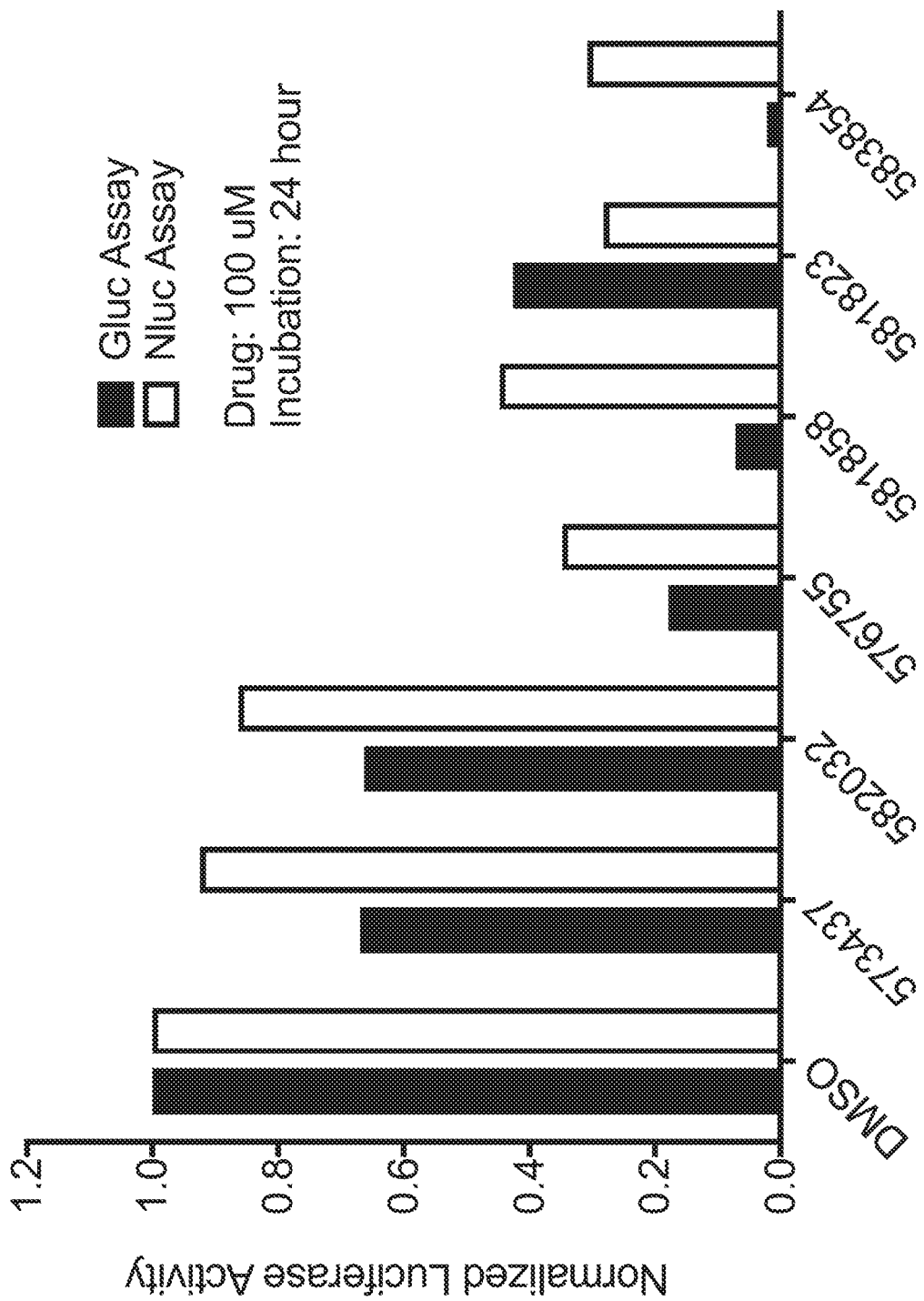
Figures 22A, 22B:
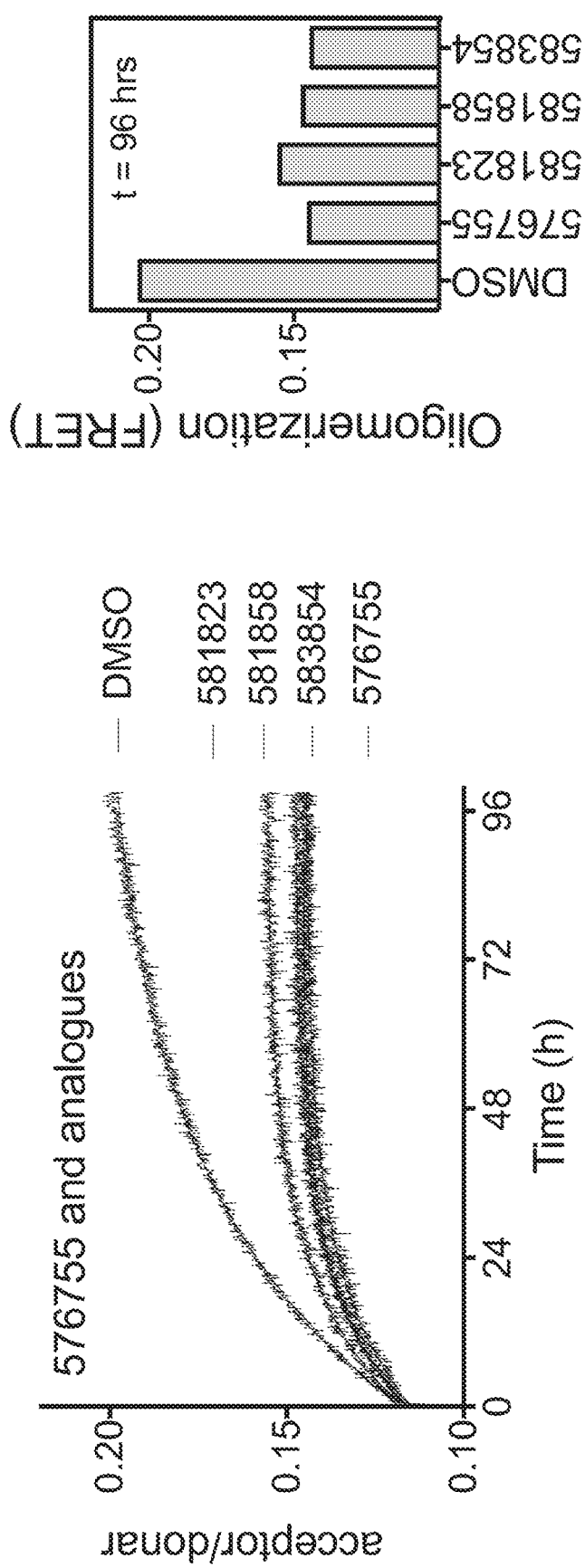
FIGS. 22A and 22B show the results of a FRET based αSyn oligomerization assay using 576755, 581823, 581858, and 583854.

Compound 576755 and analogues 584871, 583872, 583522, 583854, 581585, 583521, 583856, 581823, 581821, 583857, 583524, and 583855 were tested in oligomerization assays as described in Examples 7-9 above. Briefly, 576755 and analogues were split Gaussia complementation αSyn oligomerization assay. FIG. 21A shows the impact on αSyn oligomerization at 24 hours of incubation for 13 compounds incubated at 100 μM with 12.5 μM of each tagged synuclein using the split Gaussia complementation αSyn oligomerization assay. 576755 and the analogues 581858, 583854, 581823 demonstrated inhibition of αSyn oligomerization, with 581858 and 583854 showing more impact on αSyn oligomerization than 576755 and 581823. FIG. 21B shows the dose dependence and IC50s of the 4 active compounds at 24 hours of incubation using the split Gaussia complementation αSyn oligomerization assay with 12.5 μM of each tagged synuclein. FIG. 21C shows the time course of impact of 100 μM compound on αSyn oligomerization over a full time-course using 10 μM of each tagged αSyn in the NanoBit complementation αSyn oligomerization assay. The same compounds were active, however in this assay compound 581858 has slightly less impact than compound 576755. In FIG. 21D shows the normalized endpoint impact of the active compounds from FIGS. 21A and 21C replotted together for comparison. FIG. 22 shows that the active analogues from FIG. 21 are also active in the FRET based αSyn oligomerization assay. As was the case in the split Gaussia assay results, compound 581823 demonstrated less impact than 576755.

Figure 24A:
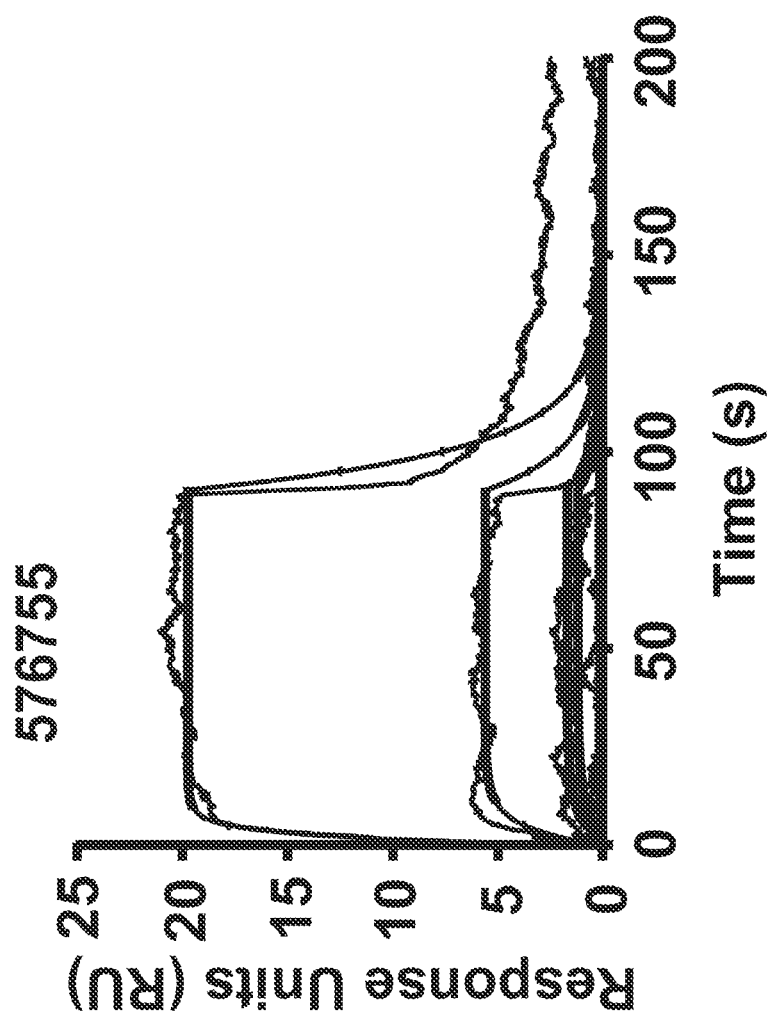
FIGS. 24A and 24B show kinetics of binding of test compounds to immobilized αSyn measured by BIAcore.
Figure 24B:
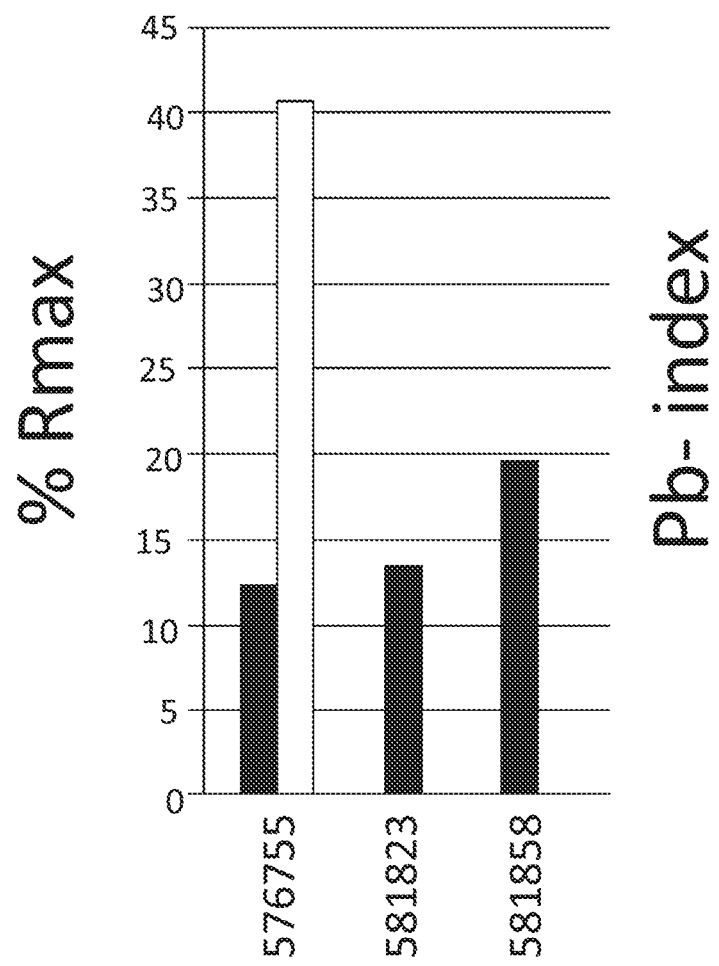

Next, 583854 was tested for impact on αSyn aggregation in a cell model of αSyn aggregate formation. Split Gaussian luciferase tagged αSyn overexpression was induced in the H4 SL1 & SL2 neuroglioma cell line by tetracycline addition (Moussaud, S., et al. (2015)). αSyn aggregates were visualized by staining fixed (4% PFA) cells with the S129 phosphorylated αSyn specific antibody 11A5 at 1 μg/ml (Anderson, J. P. et al. (2006)) using a green fluorescently labelled secondary antibody. Nuclei were stained with a blue Hoescht nuclear dye. Uninduced cells contained no phospho-αSyn staining and induced cells contain abundant phospho-αSyn aggregates. The cells were imaged for nuclei (blue, diffuse circular staining as in the Uninduced sample)) and phospho-αSyn (green punctate staining) on an ARRAY-SCAN automated imaging platform (FIG. 23A), αSyn aggregates were quantitated using the ARRAYSCAN spot-detector algorithm. Quantitation data is shown in FIG. 24B. Cells were induced for αSyn by tetracycline addition and 583854 was added 3 to 4 hours later. At 48 hours after tetracycline addition the cells are washed in PBS and stained with 4% PFA. The data show that treatment of the cells for 45 hours at 100 μM and 150 μM of compound reduced αSyn aggregates.

Example 11

The binding affinity of 576755 for αSyn was measured using Surface Plasmon Resonance (SPR) technology on the Biacore 1200 instrument. FIG. 24A shows Biacore traces for compounds 576755 incubated at various concentrations with Biacore chips containing tethered αSyn. RU (resonance units) from the Biacore machine are plotted against time. The robust traces and the rapid off rates demonstrate well-behaved, robust and reversible binding. αSyn was captured by the double capture method described below. 576755 was injected at six concentrations in two-fold dilutions starting at 200 μM in running buffer containing 25 mM TRIS pH 7.4, 100 mM NaCl, 1% DMSO. Kinetics fits shown in FIG. 24A demonstrate binding affinities of 73 μM. All data were fitted to 1:1 binding model using the T200 software evaluation.

The binding specificity of 576755 and its analogues was assessed by testing their ability to bind to αSyn versus a set of control proteins: Beta-Site Amyloid Precursor Protein Cleaving Enzyme 1 (BACE), Glutathione-S transferase (GST) and Carbonic Anhydrase (CAII). The binding data was merged into a pb-index, as discussed in more detail below. Compounds were tested at 100 μM using the Biacore 4000 instrument as described below. FIG. 24B shows the binding of 576755 and two of its analogues at 100 μM to both αSyn (% Rmax) and the set of control proteins (Pb-index). The percent RMax (% Rmax) for αSyn and the average % Rmax for the control proteins (pb-index) were calculated described below. The pb-index of 576755 exceeded the % Rmax of αSyn binding and thus showed some non-specific binding to the control proteins. The remaining 576755-analogues show no reaction with the control proteins and thus have improved specificity of binding.

Detailed Biacore Methods

A Biacore Surface Plasmon Resonance (SPR) method was developed to detect binding to αSyn both in a high throughput manner (Biacore 4000 machine) and in a sensitive format (Biacore T200). A dual capture method was developed in which αSyn is captured both by an antibody to the central region of αSyn and by immobilized N-termal His-tagged αSyn. The dual capture method captured sufficient αSyn protein on the chip to improve sensitivity to detect interaction of small molecules with αSyn. Dual capture of αSyn by both a His tag and via αSyn antibody resulted in high levels of captured αSyn (corresponding to ~100 RU, defined here as Rmax).

αSyn Purification. Recombinant N-(His)6-αSyn was produced in E coil and purified under native conditions. Cells were resuspended in buffer A (50 mM sodium phosphate buffer, 100 mM NaCl, 10 mM imidazole, and 1 mM DTT pH 7.5) and lysed using a microfluidizer. The lysate was cleared by centrifugation (45,000 g, 25 min, 4° C.) and the supernatant loaded onto a Ni sepharose fast flow column. The column was washed with 5 column volumes of buffer A and αSyn was eluted with 10 column volumes of buffer B (50 mM sodium phosphate buffer, 100 mM NaCl, 200 mM imidazole, and 1 mM DTT pH 7.5). After elution, αSyn was diluted with buffer C (50 mM Tris, 1 mM EDTA, and 1 m DTT pH 7.5) to reduce the salt concentration. The protein was then loaded onto a Capto Q anion exchange column that had been pre-equilibrated in buffer C. The column was washed with 5 column volumes of buffer C and developed with a gradient of 0-500 mM NaCl over 20 column volumes. Collected fractions were then concentrated, desalted into Buffer D (20 mM potassium phosphate, 100 mM NaCl pH 7.4) and snap frozen. Protein stocks, desalted into 20 mM potassium phosphate, 100 mM NaCl (pH 7.4) were stable for 1 year at −80° C.

Preparation of αSyn Sensor Chips. For double capture experiments, αSyn antibody 5C12 (Anderson J P, et al. (2006)) targeting the C-terminus of αSyn (aa 109-120) was immobilized on nitrilotriacetic acid (NTA) sensor chips (GE Healthcare) using standard amine coupling in 10 mM acetic acid pH 4.5 on all flow cells (Fc) (Biacore T200, GE Healthcare) or spots 1, 2, 4 and 5 (Biacore 4000, GE Healthcare) at a concentration of 100 µg/ml to a level of 10,000 response units (RU). Briefly, the carboxyl groups of the sensor surface were activated by injection of a solution containing 0.2 M N-ethyl-N'-(3-diethylamino-propyl)-carbodiimide and 0.05 M N-hydroxysuccinimide. The immobilization procedure was stopped by an injection of 1M ethanolamine hydrochloride to block remaining ester groups. Spot 3 of each flow cell was activated and deactivated and served as a reference spot for subtraction of non-specific binding data. NTA chips were nickel-charged and monomeric N-(His)6 αSyn protein was captured on Fc 2, 3 (Biacore T200) or spots 1 and 5 (Biacore 4000) to levels between 6,700 to 8,000 RU using acetic acid at pH 4.5 as injection buffer. The running buffer was 25 mM TRIS pH 7.4, 100 mM NaCl. αSyn antibody 5C12 on spot 2 and 4 (Biacore 4000) or Fc 5 (Biacore T200) served as a negative control to detect non-specific binding of small molecules.

Preparation of off-target protein sensor chips. To test promiscuous binding (pb) of fragments to off target proteins, β-secretase (BACE) (Proteros), Glutathione-S transferase (GST) and Carbonic Anhydrase II (CA) (both SIGMA-Aldrich) were immobilized on spots 1, 2, 4 or 5 (Biacore 4000, GE Healthcare of NTA sensor chips to levels of 4500-6000 RU using standard amine coupling in 10 mM acetic acid pH 4.5 (BACE), pH 4.0 (GST) and pH 5.0 (CA)) at a concentration of 50 µg/ml. All immobilization steps were performed at a flow rate of 10 µl/min in 0.01 M HEPES pH 7.4, 0.15 M NaCl buffer.

Surface Plasmon Resonance Measurements. Compound testing was performed on Biacore 4000 at 25° C. by injecting compound solutions at 100 µM over all flow cells or spots in parallel for 90 sec with a dissociation time of 180 sec followed by an extra wash of the flow system with 50% DMSO. The flow rate was 30 µl/min. The running buffer was 25 mM IRIS pH 7.4, 100 mM NaCl, 1% DMSO. Time-dependent binding curves were monitored simultaneously. The surfaces were regenerated after each binding experiment by washing the surfaces with running buffer injections. Kinetics and affinity measurements were performed on a Biacore T200 instrument at 25° C. by injecting fragment solutions at six concentrations from 200 µM in two-fold dilutions over all flow cells and spots in parallel for 90 seconds. The flow rate was 30 µl/min. The time-dependent binding curves were monitored simultaneously. The surfaces were regenerated after each binding experiment by washing the surfaces with an injection of running buffer.

Preparation of Compound Screening Plates. A 20, 60 or 100 mM DMSO solution of each compound, respectively, was dispensed directly into 96 or 384 well filter plates (Millipore), or into a polypropylene storage plate using a Biomek FX (Beckman Coulter) or an ATS-100 acoustic dispenser (EDC Biosystems Technologies). Running buffer (25 mM TRIS pH 7.4, 100 mM NaCl) was added immediately using a Multidrop instrument (Thermo Scientific) to obtain aqueous 100 and 400 µM compound solutions of 1% DMSO. The compound solutions were then filtered into 96- or 384-well plates (Corning) using a vacuum filtering device (Millipore) and the plates sealed immediately. For kinetics and affinity measurements compound solution was prepared in running buffer containing 1% DMSO and dispensed in into 96- or 384-well plates (Corning). Two-fold dilutions were pipette and transferred into 96- or 384-well filter plates (Millipore) using a Microlab Star (Hamilton). Compound solutions were filtered as described above.

SPR Data Evaluation. The obtained data were quality controlled and evaluated using the manufacturers Evaluation Software as described previously (Regnström, K. et al. (2013)). Data were exported into Microsoft Excel and further analyzed as follows: The binding levels of running buffer injections were used to calculate the background noise level (>three-fold σ). All binding level data was calculated by subtracting the background noise level and adjustment to molecular weight (% Rmax). Assuming linearity between the refractive index change and the molecular weight (MW) of injected compound, the percentage of active protein (% Rmax) can be calculated by equation (1): Rmax=(MW fragment/MW protein)×R protein. R protein is the amount of immobilized or captured protein RU.

To calculate the pb-index, the Rmax of each pb-protein for each fragment was calculated. Binding levels of each fragment were then calculated as % Rmax and averaged for all three pb-proteins. Binding data was reference subtracted and solvent corrected. Binding levels were calculated as % Rmax according to the capture level of protein and the MW of each compound. An average of the % Rmax for αSyn obtained by two test occasions was calculated. The promiscuous binding index (pb) was calculated as previously described.

Affinity constants were determined using the Biacore T200 evaluation software V.1 by curve fitting using a 1:1 binding model. Association and dissociation curves were fitted locally or globally. The rate of complex formation during fragment injection is calculated according to the equation (2): $dR/dt=k_aC(R_{max}-R)-k_dR$ (1:1 interaction), where R is the SPR signal in response units (RU), C is the concentration of analyte, $R_{max}$ is the maximum analyte binding capacity in RU, and dR/dt is the rate of SPR signal change.

To determine the association constant ka between fragment and protein the early binding phase was used. The dissociation phase kd was measured using the rate of decline in RU after the injection stop when free running buffer is flowing over the surface. Data were simultaneously fitted by the software and the dissociation constant KD calculated using equation (3): $K_D=k_a/k_d$.

This application claims the benefit of priority to U.S. Provisional Application No. 62/819,995 filed Mar. 18, 2019, the entirety of which is incorporated by reference herein.

REFERENCES

The following non-patent publications are incorporated herein by reference, in their entirety:

1. Outeiro T F, et al. (2008) Formation of toxic oligomeric alpha-synuclein species in living cells. *Plos One* 3(4): e1867.
2. Danzer K M, et al. (2011) Heat-shock protein 70 modulates toxic extracellular alpha-synuclein oligomers and rescues trans-synaptic toxicity. *Faseb J* 25(1):326-336.
3. Dixon A S, et al. (2016) NanoLuc Complementation Reporter Optimized for Accurate Measurement of Protein Interactions in Cells. *ACS Chem Biol* 11(2):400-408.
4. Toth G, et al. (2014) Targeting the intrinsically disordered structural ensemble of alpha-synuclein by small molecules as a potential therapeutic strategy for Parkinson's disease. *Plos One* 9(2):e87133.
5. Kurnik M, et al. (2018) Potent alpha-Synuclein Aggregation Inhibitors, Identified by High-Throughput Screening, Mainly Target the Monomeric State. *Cell Chem Biol* 25(11):1389-1402 e1389.
6. Pickhardt M, et al. (2015) Identification of Small Molecule Inhibitors of Tau Aggregation by Targeting Monomeric Tau As a Potential Therapeutic Approach for Tauopathies. *Curr Alzheimer Res* 12(9):814-828.
7. Moussaud, S., et al. (2015) Targeting alpha-synuclein oligomers by protein-fragment complementation for drug discovery in synucleinopathies. *Expert Opinion On Therapeutic Targets* 19(5): 589-603.
8. Anderson, J. P., et al. (2006) Phosphorylation of Ser-129 is the dominant pathological modification of alpha-synuclein in familial and sporadic Lewy body disease. *The Journal of Biological Chemistry* 281(40): 29739-29752.
9. Regnström, K. et al. (2013) Label free fragment screening using Surface Plasmon Resonance as a Tool for Fragment Finding—Analyzing a difficult CNS target. *PLoS One* 8, e66879.

The invention claimed is:

1. A method for treating or preventing synucleinopathy in a subject in need thereof, comprising administering to the subject a therapeutically effective amount of a small-molecule inhibitor of pathogenic α-synuclein activity, wherein the small-molecule inhibitor is: 2-amino-5-hydroxy-N-methylbenzamide, 2-methylamino-5-hydroxy-N-methylbenzamide, 2-dimethylamino-5-hydroxy-N-methylbenzamide, 2,5-dihydroxy-N-methylbenzamide, or any combination thereof.

2. The method of claim 1, wherein the pathogenic α-synuclein activity is oligomerization.

3. The method of claim 1, wherein the pathogenic α-synuclein activity is inhibition of vesicular dynamics.

4. The method of claim 1, wherein the synucleinopathy is Parkinson's disease (PD), Dementia with Lewy bodies (DLB), Parkinson's disease with dementia (PDD), Lewy Body Dementia (LBD), Lewy Body Disease (PD PDD and DLB), Diffuse Lewy Body disease (DLBD), Alzheimer's Disease (AD), multiple system atrophy (MSA), or neuroaxonal dystrophy.

5. A method of inhibiting α-synuclein oligomerization or α-synuclein inhibition of vesicular dynamics, comprising contacting α-synuclein monomers with a small-molecule selected from the group consisting of 2-amino-5-hydroxy-N-methylbenzamide, 2-methylamino-5-hydroxy-N-methylbenzamide, 2-dimethylamino-5-hydroxy-N-methylbenzamide, 2,5-dihydroxy-N-methylbenzamide, and any combination thereof.

* * * * *